US012806640B2

(12) United States Patent
Ciavarella et al.

(10) Patent No.: US 12,806,640 B2
(45) Date of Patent: Nov. 24, 2026

(54) TRIGGER SPRAYER WITH REFILL PORT

(71) Applicant: GOJO Industries, Inc., Akron, OH (US)

(72) Inventors: Nick E. Ciavarella, Akron, OH (US); Michael A. Manno, Akron, OH (US)

(73) Assignee: GOJO Industries, Inc., Akron, OH (US)

(*) Notice: Subject to any disclaimer, the term of this patent is extended or adjusted under 35 U.S.C. 154(b) by 36 days.

(21) Appl. No.: 19/048,042

(22) Filed: Feb. 7, 2025

(65) Prior Publication Data

US 2025/0178008 A1 Jun. 5, 2025

Related U.S. Application Data

(63) Continuation of application No. 17/689,875, filed on Mar. 8, 2022, now abandoned.

(60) Provisional application No. 63/158,318, filed on Mar. 8, 2021.

(51) Int. Cl.
*B05B 11/00* (2023.01)
*B05B 11/10* (2023.01)

(52) U.S. Cl.
CPC ...... *B05B 11/0056* (2013.01); *B05B 11/0097* (2013.01); *B05B 11/1057* (2023.01)

(58) Field of Classification Search
CPC .. B05B 11/0056; B05B 11/0097; B65D 83/42
See application file for complete search history.

(56) References Cited

U.S. PATENT DOCUMENTS

| | | | |
|---|---|---|---|
| 7,597,122 B1 | 10/2009 | Smith | |
| 8,002,150 B2 | 8/2011 | Ophardt et al. | |
| 8,091,739 B2 | 1/2012 | Ophardt et al. | |
| 8,113,388 B2 | 2/2012 | Ophardt et al. | |
| 8,272,540 B2 | 9/2012 | Ophardt et al. | |

(Continued)

FOREIGN PATENT DOCUMENTS

| | | |
|---|---|---|
| DE | 102020109058 B3 | 12/2020 |
| WO | 2013134834 A1 | 9/2013 |
| WO | 2019161834 A1 | 8/2019 |

OTHER PUBLICATIONS

International Search Report and Written Opinion corresponding to International Application No. PCT/US2022/019397, dated Jun. 2, 2022, 15 pages.

*Primary Examiner* — Timothy P. Kelly
(74) *Attorney, Agent, or Firm* — Calfee, Halter & Griswold LLP

(57) ABSTRACT

A system for refilling a trigger sprayer bottle assembly includes the trigger sprayer bottle assembly including a trigger movable between a first trigger position and a second trigger position. A refillable bottle is coupled to the trigger such that material within the refillable bottle is dispensed from the refillable bottle when the trigger is moved from the first trigger position to the second trigger position. The trigger sprayer bottle assembly includes a first refill port through which material is added to the refillable bottle. The trigger sprayer bottle assembly is selectively coupled to a refilling assembly. The refilling assembly includes a refill reservoir and a second refill port through which material is removed from the refill reservoir. The second refill port is selectively coupled to the first refill port when the trigger sprayer bottle assembly is coupled to the refilling assembly.

20 Claims, 38 Drawing Sheets

(56) References Cited

U.S. PATENT DOCUMENTS

| | | | | |
|---|---|---|---|---|
| 8,360,286 | B2 | 1/2013 | Shi et al. | |
| 8,413,852 | B2 | 4/2013 | Ophardt et al. | |
| 8,464,912 | B2 | 6/2013 | Ophardt et al. | |
| 8,919,611 | B2 | 12/2014 | Ophardt et al. | |
| 9,216,431 | B2 * | 12/2015 | Perelli | B05B 11/1057 |
| 9,376,228 | B1 * | 6/2016 | Haley | B65B 31/003 |
| 2012/0158193 | A1 * | 6/2012 | De Rosa | B05B 11/0038 700/283 |
| 2014/0230960 | A1 * | 8/2014 | Ciavarella | B65B 3/045 141/237 |
| 2018/0080353 | A1 * | 3/2018 | Cadigan | F01M 11/04 |

* cited by examiner

TRIGGER SPRAYER WITH REFILL PORT

CROSS REFERENCE TO RELATED APPLICATIONS

This application claims priority to U.S. Provisional Patent Application No. 63/158,318, filed on Mar. 8, 2021, entitled "PROPRIETARY TRIGGER SPRAYER WITH REFILL CARTRIDGE," the entirety of which is hereby incorporated by reference herein. This application also claims priority to U.S. patent application Ser. No. 17/689,875, filed on Mar. 8, 2022, entitled "TRIGGER SPRAYER WITH REFILL PORT," the entirety of which is hereby incorporated by reference herein.

TECHNICAL FIELD

A fluid dispenser assembly includes a pump connected to an outlet valve that is separated from the pump. A first fluid container is refillable from a second fluid container through a refill port such that the pump and outlet valve can remain attached to the first fluid container while a material is placed into the first fluid container to refill the fluid dispenser assembly.

BACKGROUND

Some conventional cartridge-based soap or cleaner dispensers use pump and outlet valve combinations that are not separable from single-use cartridges and are thus incapable of being refilled. Other conventional soap or cleaner dispensers may be refilled by removing a portion of the dispenser assembly to gain access to an aperture to enable the refill operation.

SUMMARY

This summary is provided to introduce a selection of concepts in a simplified form that are further described below in the detailed description. This summary is not intended to identify key factors or essential features of the claimed subject matter, nor is it intended to be used to limit the scope of the claimed subject matter.

According to an aspect, a system for refilling a trigger sprayer bottle assembly includes the trigger sprayer bottle assembly. The trigger sprayer bottle assembly includes a trigger movable between a first trigger position and a second trigger position. The trigger sprayer bottle assembly also includes a refillable bottle coupled to the trigger such that material within the refillable bottle is dispensed from the refillable bottle when the trigger is moved from the first trigger position to the second trigger position. The trigger sprayer bottle assembly further includes a first refill port through which material is added to the refillable bottle. The system for refilling a trigger sprayer bottle assembly includes a refilling assembly to which the trigger sprayer bottle assembly is selectively coupled. the refilling assembly includes a refill reservoir. The refilling assembly also includes a second refill port through which material is removed from the refill reservoir, wherein the second refill port is selectively coupled to the first refill port when the trigger sprayer bottle assembly is coupled to the refilling assembly.

According to an aspect, a manual trigger sprayer bottle assembly includes a manual pump movable between a first pump position and a second pump position. The manual trigger sprayer bottle assembly also includes a trigger movable between a first trigger position and a second trigger position, wherein the manual pump is moved from the first pump position to the second pump position when the trigger is moved from the first trigger position to the second trigger position. The manual trigger sprayer bottle assembly also includes a refillable bottle coupled to the manual pump such that material within the refillable bottle is dispensed from the refillable bottle when the manual pump is moved from the first pump position to the second pump position. The manual trigger sprayer bottle assembly further includes a refill port through which material is added to the refillable bottle.

According to an aspect, an adapter for converting a trigger sprayer bottle into a trigger sprayer bottle assembly includes an adapter body extending from a first end to a second end. The adapter body defines an aperture extending from the first end to the second end. The adapter also includes a first structure located at the first end, the first structure configured to attach the adapter body to a refillable bottle of the trigger sprayer bottle. The adapter further includes a second structure located at the second end, the second structure configured to attach the adapter body to a trigger sprayer of the trigger sprayer bottle. The adapter still further includes a refill port through which material is added to the refillable bottle. When the adapter body is attached to the refillable bottle and to the trigger sprayer, the refillable bottle is in fluid communication with the trigger sprayer through the aperture. The refill port enables material to be added to the refillable bottle when the trigger sprayer is attached to the adapter and the trigger sprayer is attached to the refillable bottle through the adapter.

The following description and annexed drawings set forth certain illustrative aspects and implementations. These are indicative of but a few of the various ways in which one or more aspects can be employed. Other aspects, advantages, and/or novel features of the disclosure will become apparent from the following detailed description when considered in conjunction with the annexed drawings.

DETAILED DESCRIPTION

Figure 1:
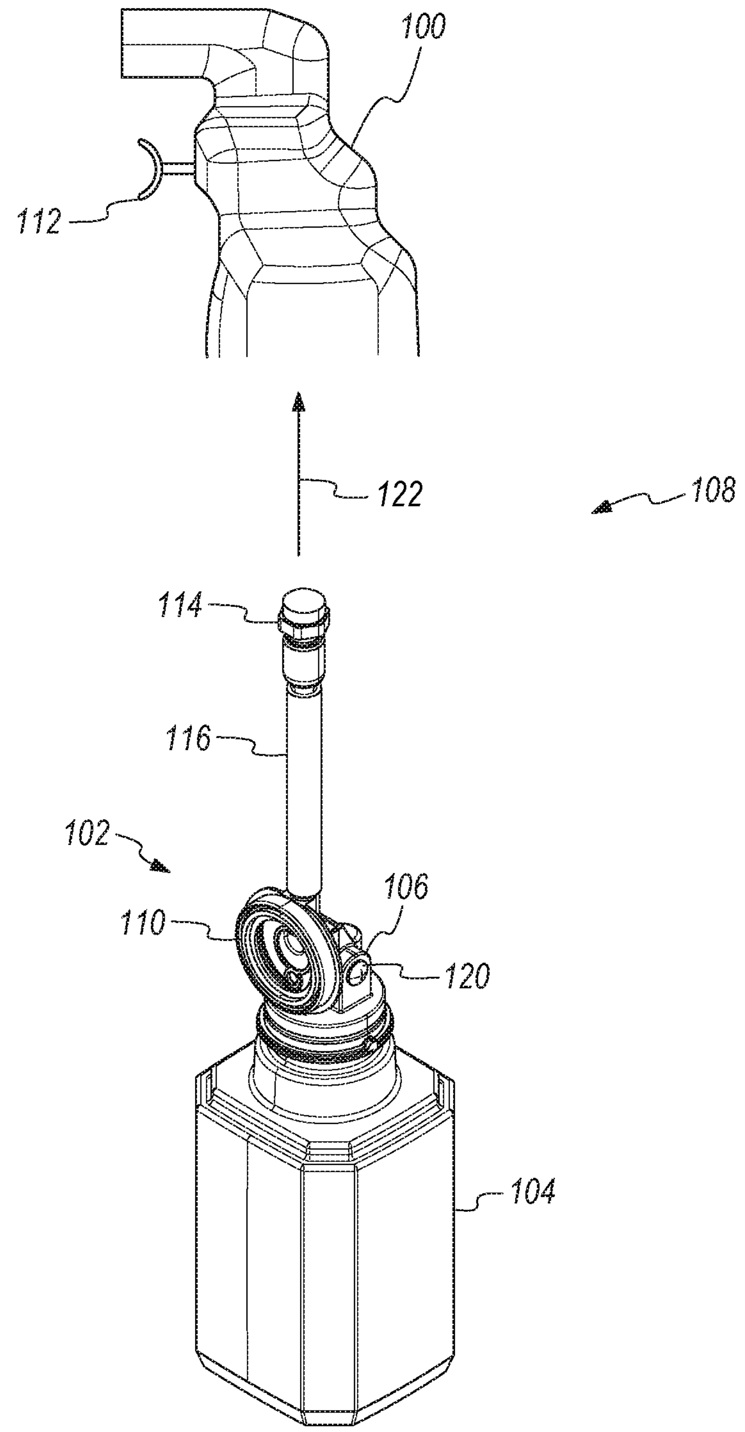
FIG. 1 is a perspective view of an example trigger sprayer bottle assembly.

The claimed subject matter is now described with reference to the drawings, wherein like reference numerals are used to refer to like elements throughout. In the following description, for purposes of explanation, numerous specific details are set forth in order to provide an understanding of the claimed subject matter. It is evident, however, that the claimed subject matter may be practiced without these specific details. In other instances, structures and devices are illustrated in block diagram form in order to facilitate describing the claimed subject matter. Relative size, orientation, etc. of parts, components, etc. may differ from that which is illustrated while not falling outside of the scope of the claimed subject matter.

Referring to FIG. 1, a partial exploded view of a trigger sprayer bottle assembly 108 is illustrated. As shown, a trigger sprayer housing 100 can be separated from a sprayer pump 102 that is attached to a refillable bottle 104. The refillable bottle 104 can define an interior space (not shown in FIG. 1) and the interior space may contain any of a variety of different types of material including fluids or liquids, including, but not limited to: soap, sanitizer, soil removing cleaner, lotion, shampoo, or conditioner for dispensation to an operator. The refillable bottle 104 can be composed of any suitable material including, but not limited to: plastic, composites, metal, combinations of materials, etc.

In some examples, the refillable bottle 104 is refillable through a first refill port 106, which can be an aperture defined by the refillable bottle 104 or an aperture defined by a structure attached to the refillable bottle 104. A valve 120 can be provided at the first refill port 106 to prevent undesired leakage of material from the refillable bottle 104. Any suitable valve is satisfactory for use with the devices and methods of the present disclosure, and the example valve shown is a septum valve, and this example is not meant to be limiting. In some examples, the described septum valve can be known as a slit valve, and can be composed of silicone. In some examples, the trigger sprayer housing 100 can be selectively attached to the refillable bottle 104 to form a trigger sprayer bottle assembly 108. The trigger sprayer bottle assembly 108 can be used with versions of the refillable bottle 104 that are designed to be refillable or versions of the bottle that are designed to be single-use. However, the remainder of the disclosure will use the term refillable bottle.

As shown, the sprayer pump 102 can include a dome pump 110 activated by a trigger 112 when the trigger sprayer housing 100 is attached to the sprayer pump 102. The trigger 112 can include any number of structures or devices including, but not limited to a manually operated trigger, an electronic trigger, a worm gear device, etc. The trigger 112 is movable between a first trigger position and a second trigger position such that the trigger 112 can cause movement of the manual pump 110. In some examples, the dome pump 110 is separated from a nozzle 114, or outlet, and is connected to the nozzle 114 through a hollow tube 116 such that the nozzle 114 is in fluid communication with the dome pump 110. As shown in FIG. 1, when the trigger sprayer housing 100 is selectively attached to the refillable bottle 104, the hollow tube 116 can be passed into the housing 100 in the direction of arrow 122 in order to align the nozzle 114 with an opening at a portion of the trigger sprayer housing 100.

Material within the refillable bottle 104 is dispensed from the refillable bottle 104 (e.g., through the hollow tube 116 and expelled through nozzle 114) when the manual pump (e.g., the dome pump 110) is moved from a first pump position to a second pump position. As previously noted, the refillable bottle 104 is coupled to the trigger 112 such that material within the refillable bottle 104 is dispensed from the refillable bottle 104 when the trigger 112 is moved from the first trigger position to the second trigger position in order to move the dome pump 110 from the first pump position to the second pump position. Movement of the dome pump 110 from the first pump position to the second pump position causes an alteration of a pressure within a portion of the trigger sprayer bottle assembly 108 in order to urge the material from the refillable bottle 104, through the hollow tube 116 and through the nozzle 114. In some examples, the material within the refillable bottle 104 is not dispensed from the refillable bottle 104 when the trigger 112 is moved from the second trigger position to the first trigger position.

In some examples, the trigger sprayer housing 100 can be considered a cover, and the trigger sprayer housing 100, or cover, is movable between a first position (shown in FIG. 2) and a second position (shown in FIG. 1). When the trigger sprayer housing 100 is in the first position, the trigger sprayer housing 100 does not enable access to the refill port 106. Conversely, when the trigger sprayer housing 100 is in the second position, the trigger sprayer housing 100 enables access to the refill port 106.

Figure 2:
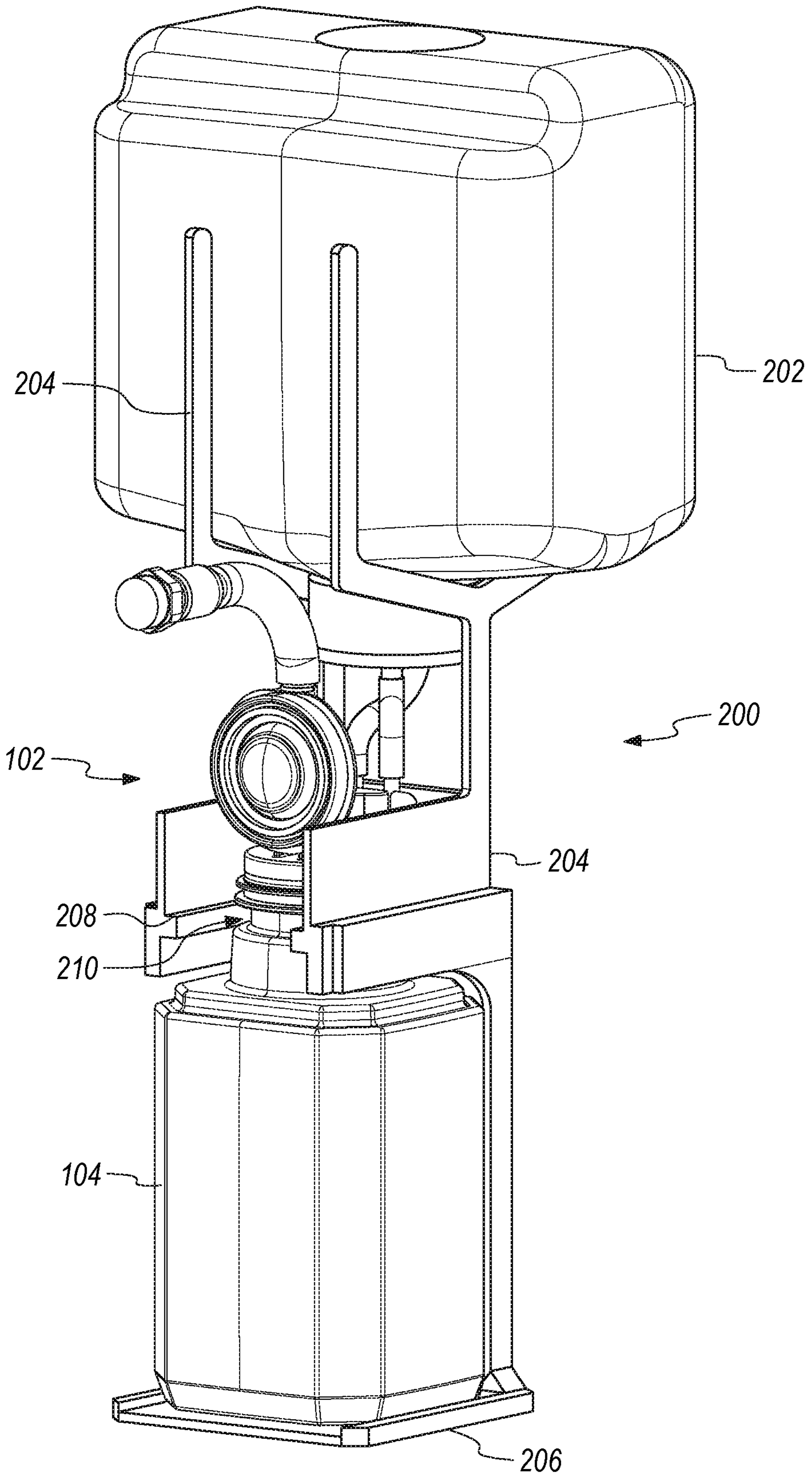
FIG. 2 is a perspective view of a dome trigger sprayer pump attached to a refillable bottle, the dome trigger sprayer pump and the bottle attached to a refilling assembly.

Referring to FIG. 2, a perspective view of the trigger sprayer bottle assembly 108 coupled to a refilling assembly 200 is illustrated. As shown, the trigger sprayer housing 100 (shown in FIG. 1) is removed to provide ready access to the first refill port 106 (not shown in FIG. 2). The dome trigger sprayer pump 102 remains attached to the refillable bottle 104. As operators use the trigger sprayer bottle assembly 108 to clean, sanitize, or generally dispense material, the amount of material within the refillable bottle 104 gradually decreases until the amount of material reaches a level requiring material replacement. At that time, an operator may selectively couple the trigger sprayer bottle assembly 108 to the refilling assembly 200 in order to refill the refillable bottle 104 with additional material. The refilling assembly 200 can include a refill reservoir 202 containing flowable material to be placed within the refillable bottle 104. The refilling assembly 200 can also include structure 204 to support both the refill reservoir 202 and the refillable bottle 104 while helping secure the refillable bottle 104 in connection to the refill reservoir 202 which will be discussed below. The structure 204 can be composed of any suitable material including, but not limited to: plastic, composites, metal, combinations of materials, etc.

The refilling assembly 200 can be placed on a flat surface or mounted to a vertical surface such as a wall. In some examples, the refilling assembly can also include a support tray 206 configured to contact a bottom surface of the refillable bottle 104 in order to help support the trigger sprayer bottle assembly 108. In some examples, the refilling assembly 200 can also include other structures, such as a ridge 208 that is configured to cooperate with an annular depression 210 defined by the refillable bottle 104. This cooperation between the ridge 208 and the annular depression 210 (or other similar structures) can help support and/or positively locate the trigger sprayer bottle assembly 108 as it is coupled to the refilling assembly 200. Positive location of the trigger sprayer bottle assembly 108 relative to the refilling assembly 200 can promote a proper connection between the first refill port 106 and structure(s) attached to the refilling assembly 200 as will be described below.

Figure 3:
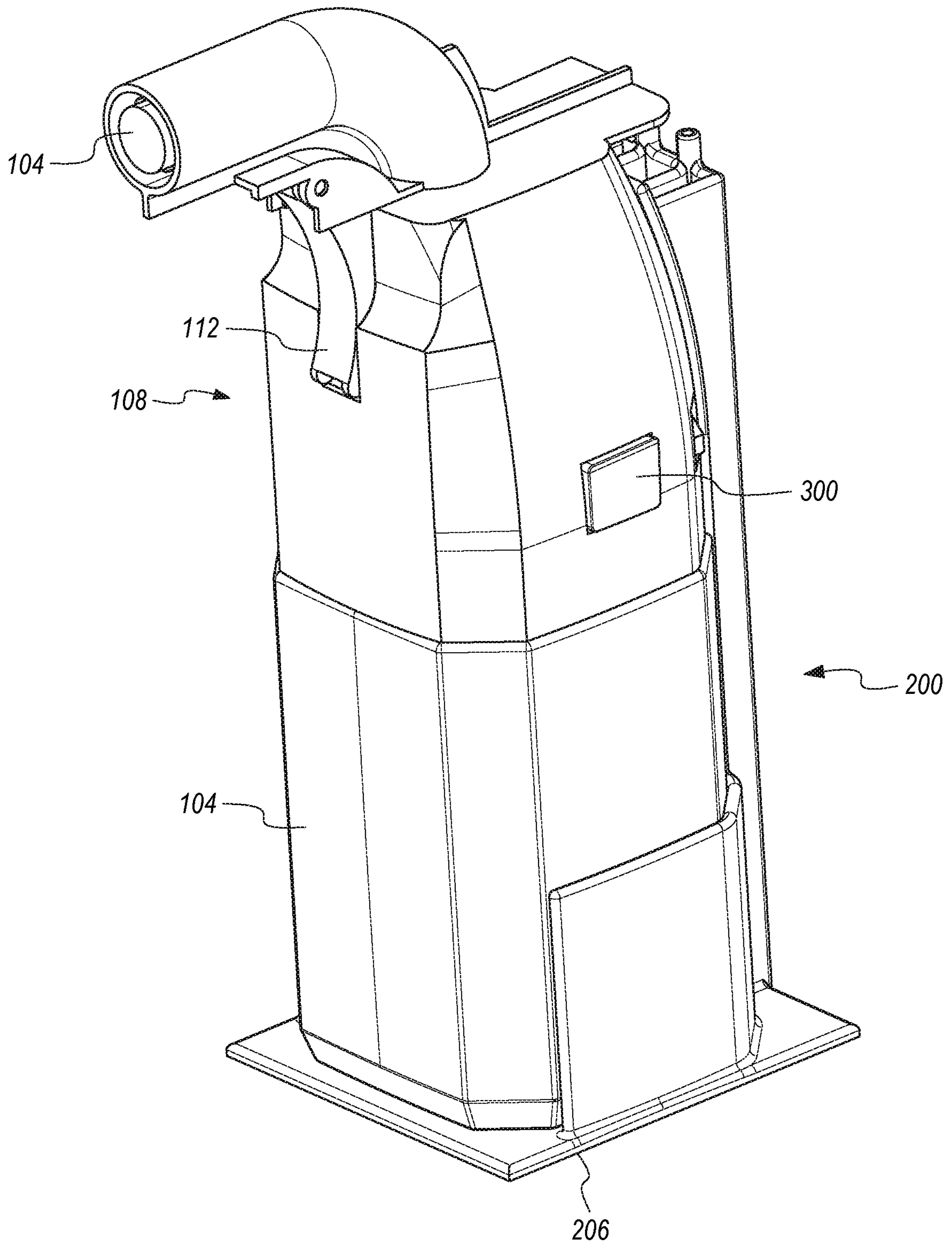
FIG. 3 is perspective view of the trigger sprayer bottle assembly and the refillable bottle attached to a portion of a refilling assembly.

Referring to FIG. 3, an example trigger sprayer bottle assembly 108 is shown coupled to the refilling assembly 200. Portions of the refilling assembly 200 are not shown. The example trigger sprayer bottle assembly 108 shown in FIG. 3 can be coupled to the refilling assembly 200 without removing the trigger sprayer housing 100. Similar to the previous example trigger sprayer bottle assembly, the trigger 112 can include any number of structures or devices including, but not limited to a manually operated trigger, an electronic trigger, a worm gear device, etc. Additionally, the trigger sprayer bottle assembly 108 also includes the refillable bottle 104, the pump 110, the hollow tube 116, and the nozzle 114.

As shown in FIG. 3, the trigger sprayer housing 100 can include a button 300 or similar structure configured to cooperate with a second structure located on the refilling assembly 200. The second structure can also interact with a third structure located on the trigger sprayer bottle assembly 108. Movement of the button 300 from a first position to a second position can urge the second structure away from the third structure in order to release the trigger sprayer bottle assembly 108 from the refilling assembly 200.

Figure 4:
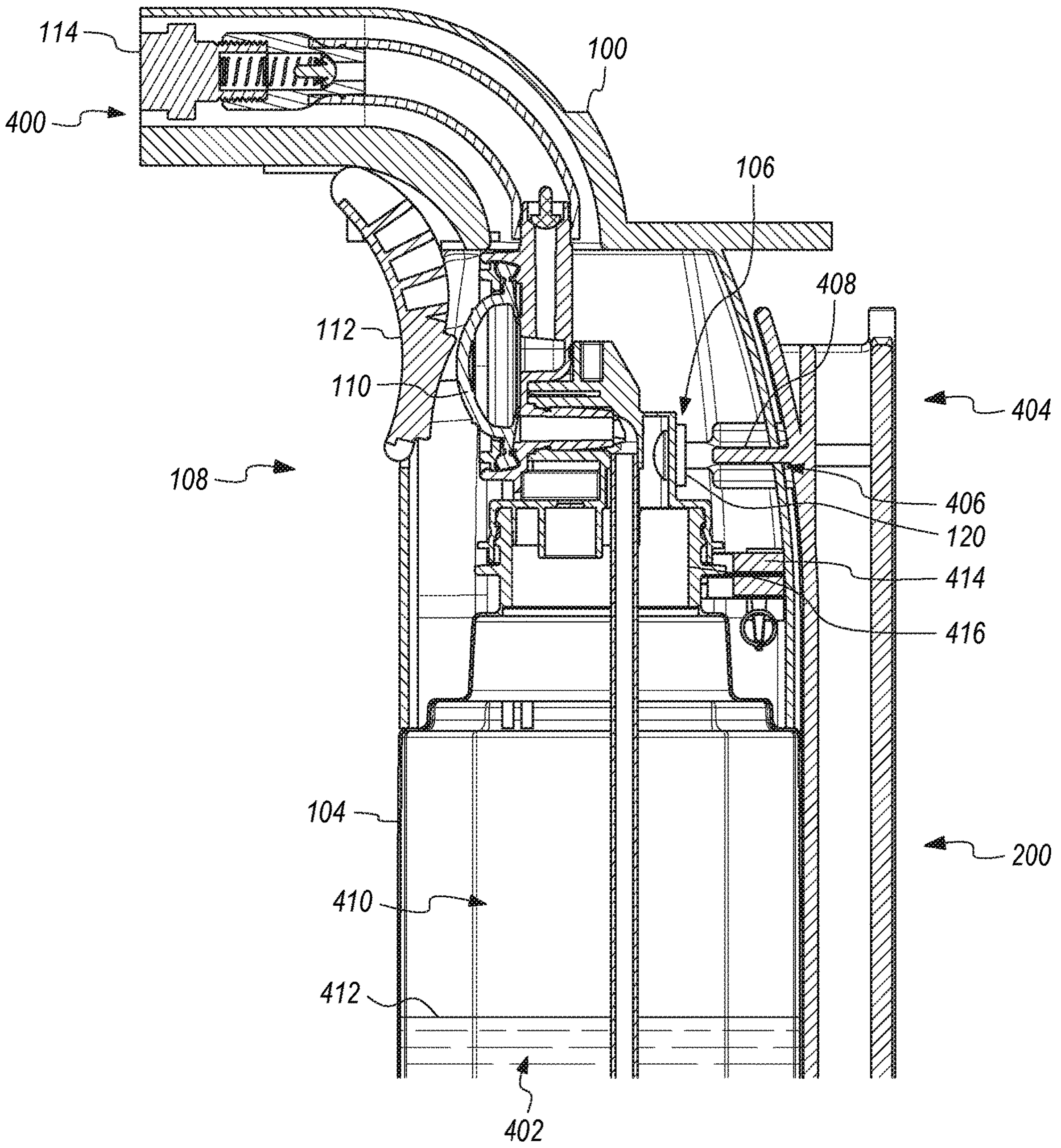
FIG. 4 is a partial cross section view of the structure of FIG. 3.

Referring to FIG. 4, a partial cross-section view of the trigger sprayer bottle assembly 108 coupled to the refilling assembly 200 is illustrated. As with the previously described trigger sprayer bottle assembly 108, the trigger sprayer bottle assembly 108 includes an outlet 400, the trigger 112, the pump 110, the refillable bottle 104, and the trigger sprayer housing 100, or cover. The trigger 112 can include any number of structures or devices including, but not limited to a manually operated trigger, an electronic trigger, a worm gear device, etc. The trigger 112 is movable between a first trigger position and a second trigger position such that the trigger 112 can cause movement of the pump 110. In some examples, the dome pump 110 is separated from a nozzle 114, or outlet, and is connected to the nozzle 114 through a hollow tube 116 such that the nozzle 114 (and, thus, the outlet 400) is in fluid communication with the dome pump 110.

Material 402 within the refillable bottle 104 is dispensed from the refillable bottle 104 (e.g., through the hollow tube 116 and expelled through the outlet 400) when the pump (e.g., the dome pump 110) is moved from a first pump position to a second pump position. As previously noted, the refillable bottle 104 is coupled to the trigger 112 such that material 402 within the refillable bottle 104 is dispensed from the refillable bottle 104 when the trigger 112 is moved from the first trigger position to the second trigger position in order to move the dome pump 110 from the first pump position to the second pump position. Movement of the dome pump 110 from the first pump position to the second pump position causes an alteration of a pressure within a portion of the trigger sprayer bottle assembly 108 in order to urge the material 402 from the refillable bottle 104, through the hollow tube 116 and through the nozzle 114 and the outlet 400 for dispensation. As shown, the pump 110 is separated from the nozzle 114 and the outlet 400 and the pump 110 is connected to the nozzle 114 through the hollow tube 116. As previously noted, the trigger sprayer bottle assembly 108 includes the outlet 400 through which the material dispensed from the refillable bottle 104 is dispensed. The pump 110 is between the outlet 400 and the refillable bottle 104, wherein the outlet 400 is in fluid communication with the pump 110.

After material 402 dispensation, the pump 110 is moved from the second pump position to the first pump position when the trigger 112 is moved from the second trigger position to the first trigger position. In some examples, the material 402 within the refillable bottle 104 is not dispensed from the refillable bottle 104 when the trigger 112 is moved from the second trigger position to the first trigger position.

In some examples, the first refill port 106 is located on a rear side 404 of the trigger sprayer bottle assembly 108, and more specifically, in some examples the first refill port 106 is located on a rear side 404 of the sprayer pump 102. Location and arrangement of the first refill port 106 can be varied, and any suitable arrangement is satisfactory for use with the present disclosure. For example, the first refill port 106 can be located within a volume defined by the trigger sprayer housing 100 and the first refill port 106 can be accessed through an aperture 406 defined by the trigger sprayer housing 100. Some examples of the trigger sprayer housing 100 may include a movable door or cover for the aperture 406.

As with the previously described example, the valve 120 can be mounted adjacent or within the first refill port 106 such that the valve 120 can selectively limit or eliminate passage of fluids, liquids, etc. through the first refill port 106. In some examples, the valve 120 can be selectively moved from a first position (e.g., a closed position) and remains in the closed position until urged to a second position (e.g., an open position) when acted upon by a tube 408. A nose portion of the tube 408 can make contact with the valve 120 as the trigger sprayer bottle assembly 108 is being coupled to the refilling assembly 200. When the trigger sprayer bottle assembly 108 is moved to a position where it is coupled with the refilling assembly 200, the nose portion of the tube 408 maintains contact with the valve 120 and the nose portion passes through the valve 120 (e.g., opens the slit valve and extends past the valve 120). When the nose portion opens the valve 120 in this way, the coupling operation and the open valve 120 enables a refilling operation of the refillable bottle 104. In some examples, the refilling operation can take place without removal of the trigger sprayer housing 100, any trigger sprayer assembly, or any other parts from the refillable bottle 104, thus saving time and effort for an operator refilling the refillable bottle 104.

In some examples, the first refill port 106 and the valve 120 can be the only refill port and valve used for refilling the refillable bottle 104, however, further examples described below include a plurality of ports and valves. In the single refill port examples, material from the refill reservoir 202 (shown in FIG. 2) can enter the refillable bottle 104 and enable air to escape the from the refillable bottle 104 using the same tube 408. In such examples, during a refilling operation, there may be times when air flowing from the refillable bottle 104 to the refill reservoir 202 may be dominant within the tube 408. At other times, flowing material 402 passing from the refill reservoir 202 to the refillable bottle 104 may be dominant. At still other times, the flow of air and the flow of material 402 through the tube 408 may be relatively balanced.

For the purposes of this disclosure, the term "air" is meant to include the ordinary meaning of air and any other suitable gas, fluid, gas mixtures, gas-fluid mixtures, etc. that may occupy an interior volume 410 of the refillable bottle 104 that is not occupied by the material 402. In some examples, the air will occupy the volume 410 that is above the liquid level 412.

Enabling air escape from the refillable bottle 104 can help enable material 402 to enter the refillable bottle 104 and can also be used as a process control. For example, when coupled, or docked, to the refilling assembly 200, the valve 120 can be opened by the tube 408. Material 402 from the refill reservoir 202 can then flow under power of gravity into the refillable bottle 104 through the tube 408, through the open valve 120, through the first refill port 106, and into the refillable bottle 104. Additionally, if the refillable bottle 104, the tube 408, and the refill reservoir 202 are maintained as a closed system (e.g., no air can pass into or out of the system when the trigger sprayer bottle assembly 108 is coupled with the refilling assembly 200), then the amount of material 402 flowing into the refillable bottle 104 can be limited by the amount of air escaping the refillable bottle 104. As such, the amount of material 402 leaving the refill reservoir 202 can only be of the same volume as the air leaving the refillable bottle 104 (and entering the refill reservoir 202) to prevent over-filling, spills, etc. In other words, the refillable bottle 104 can be fed, via gravity, only as much volume of material 402 as the volume of air within the refillable bottle 104.

As noted previously, the trigger sprayer housing 100 can include a button 300 (shown in FIG. 3) or similar structure that is configured to cooperate with a second structure 414 located on the refilling assembly 200. The second structure 414 can also interact with a third structure 416 (shown as an annular ridge) located on the trigger sprayer bottle assembly 108 in order to maintain the coupled orientation of the trigger sprayer bottle assembly 108. Movement of the button 300 from a first position to a second position can urge the second structure 414 away from the third structure 416 in order to release the trigger sprayer bottle assembly 108 from the refilling assembly 200.

Figure 5:
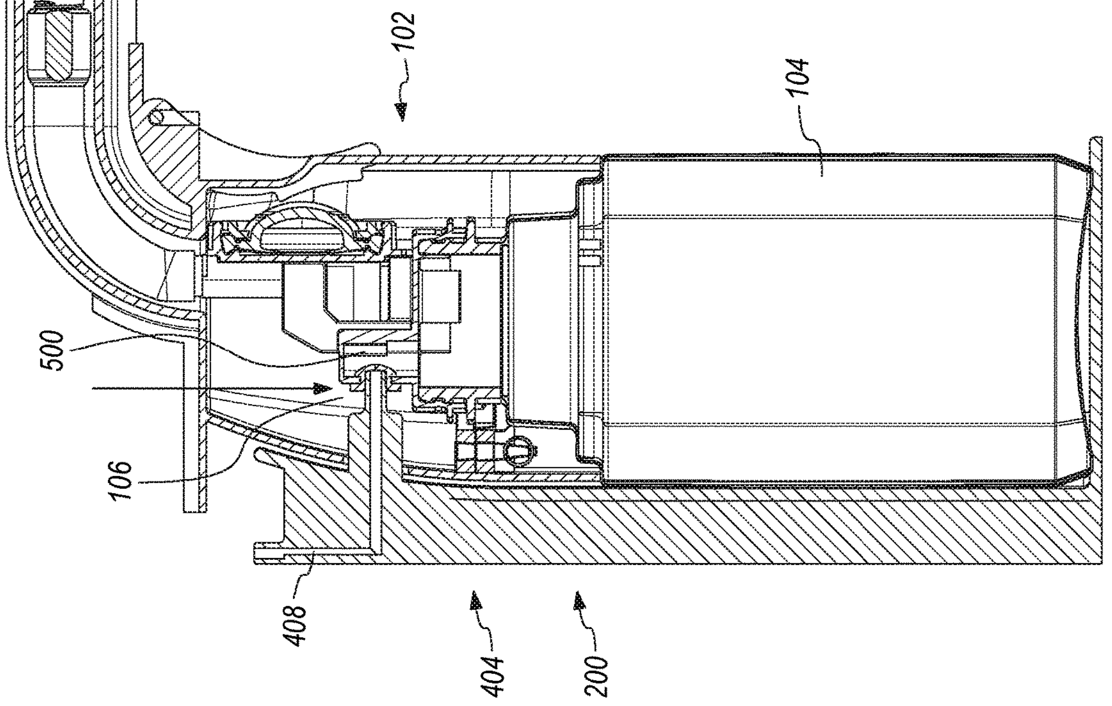
FIG. 5 is similar to FIG. 4.

Referring to FIG. 5, a partial cross-section view of the trigger sprayer bottle assembly 108 coupled to the refilling assembly 200 is illustrated. As previously discussed, the first refill port 106 is located on the rear side 404 of the sprayer pump 102. When the trigger sprayer bottle assembly 108 is coupled with the refilling assembly 200, the first refill port 106 is in fluid communication with the nose portion 500 of the tube 408 through which material 402 passes from the refill reservoir and is added to the refillable bottle 104 to refill the refillable bottle with material 402.

Figure 6:
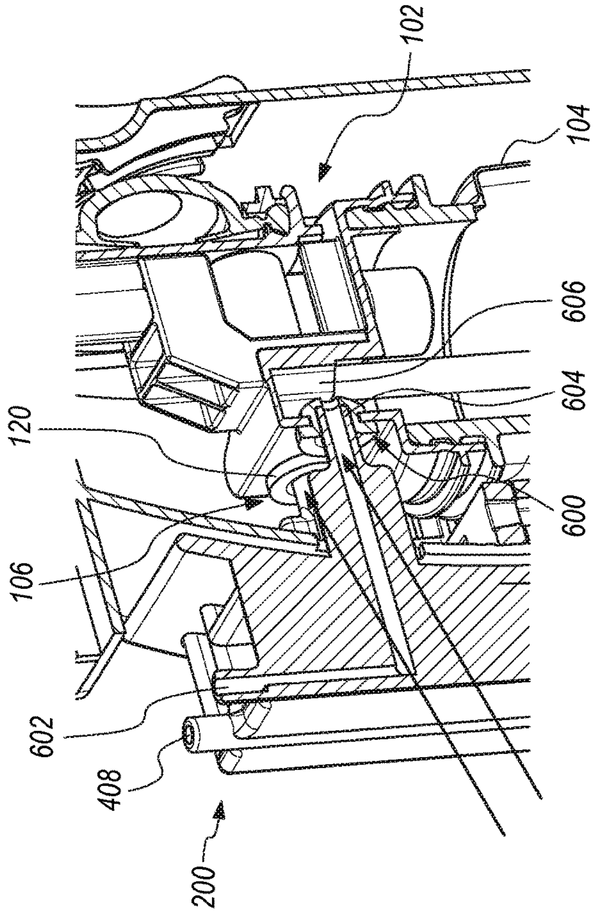
FIG. 6 is a detail of FIG. 5.

Referring to FIG. 6, a partial cut-away or cross-section view of the trigger sprayer bottle assembly 108 coupled to the refilling assembly 200 is illustrated. In some examples, the trigger sprayer bottle assembly 108 includes a refill port 600 in addition to the first refill port 106. The additional refill port 600 can reduce the time required to refill the refillable bottle 104 while coupled with the refilling assembly 200. Similar to the first refill port 106 cooperating with the tube 408, the additional refill port 600 cooperates and is in fluid communication with a second tube 602. While not shown in FIG. 6, the shown terminal ends of the tube 408 and the second tube 602 are in fluid communication with the refill reservoir 202 (not shown in FIG. 6).

Figure 7:
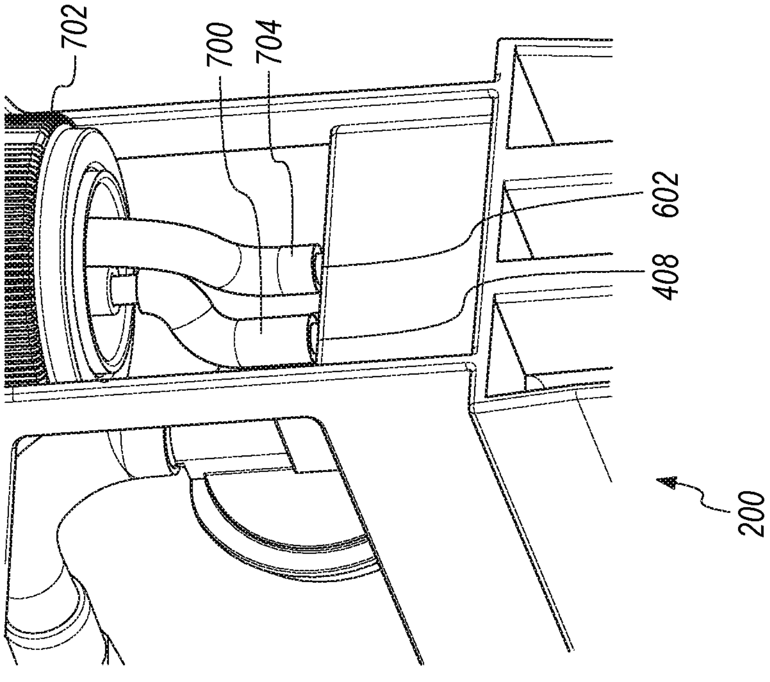
FIG. 7 is a detail view of the refilling station.

Referring to FIG. 7, a detail rear view of the refilling assembly 200 is illustrated. In some examples, the refilling assembly 200 includes a first connector tube 700 configured to place the tube 408 into fluid communication with a fitting 702 (e.g., a threaded cap) that is secured to the refill reservoir 202 (shown in FIG. 8). Similarly, the refilling assembly 200 can include a second connector tube 704 configured to place the second tube 602 into fluid communication with the fitting 702. The first connector tube 700 and the second connector tube 704 enable fluid communication between the tube 408, the second tube 602, and the refill reservoir 202 through the fitting 702 such that material 402 can pass from the refill reservoir 202, through the fitting 702, through the connector tubes 700, 704, through the tubes 408, 602, and finally through the first refill port 106 where the material 402 can pass into the refillable bottle 104.

Figure 8:
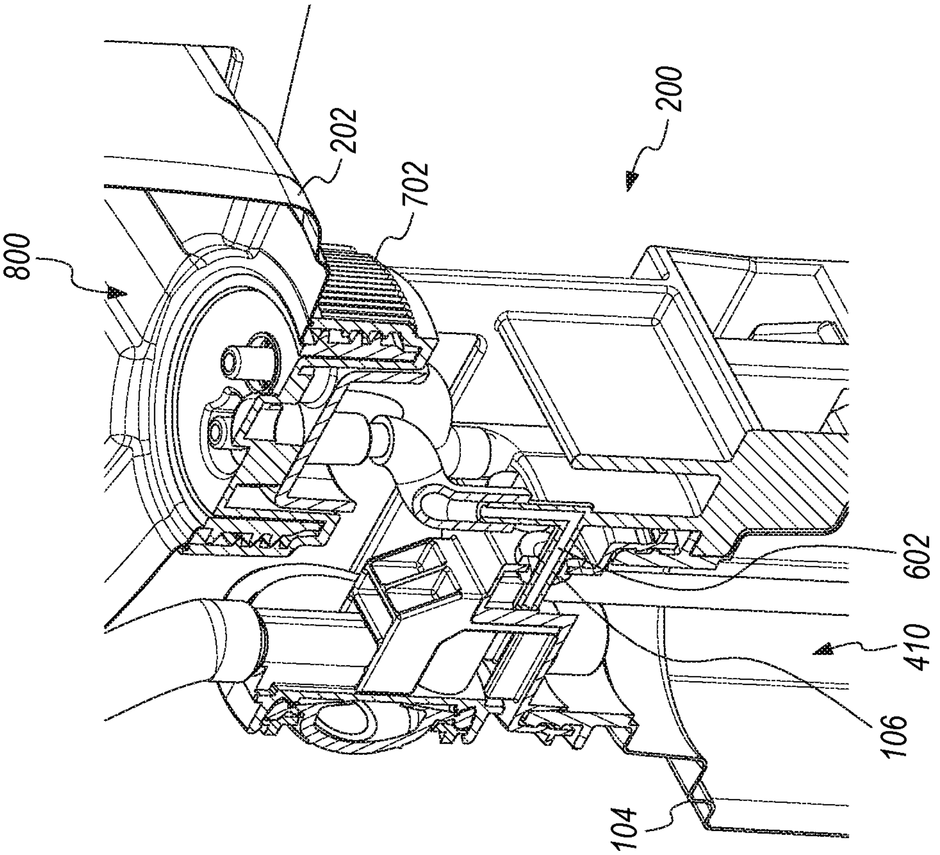
FIG. 8 is a partial cross section view of FIG. 7.

Referring to FIG. 8, a partial cross-section view of the details of FIG. 7 is illustrated. The refillable bottle 104 is coupled with the refilling assembly 200, the first refill port 106 and the additional refill port include valves 120 that are urged to an open position by a nose portion of the tubes 408, 602. With this connection, an interior volume 800 of the refill reservoir 202 is in fluid communication with an interior volume 410 of the refillable bottle 104 and an amount of material 402 can flow from the refill reservoir 202 to the refillable bottle 104 in order to refill the refillable bottle 104.

Figure 9:
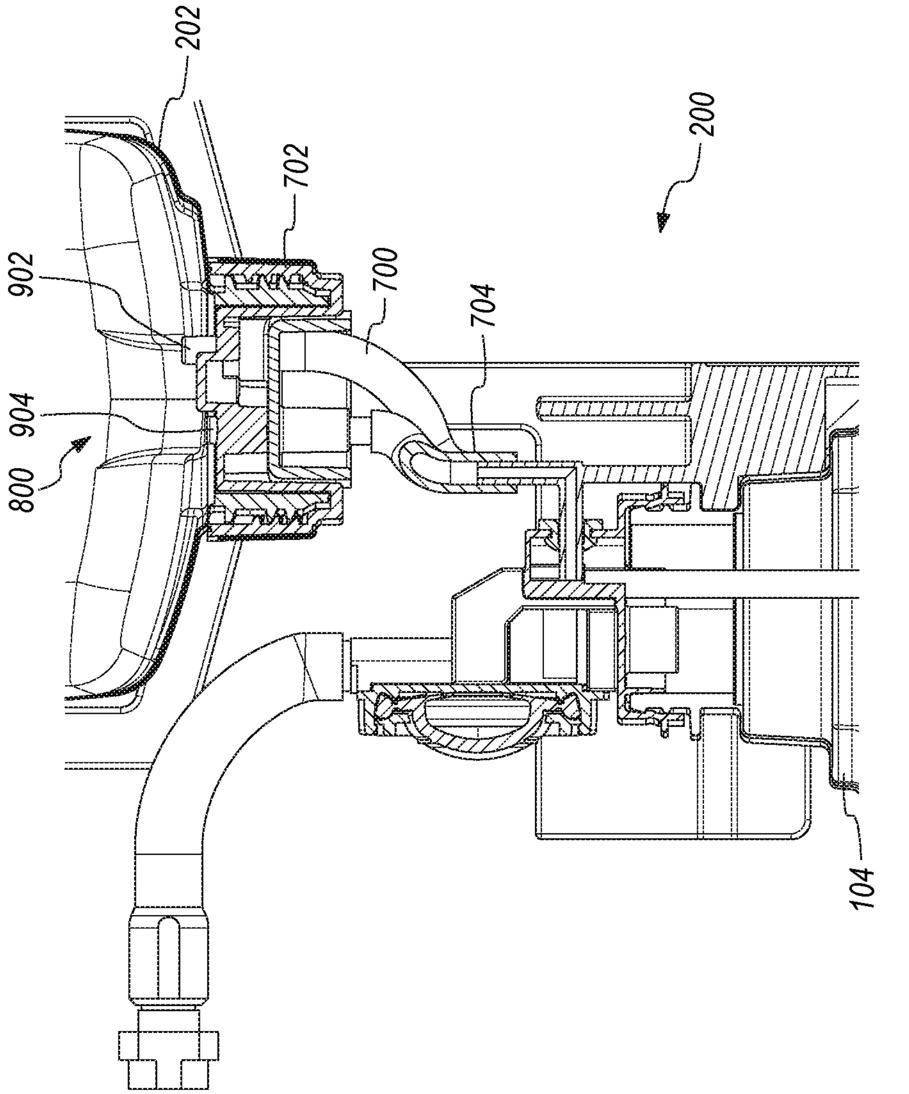
FIG. 9 is a partial cross section view of FIG. 7.

Referring to FIG. 9, a partial cross-section view similar to FIG. 8 is illustrated. In some examples, the first connector tube 700 and the second connector tube 704 are attached to the fitting 702 of the refill reservoir 202. The fitting 702 can include a first passage 902 that is in fluid communication with the first connector tube 700. The fitting 702 can also include a second passage 904 that is in fluid communication with the second connector tube 704. In some examples, the first passage 902 extends farther into the refill reservoir 202 than the second passage 904.

Figure 10:
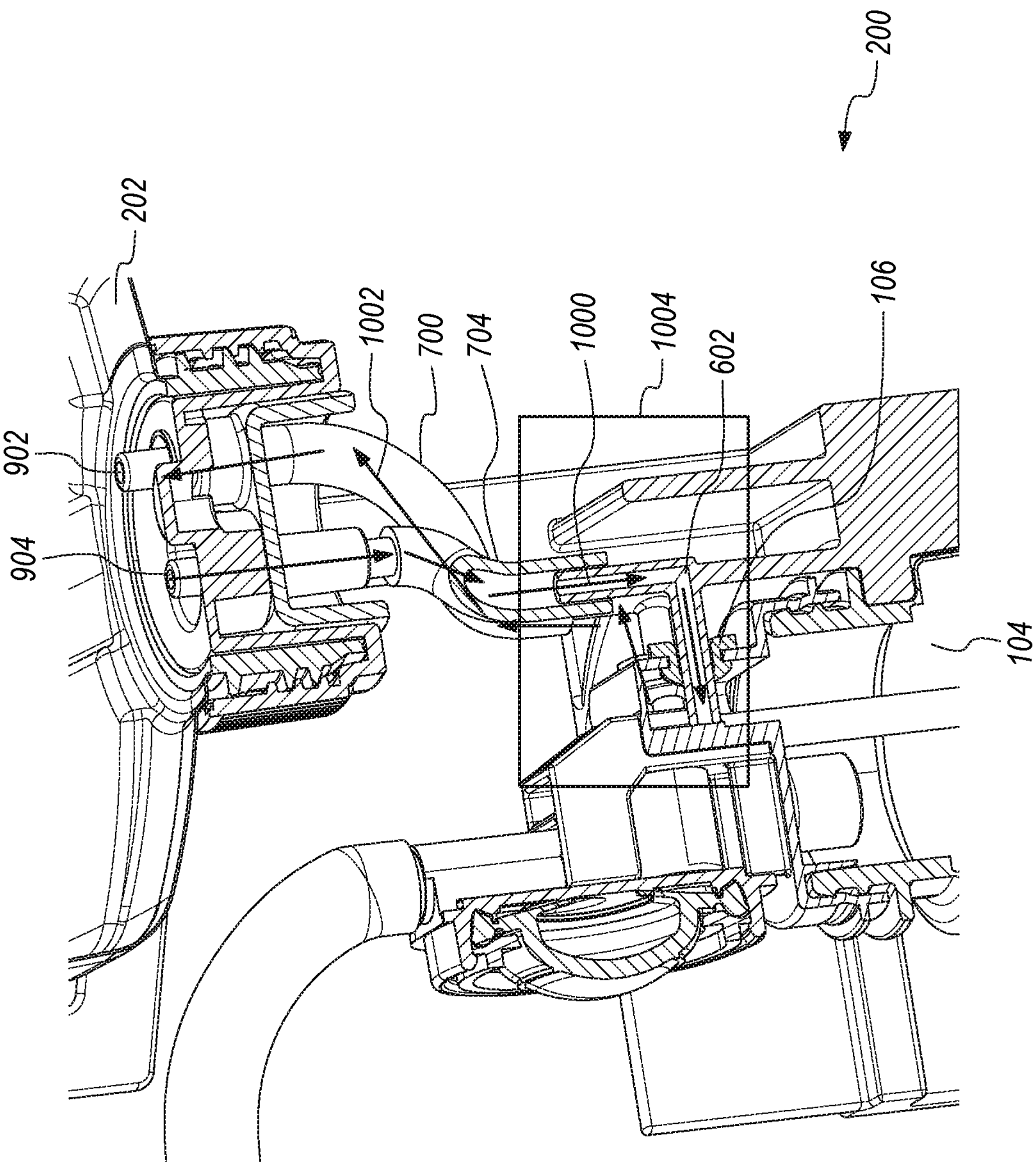
FIG. 10 is similar to FIG. 9 showing fluid and air flow patterns.

Referring to FIG. 10, a partial cross-section view similar to FIG. 8 is illustrated with directional arrows to demonstrate fluid flow. For example, material 402 from the refill reservoir 202 can flow under the power of gravity through the first passage 902, into the first connector tube 700, into the tube 408 and through the first refill port 106 and into the refillable bottle 104. This path is noted by arrows 1000. Additionally, air or another fluid can flow or escape from the refillable bottle 104 through the additional refill port into the second tube 602, through the second connector tube 704, through the second passage 904, and into the refill reservoir 202. This path is denoted by arrows 1002. In some examples, a valve can be located within the box 1004 to limit and/or eliminate leakage of material 402 from the refill reservoir 202 and fluid connections when the trigger sprayer bottle assembly 108 is not coupled with the refilling assembly 200.

Figure 12:
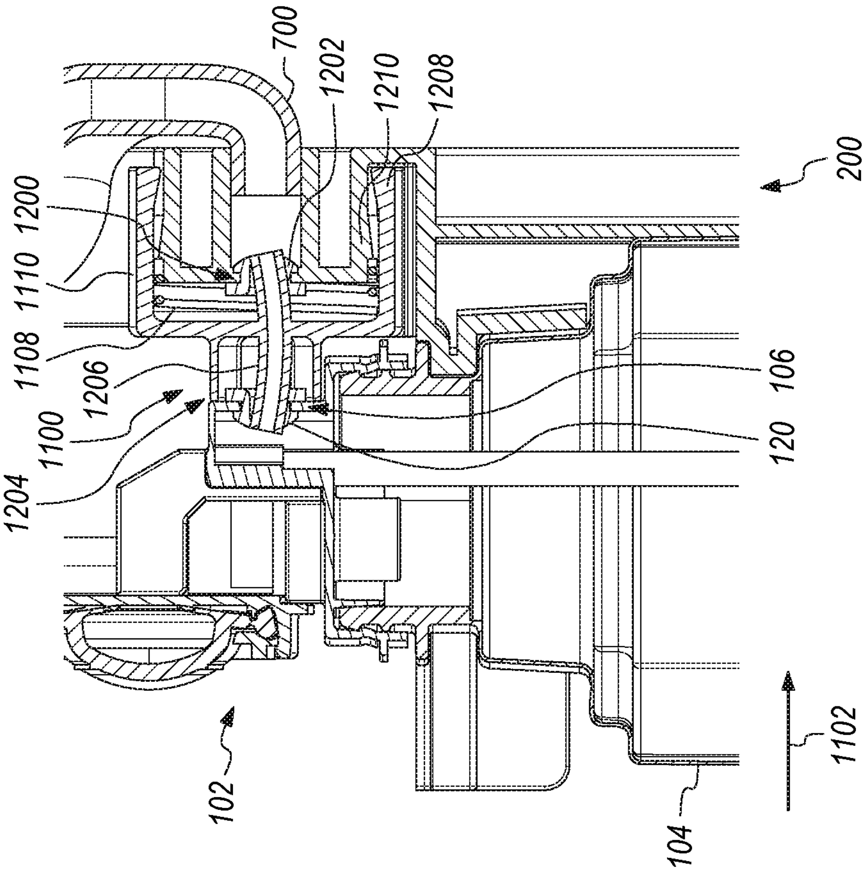
FIG. 12 is a partial cross section view of the valve attached to the refilling station.
Figure 11:
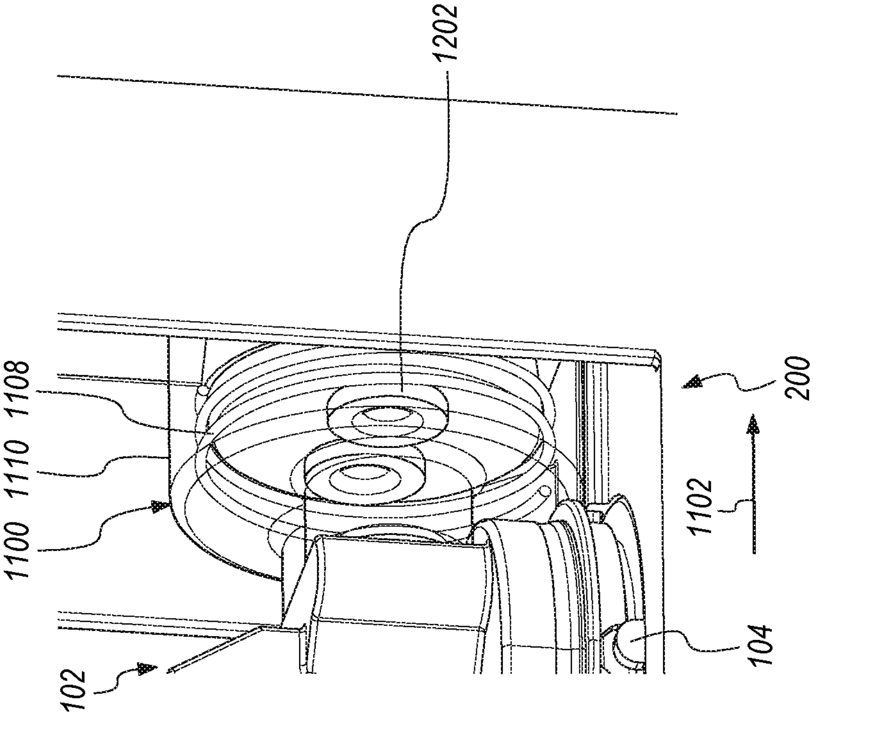
FIG. 11 is a detail view of a valve attached to the refilling station.

Referring to FIGS. 11 and 12, an example valve assembly 1100 from box 1004 of FIG. 10 is illustrated. In some examples, an operator can impart a force upon the trigger sprayer bottle assembly 108 in order to selectively couple the trigger sprayer bottle assembly 108 to the refilling assembly 200. The force acts in the direction of arrow 1102. As shown, a portion of the trigger sprayer bottle assembly 108 acts upon and imparts the force 1102 upon a nose area 1204 of the valve assembly 1100 which can be a spring-activated valve assembly.

Figure 13:
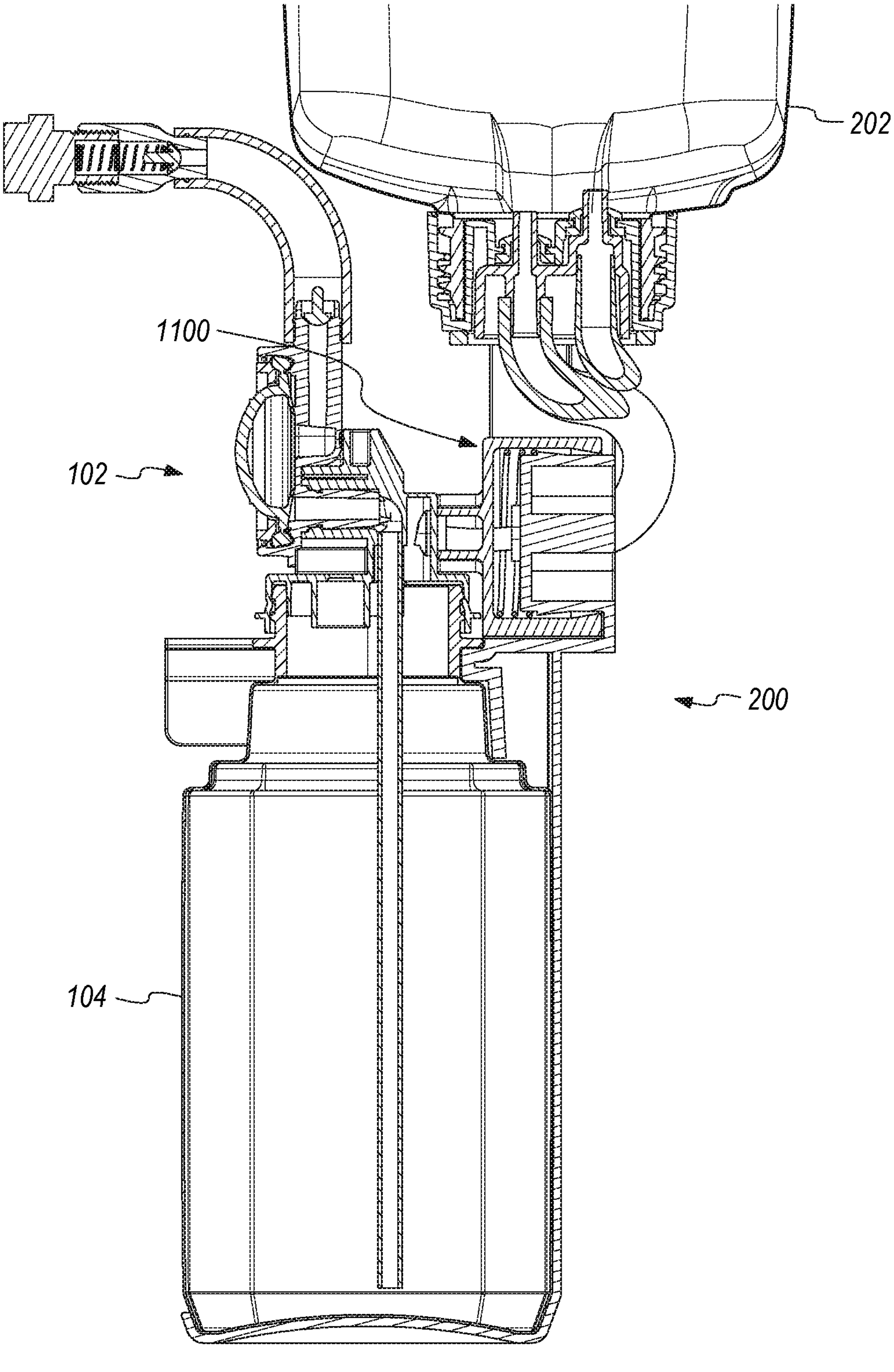
FIG. 13 is a partial cross section view similar to FIG. 12.
Figure 15:
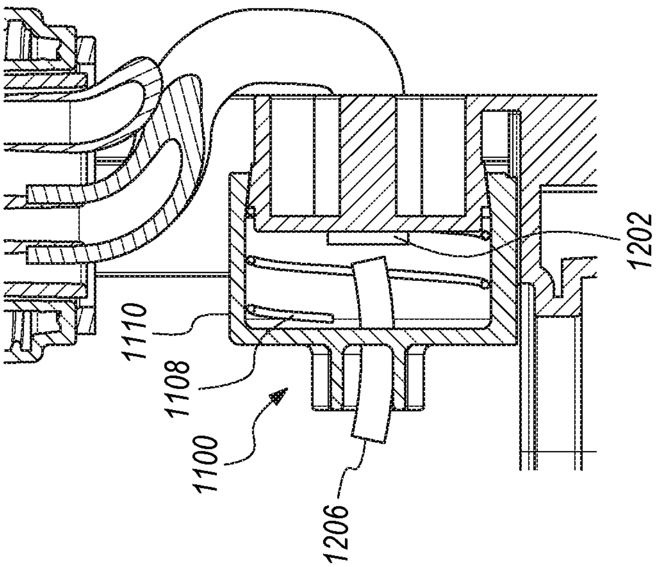
FIG. 15 is similar to FIG. 14.
Figure 14:
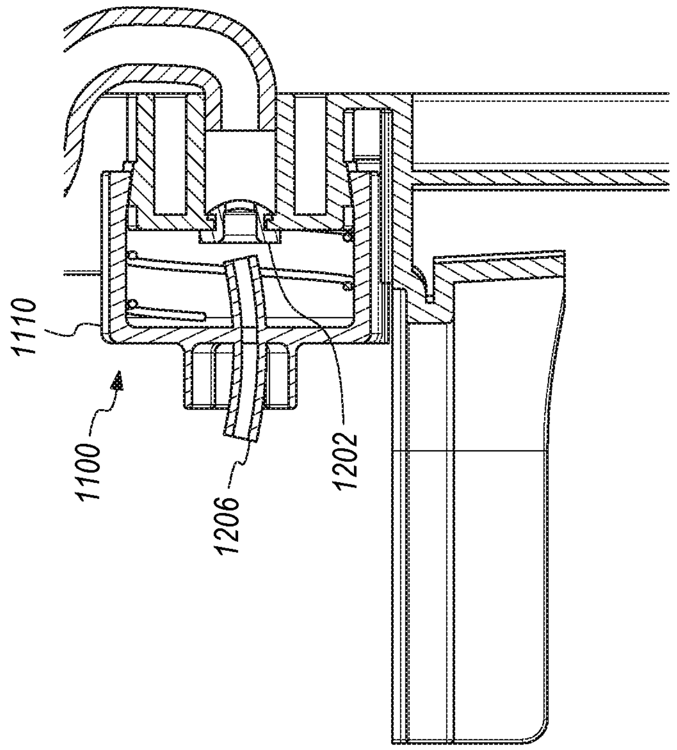
FIG. 14 is a partial cross section view of the valve in a closed position.
Figure 16:
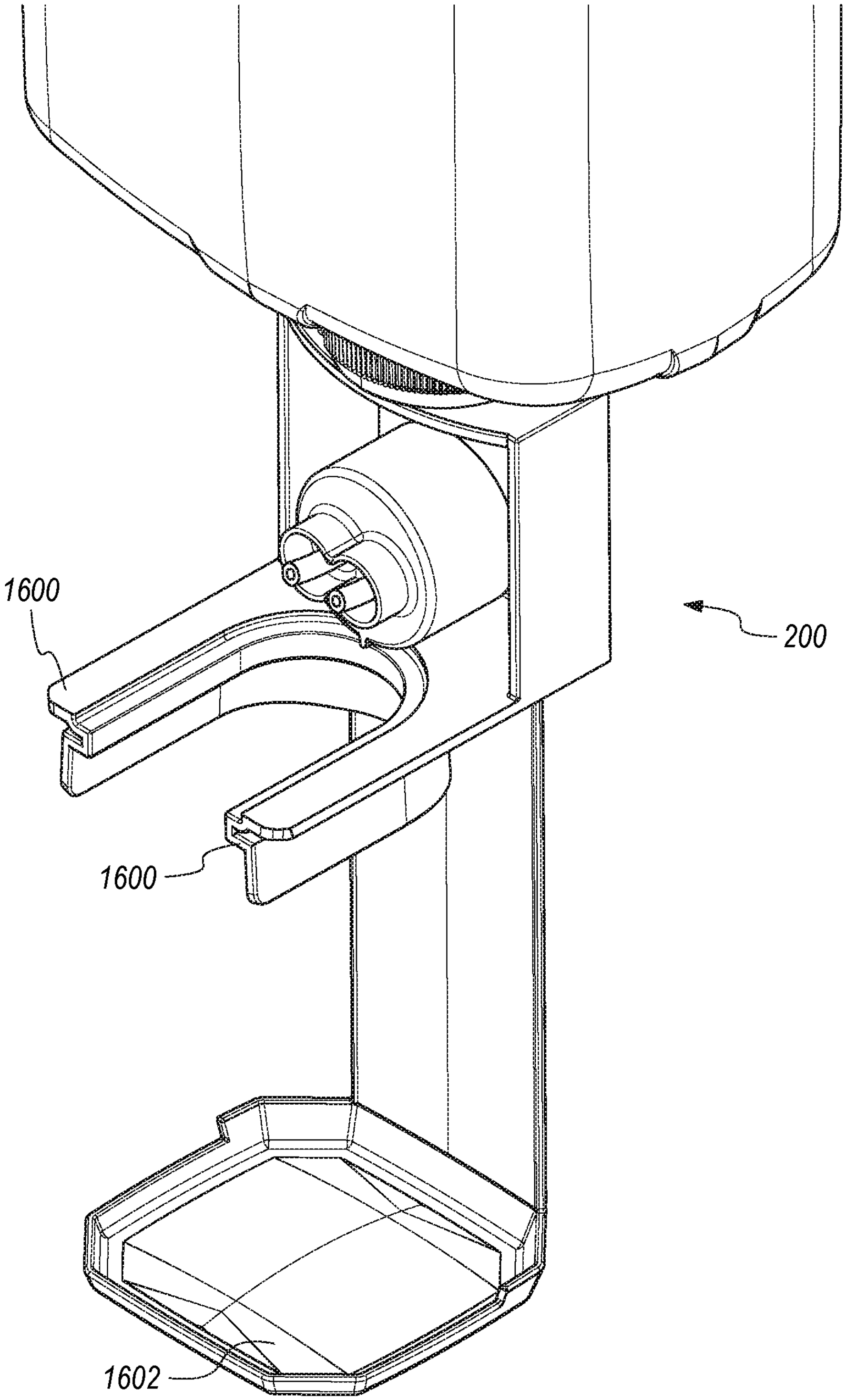
FIG. 16 is a detail view of the refilling station without the bottle.

In some examples, the valve assembly 1100 can be selectively movable between a first valve assembly position disabling the flow of material 402 from the refill reservoir 202 to the refillable bottle 104 and a second valve assembly position enabling the flow of material 402 from the refill reservoir 202 to the refillable bottle 104. The first valve assembly position is shown in FIGS. 14-16, while the second valve assembly position is shown in FIGS. 11-13. It is to be understood that the force 1102 can be used to selectively move the valve assembly 1100 from the first valve assembly position and the second valve assembly position. In some examples, the mass of the trigger sprayer bottle assembly 108 and a friction force between portions of the trigger sprayer bottle assembly 108 in contact with portions of the refilling assembly 200 are sufficient to overcome a biasing force of a biasing member 1106 (e.g., a spring force of a coil spring) of the valve assembly 1100. As such, the operator does not need to maintain the force 1102 upon the trigger sprayer bottle assembly 108 in order to maintain the coupling of the trigger sprayer bottle assembly 108 to the refilling assembly 200. In some examples, the trigger sprayer bottle assembly 108 can "click in" to position when the trigger sprayer bottle assembly 108 is coupled to the refilling assembly 200. As such, the operator does not need to maintain the force 1102 upon the trigger sprayer bottle assembly 108 in order to maintain the coupling of the trigger sprayer bottle assembly 108 to the refilling assembly 200.

In some examples, the refilling assembly 200 includes a second refill port 1200 through which the material 402 is removed from the refill reservoir 202. As shown in FIG. 12, the second refill port 1200 is selectively coupled to the first refill port 106 when the trigger sprayer bottle assembly 108 is selectively coupled to the refilling assembly 200. In other words, the second refill port 1200 can be placed into fluid communication with the first refill port 106 when the trigger sprayer bottle assembly 108 is selectively coupled to the refilling assembly 200. As with the previously described examples, the valve 120 can be mounted adjacent or within the first refill port 106 such that the valve 120 is in fluid communication with the first refill port 106 and can selectively limit or eliminate passage of fluids, liquids, etc. through the first refill port 106. Similarly, a second valve 1202 can be mounted adjacent or within the second refill port 1200 such that the second valve 1202 is in fluid communication with the second refill port 1200 and can selectively limit or eliminate passage of fluids, liquids, etc. through the second refill port 1200.

As shown in FIG. 12, the second valve 1202 is movable between a first valve position disabling flow of the material 402 through the second refill port 1200 and a second valve position enabling flow of the material 402 through the second refill port 1200. The second valve 1202 is in the first valve position when the trigger sprayer bottle assembly 108 is not coupled to the refilling assembly 200. The second valve 1202 is in the second valve position when the trigger sprayer bottle assembly 108 is coupled to the refilling assembly 200. The first valve position is shown in FIGS. 14-16, while the second valve position is shown in FIGS. 11-13.

The force 1102 can be used to actuate the valve assembly 1100 and the second valve 1202. The valve assembly 1100 can include a nose area 1204 and a tube 1206 extending from the nose area 1204 to the second valve 1202. A biasing member 1108 can urge a valve body 1110 and the tube 1206 away from the second valve 1202 in order to maintain the second valve 1202 in a closed position when the refillable bottle 104 is not coupled with (e.g., docked to) the refilling assembly 200. As such, the valve assembly 1100 can be considered to be normally closed until a portion of the sprayer pump 102 or the refillable bottle 104 act against the nose area 1204 to deflect the biasing member 1108, and open the second valve 1202 by simultaneously moving the tube 1206 into and through the second valve 1202 and into and through the valve 120 as shown in FIG. 12. FIG. 12 illustrates the valve assembly 1100 in the second valve assembly position (e.g., the open position) and the second valve 1202 in the second valve position (e.g., the open position).

FIG. 12 also illustrates a portion 1208 of the valve body 1110 extending inward toward a set of cooperating tabs 1210 located on the refilling assembly 200. Interaction between the portion 1208 and the cooperating tabs 1210 can limit motion of the valve body 1110 away from the refilling assembly 200 while maintaining the second valve 1202 in the closed position.

Returning to FIG. 6, as previously discussed, the first refill port 106 can be provided with the valve 120. In some examples, the trigger sprayer bottle assembly 108 includes the additional refill port 600 (now termed a third refill port 600 or vent port 600) through which air is removed from the refillable bottle 104. A third valve 604 is provided to cooperate with the third refill port 600. Each of the valve 120 and the third valve 604 can be moved to an open position by a nose portion of the tube 408 and the second tube 602, respectively. As previously described, the tube 408 and the second tube 602 extending to and are in fluid communication with the refill reservoir 202. It is to be understood that when the refillable bottle 104 is not coupled with the refilling assembly 200, the valve 120 and the third valve 604 can close again to eliminate leakage of the material 402. In some examples, the tubes 408, 602 have dedicated purposes, one for removal of air from the refillable bottle 104 while the tube 408 enables flow of the material 402 to the refillable bottle 104 for refilling purposes. In other examples, both air and fluid can pass in the same tube, either the tube 408 or the second tube 602, and in yet other examples, the flow of air and material can switch from one of the tubes 408, 602 to the other tube 408, 602. As such, the tube 408 and the second tube 602 are agnostic to the direction of flow and the material (e.g., gas or fluid) moving through the tubes 408, 602 to and from the refill reservoir 202 and the refillable bottle 104. The valve 120 and the additional third valve 604 can be in fluid communication with an internal manifold 606 that enables the material 402 to drop via power of gravity into the refillable bottle 104.

Returning to FIGS. 11 and 12, In some examples, the refilling assembly 200 includes a fourth refill port 1112 through which air is moved to the refill reservoir 202. Similar to the arrangement of the first refill port 106 and the second refill port 1200 shown in FIG. 12, the fourth refill port 1112 is selectively coupled to the third refill port 600 when the trigger sprayer bottle assembly 108 is selectively coupled to the refilling assembly 200. In other words, the fourth refill port 1112 can be placed into fluid communication with the third refill port 600 (shown in FIG. 6) when the trigger sprayer bottle assembly 108 is selectively coupled to the refilling assembly 200. As with the previously described examples, a fourth valve 1114 can be mounted adjacent or within the fourth refill port 1112 such that the fourth valve 1114 is in fluid communication with the fourth refill port 1112 and can selectively limit or eliminate passage of fluids, liquids, etc. through the fourth refill port 1112.

It is to be appreciated that the cross-section view of FIG. 12 passes through the first refill port 106, the valve 120, the tube 1206, the second refill port 1200, and the second valve 1202. While not all shown in FIGS. 11 and 12, similar or identical structures are associated with the arrangement of the third refill port 600 and the fourth refill port 1112. The force 1102 can be used to actuate the valve assembly 1100 and the fourth valve 1114. The valve assembly 1100 can include a nose area 1204 and a tube extending from the nose area 1204 to the fourth valve 1114. The biasing member 1108 can urge the valve body 1110 and the tube away from the fourth valve 1114 in order to maintain the fourth valve 1114 in a closed position when the refillable bottle 104 is not coupled with (e.g., docked to) the refilling assembly 200. As such, the valve assembly 1100 can be considered to be normally closed until a portion of the sprayer pump 102 or the refillable bottle 104 act against the nose area 1204 to deflect the biasing member 1108, and open the fourth valve 1114 by simultaneously moving the tube into and through the fourth valve 1114 and into and through the third valve 604.

In some examples, when the third refill port 600 is coupled to the fourth refill port 1112 and the second refill port 1200 is coupled to the first refill port 106, the refillable bottle 104 and the refill reservoir 202 comprise a sealed system wherein a volume of air removed from the refillable bottle 104 corresponds to a volume of the material 402 added to the refillable bottle 104.

Referring to FIG. 13, a cross-section view of the sprayer pump 102, the refillable bottle 104, and the refilling assembly 200 is illustrated. The valve assembly 1100 is shown in the second valve assembly position (e.g., the open position) such that material 402 from the refill reservoir 202 can move into the refillable bottle 104 while air is vented from the refillable bottle 104 to the refill reservoir 202 as part of a closed system.

Referring to FIGS. 14 and 15, a detail cross-section view of the valve assembly 1100 is illustrated in the first valve assembly position (e.g., the closed position). The valve body 1110 is urged to the left of the figure by the biasing member 1108 such that the tube 1206 is not engaged with or passing through the second valve 1202. As such, the material 402 in the refill reservoir 202 cannot, either through gravitational force or hydrostatic pressure, pass by or through the second valve 1202 to present an undesired leak or spill. It is worthy of note that the tube 1206 is curved such that a relative low point of the tube 1206 is not located at either end of the tube 1206. This arrangement helps limit and/or eliminate undesired leaks, drips, and spills from the refilling assembly 200.

Referring to FIG. 16, a detail view of the refilling assembly 200 without the refillable bottle 104 or the sprayer pump 102 is illustrated. The U-shaped arms portion 1600 can provide support, positive location, and potentially releasably secure the refillable bottle 104 to the refilling assembly 200 during a refill operation or during a desired storage time. The refilling assembly 200 can also include a horizontal surface 1602 to locate the refillable bottle 104 during the refilling operation.

Figure 17:
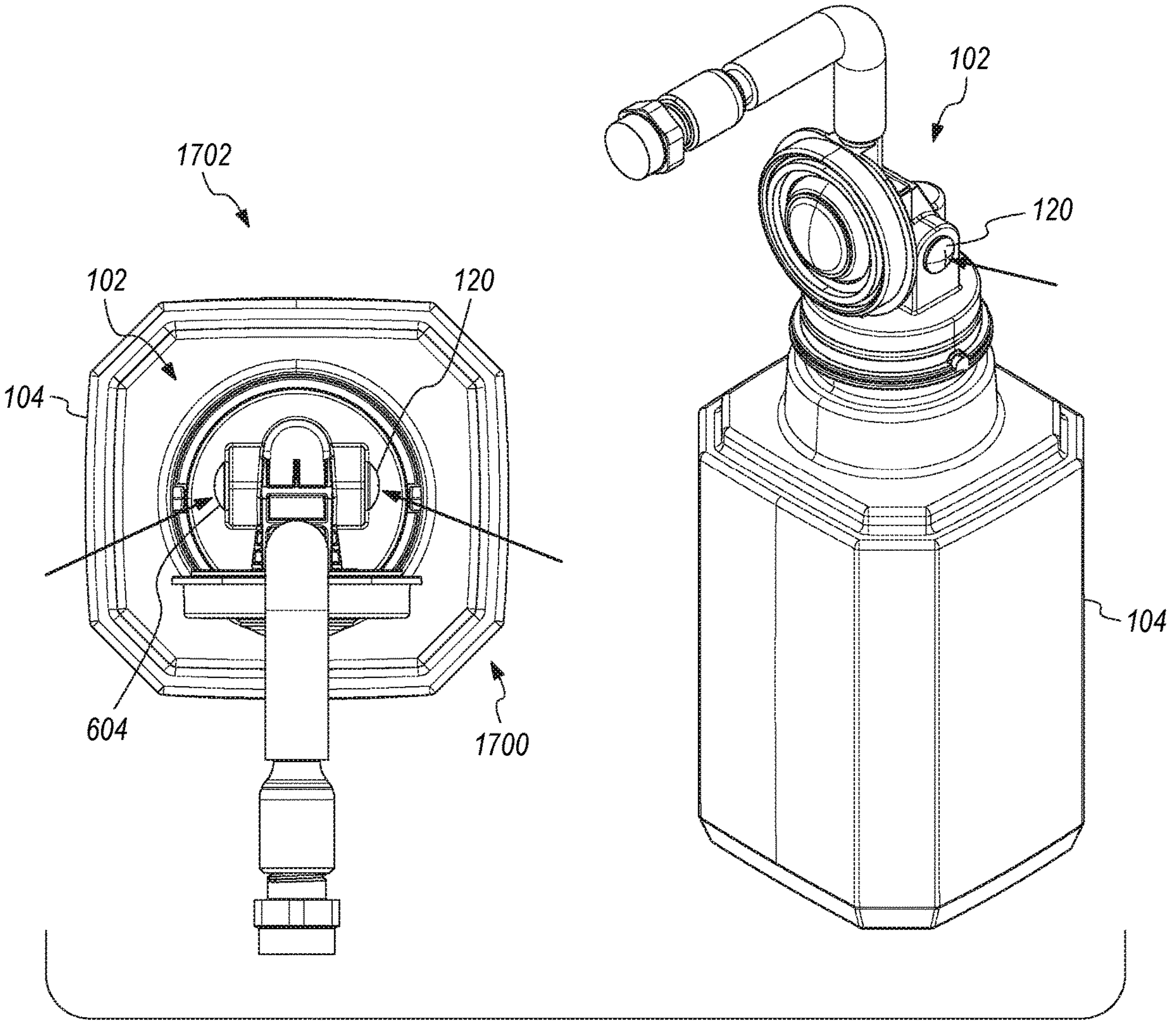
FIG. 17 is a perspective view of the dome trigger sprayer pump and septum valves on either side of the dome trigger sprayer pump.

Referring to FIG. 17, a perspective view of an example dome trigger sprayer pump 102 is illustrated. In some examples, the sprayer pump 102 can include the valve 120 (e.g., a septum valve) located on a lateral side 1700 rather than the rear side 1702 of the sprayer pump 102. As with other examples, the third valve 604 can be included on the sprayer pump 102 to vent air from the refillable bottle 104 during the refilling operation.

Figure 18:
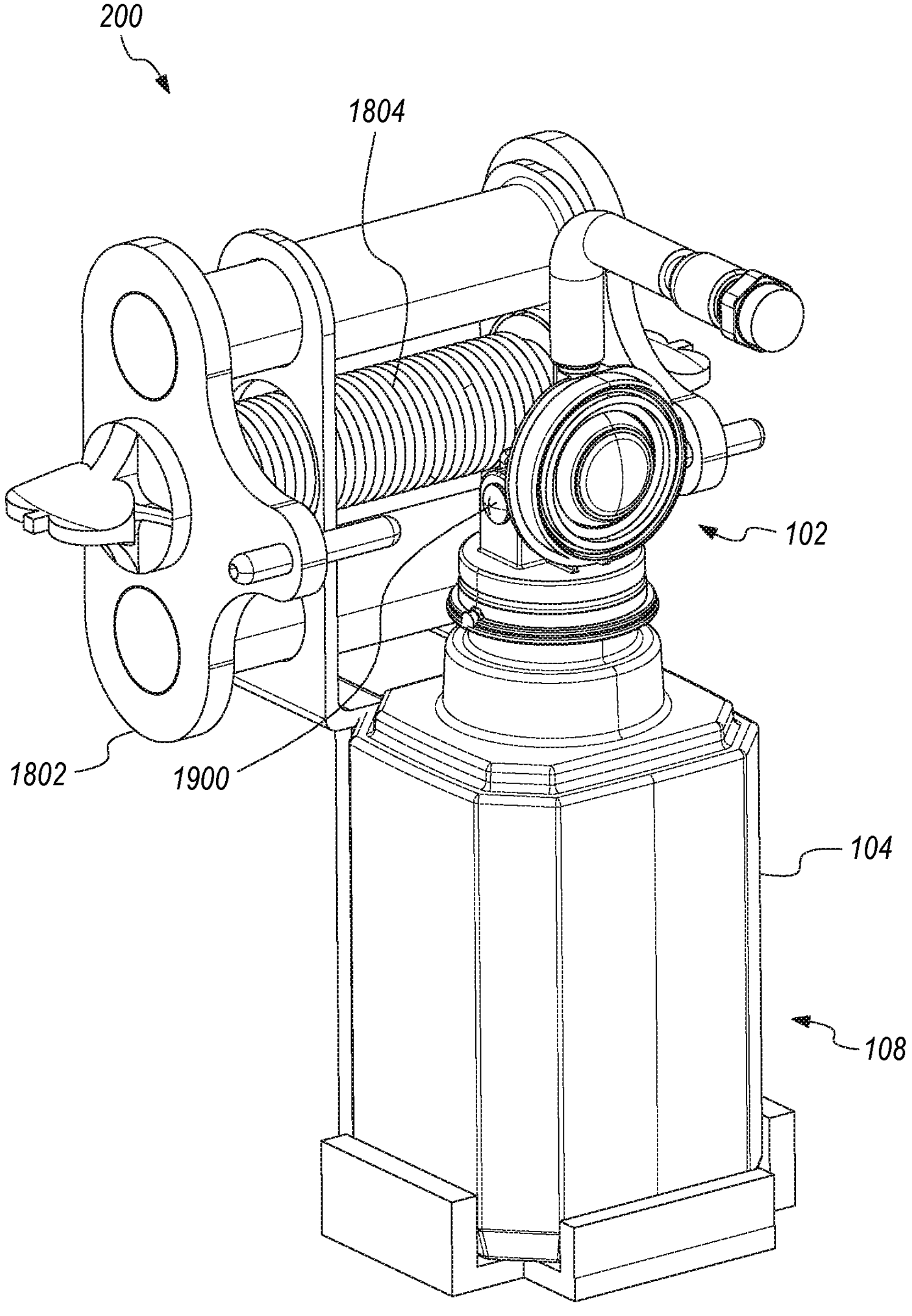
FIG. 18 is a perspective view of a trigger sprayer pump and a bottle attached to an example refilling assembly.
Figure 20:
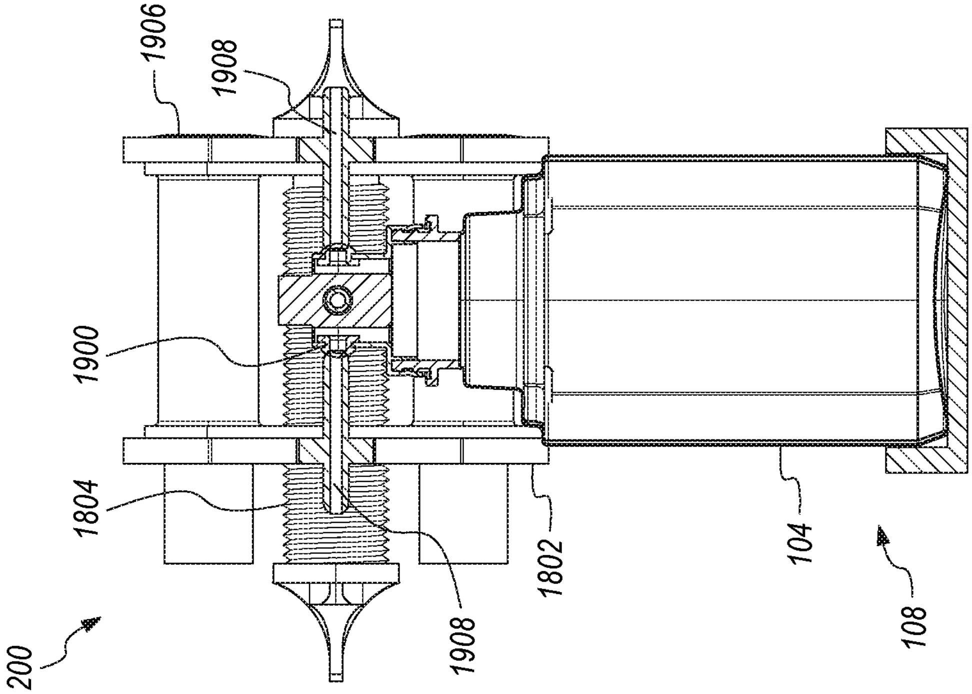
FIG. 20 is similar to FIG. 19 showing the refilling assembly in a closed position.
Figure 19:
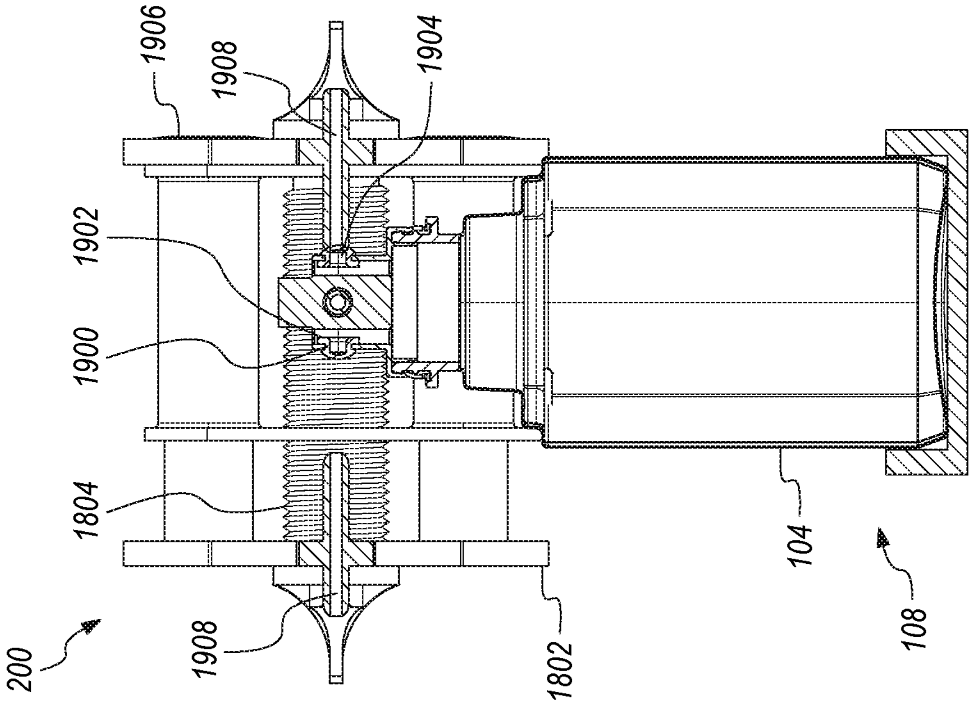
FIG. 19 is a partial cross section view of the apparatus of FIG. 18 with the refilling assembly in an open position.

Referring to FIGS. 18-20, an example system for refilling a trigger sprayer bottle assembly 108 is illustrated. In some examples, a mechanism 1802 includes a threaded member 1804. Rotation of the threaded member 1804 moves the mechanism 1802 from the first position (shown in FIGS. 18 and 19) to the second position (shown in FIG. 20). As the threaded member 1804 rotates, the mechanism 1802 moves from left to right in FIGS. 19 and 20 to engage the septum valve 1900 associated with the first refill port 1902. A septum valve 1904 opposite the septum valve 1900 is engaged by a stationary mechanism 1906. As with previous examples, engagement of septum valves 1900, 1904 enables flow of material from a refill reservoir 202 (not shown in FIGS. 18-20) to the refillable bottle 104. The described mechanism can promote the use of mechanical advantage to couple the trigger sprayer bottle assembly 108 to the refilling assembly 200. While not shown any suitable tubing piping, etc. can be used to attach the ends of the feed tubes 1908 with the refill reservoir 202 to enable passage of the material 402 from the refill reservoir 202 to the refillable bottle 104.

Figure 21:
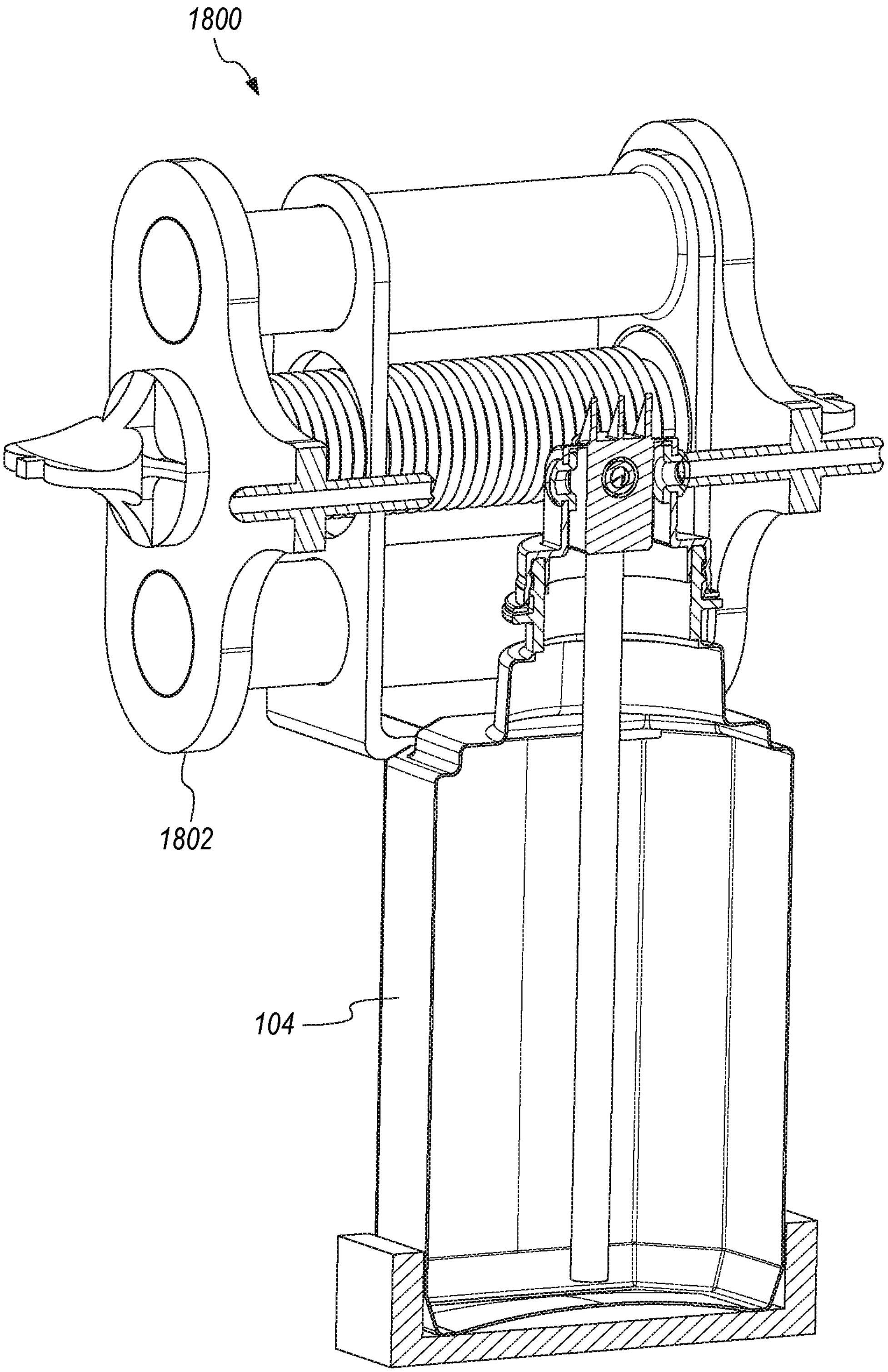
FIG. 21 is similar to FIG. 20.

Referring to FIG. 21, a partial cross section view of the example system for refilling a trigger sprayer bottle assembly 1800 is illustrated. The mechanism 1802 is shown in the closed position (e.g., flow of the material 402 from the refill reservoir 202 into the refillable bottle 104 is disabled).

Figure 22:
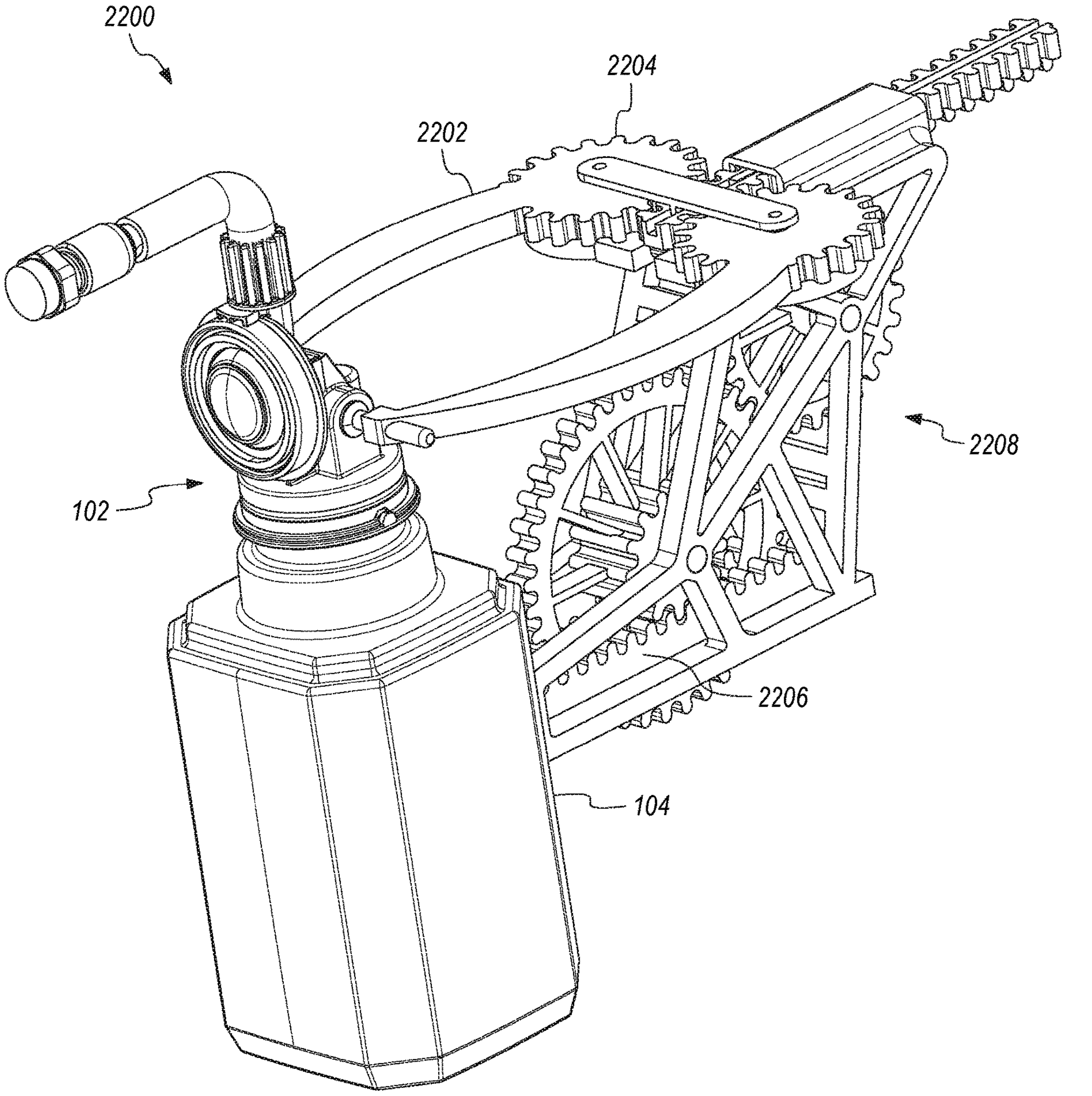
FIG. 22 is a perspective view of a trigger sprayer pump and a bottle attached to an example refilling assembly.
Figure 23:
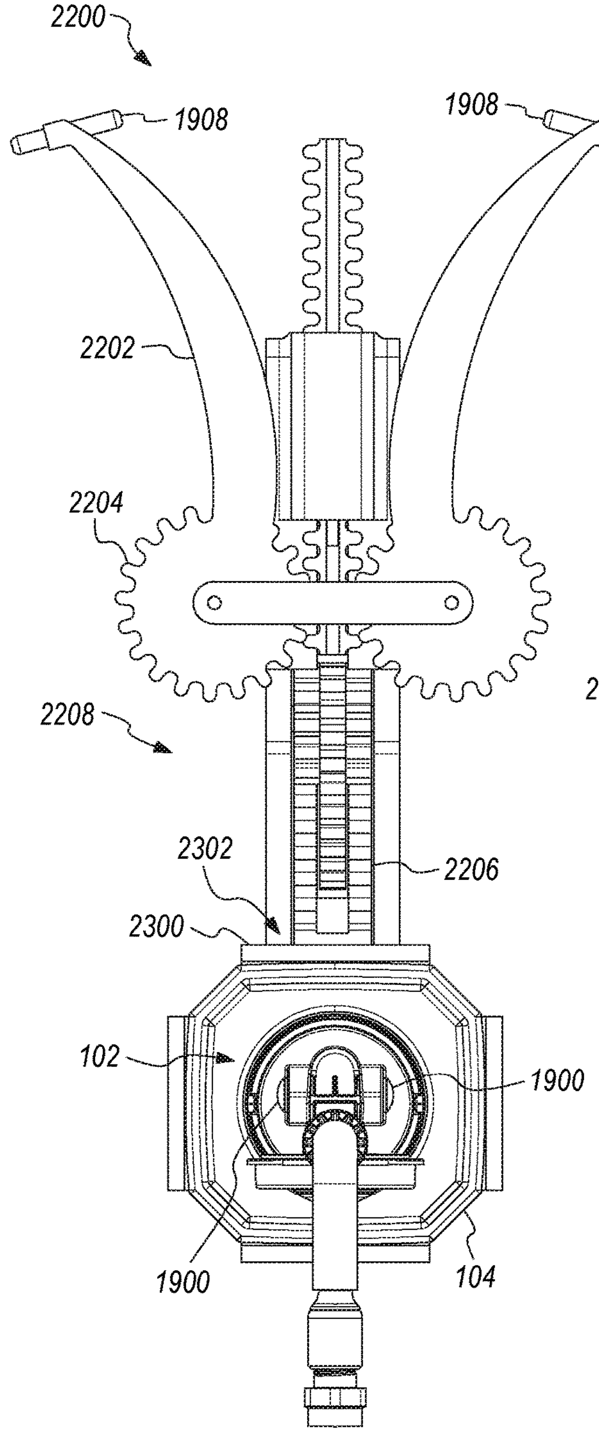
FIG. 23 is a plan view of the apparatus of FIG. 22 in an open position.
Figure 24:
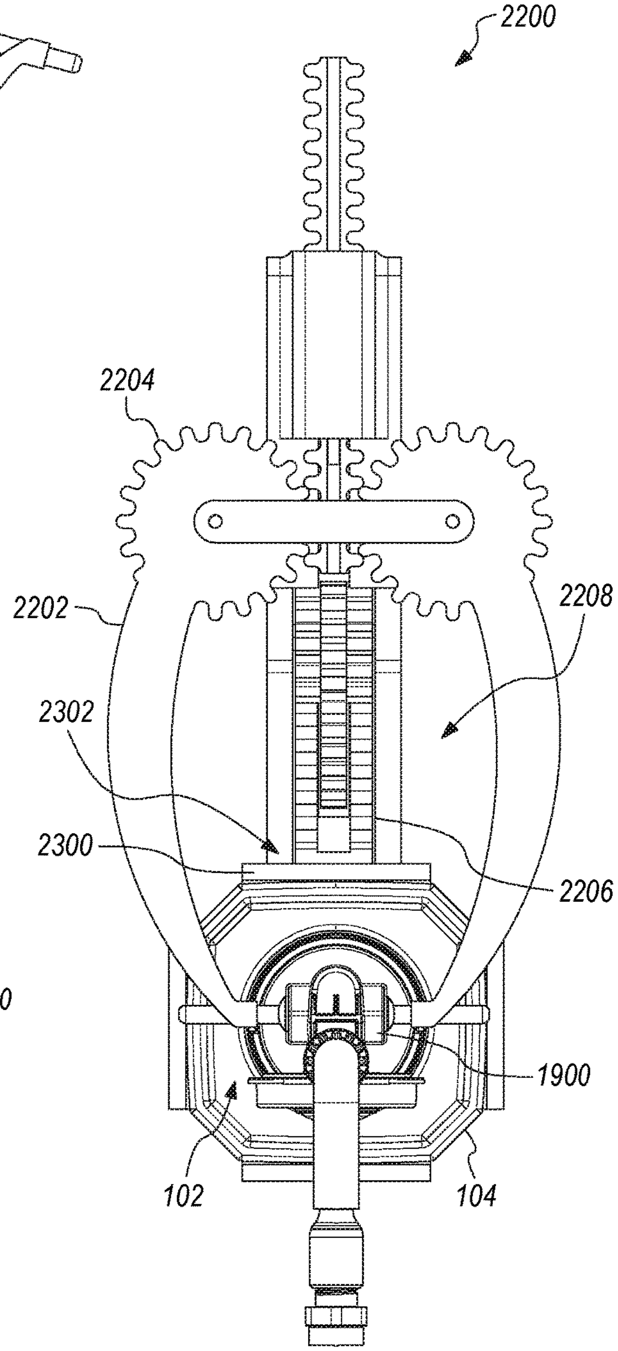
FIG. 24 is similar to FIG. 23 showing a closed position.

Referring to FIGS. 22-24, another example system for refilling a trigger sprayer bottle assembly 2200 is illustrated.

In some examples, a mechanism 2202 includes a gear member 2204 wherein rotation of the gear member 2204 moves the mechanism 2202 from the first position (e.g., the closed position with flow of the material 402 disabled as shown in FIG. 23) to the second position (e.g., the open position with flow of the material 402 enabled as shown in FIG. 24). As shown, a force applied by an operator on at least one of the refillable bottle 104 or the sprayer pump 102 urges the trigger sprayer bottle assembly 108 against a contact plate 2300. The contact plate 2300 is physically connected to a toothed member 2206 (e.g., around location 2302). The force urges the toothed member 2206 away from the refillable bottle 104. As the toothed member 2206 translates away from the refillable bottle 104, the teeth cooperate with a gear train 2208. The gear train 2208 rotates the mechanism 2202 into engagement with the septum valves on either side of the sprayer pump 102 to enable the refill operation of the refillable bottle 104. This arrangement can provide mechanical advantage to help ensure the feed tubes 1908 pass into and through the valves 1900 associated with a number of refill ports defined by the sprayer pump 102.

Figure 25:
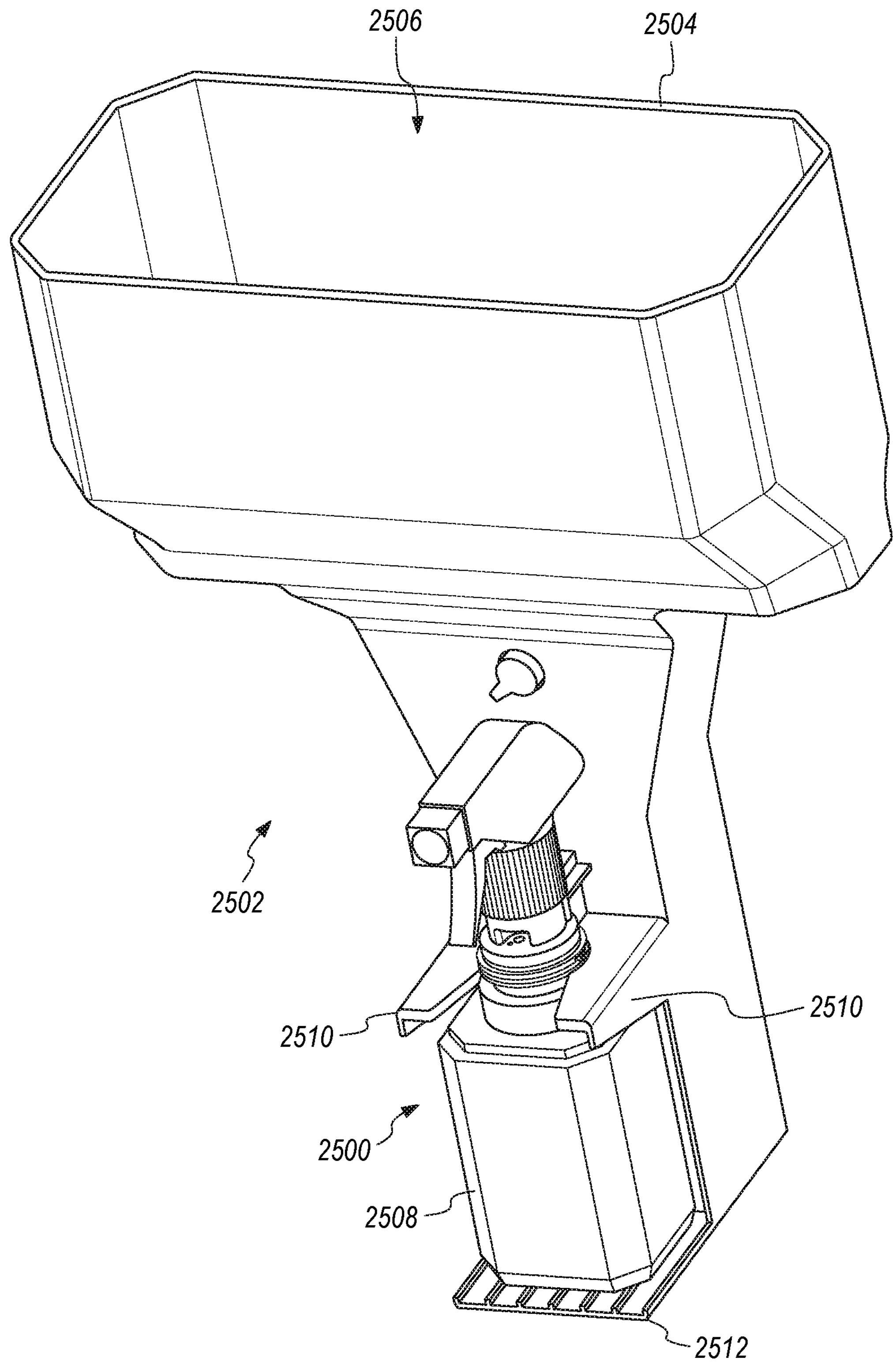
FIG. 25 is a perspective view of a trigger sprayer bottle assembly including an adapter, the trigger sprayer bottle assembly coupled to a refilling assembly.

Referring to FIG. 25, a perspective view of an example trigger sprayer bottle assembly 2500 coupled to a refilling assembly 2502 is illustrated. In some examples, the refilling assembly 2502 includes a refill reservoir 2504. The refill reservoir 2504 can define an internal volume 2506 configured to hold an amount of the material 402 that will be used to refill a refillable bottle 2508. In some examples, the refill reservoir 2504 can be used as an open top reservoir wherein the material 402 is exposed to the surrounding atmosphere. In some examples, the refill reservoir 2504 is configured to hold a bulk refill container. In still other examples, the refill reservoir 2504 is configured to be a part of a closed system together with the refillable bottle 2508 and structure (e.g., tubes, valves, etc.) enabling fluid communication between the refillable bottle 2508 and the refill reservoir 2504. In the described closed or sealed system, a volume of air removed from the refillable bottle 2508 corresponds to a volume of the material 402 added to the refillable bottle 2508.

As with previously described examples of refilling assemblies, a set of U-shaped arms 2510 can provide support, positive location, and potentially releasably secure the refillable bottle 2508 to the refilling assembly 2502 during a refill operation or during a desired storage period for the trigger sprayer bottle assembly 2500. Additionally, the refilling assembly 2502 can also include a horizontal surface 2512 to locate and/or support the refillable bottle 2508 during the refilling operation. The engineering design and manufacturing process for the refilling assembly 2502 can help ensure that the trigger sprayer bottle assembly 2500 is properly located to promote a proper refilling process. The refilling assembly 2502 can be composed of any suitable material including, but not limited to: plastic, composites, metal, combinations of materials, etc.

Figure 26:
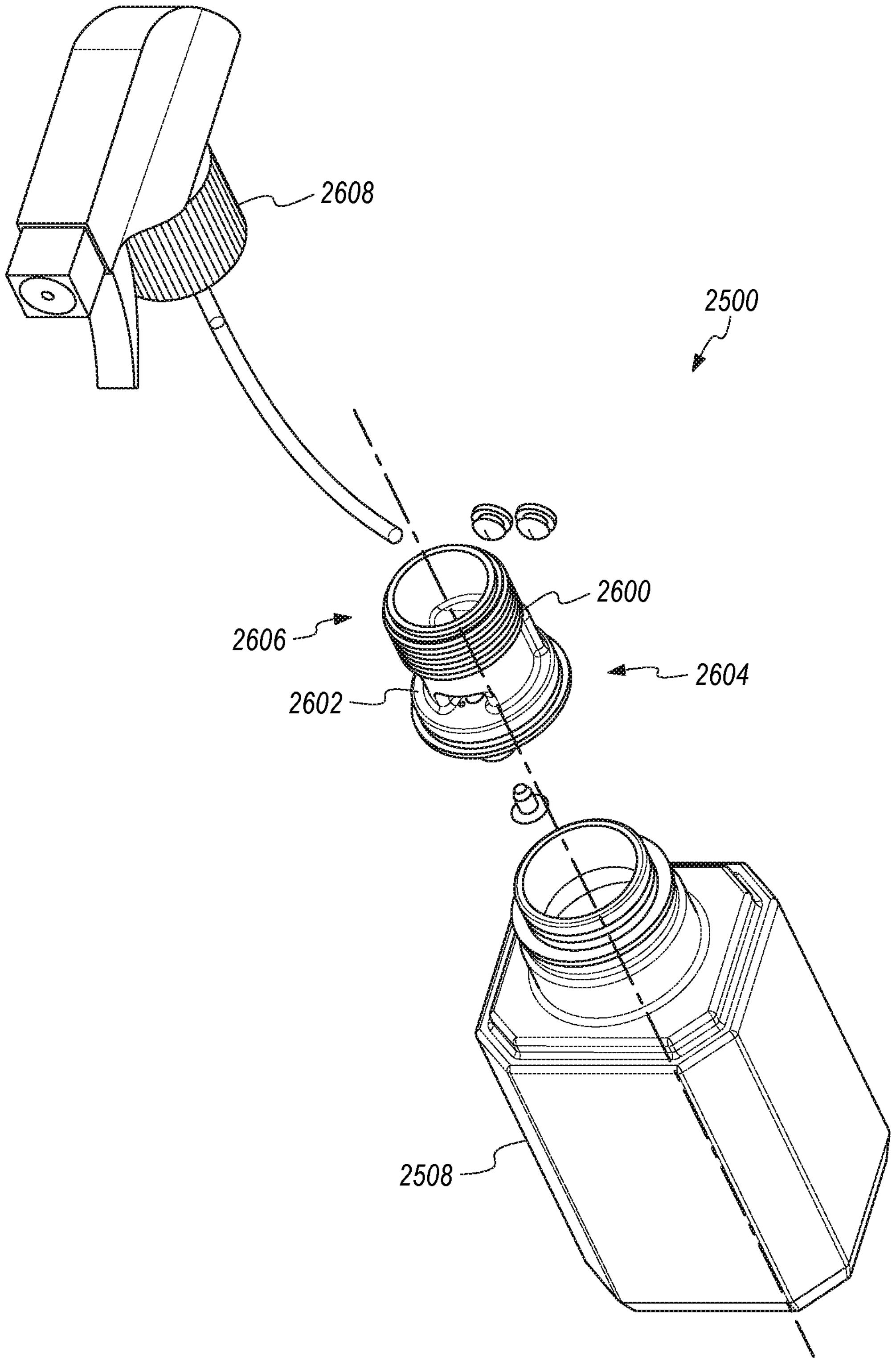
FIG. 26 is an exploded view of an example trigger sprayer bottle assembly.

Referring to FIG. 26, an exploded view of a trigger sprayer bottle assembly 2500 is illustrated. The trigger sprayer bottle assembly 2500 includes the refillable bottle 2508 and an adapter 2600 that is a feature or characteristic of the trigger sprayer bottle assembly 2500. The adapter 2600 includes an adapter body 2602 that extends from a first end 2604 to a second end 2606. The first end 2604 includes a first structure to selectively attach the adapter body 2602 to the refillable bottle 2508. In some examples, the first end 2604 is configured to attach the adapter body 2602 to a relatively large number of refillable bottle types, regardless of the attachment structure (e.g., screw thread types, sizes, etc.) that the refillable bottle 2508 employs. The second end 2606 includes a second structure configured to attach the adapter body 2602 to a trigger sprayer 2608 of the trigger sprayer bottle. The adapter 2600 can include a Attaching the adapter 2600 to the trigger sprayer 2608 and the refillable bottle 2508 can convert the trigger sprayer bottle into a trigger sprayer bottle assembly 2500 wherein the refillable bottle 2508 can be refilled without removing the trigger sprayer as one normally would. Elimination of the removal and re-attachment process of the trigger sprayer 2608 can save time, money, and effort and promote relatively fast, neat, and repeatable refilling operations for the refillable bottle 2508.

Figure 27:
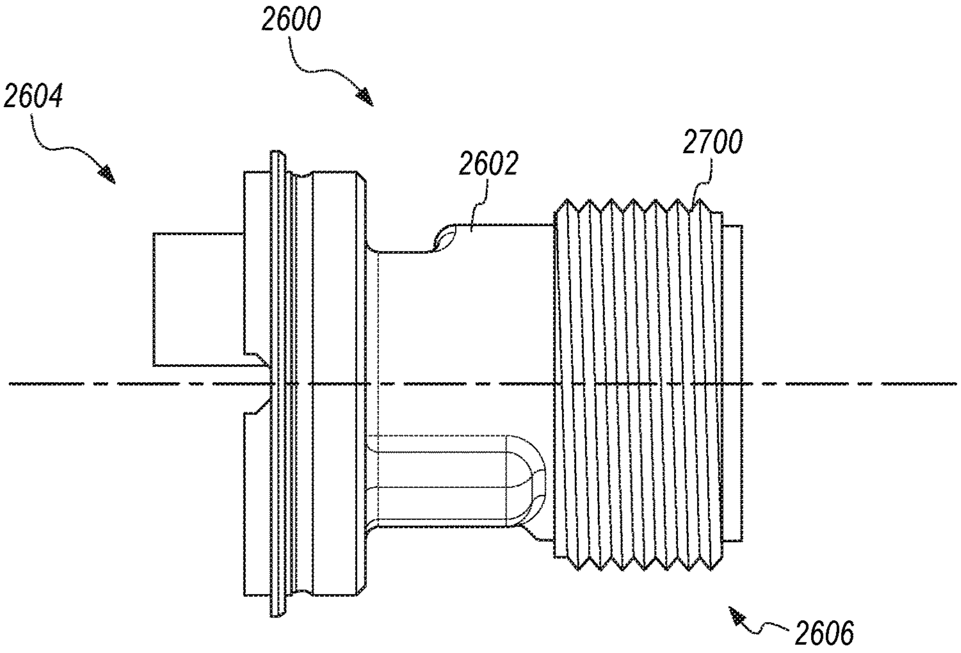
FIG. 27 is a side view of an adapter of the trigger sprayer bottle assembly.

Referring to FIG. 27, a side view of the adapter 2600 of the trigger sprayer bottle assembly 2500 is illustrated. In some examples, the first end 2604 includes a first structure that can include a female fitting configured to fit around the outside diameter of a top portion of the refillable bottle 2508, similar to the trigger sprayer 2608 interaction with the refillable bottle 2508 of typical trigger sprayer assemblies. The second end 2606 includes a second structure 2700 (e.g., a threaded portion) configured to attach the adapter body 2602 to the trigger sprayer 2608. In some examples, the second structure 2700 can be a reproduction of an external threaded portion found on a top portion of the refillable bottle 2508. However, the threaded portion is not meant to be limiting, and any suitable attachment structure or methods are acceptable for use with the devices and methods of the present disclosure.

Figure 28:
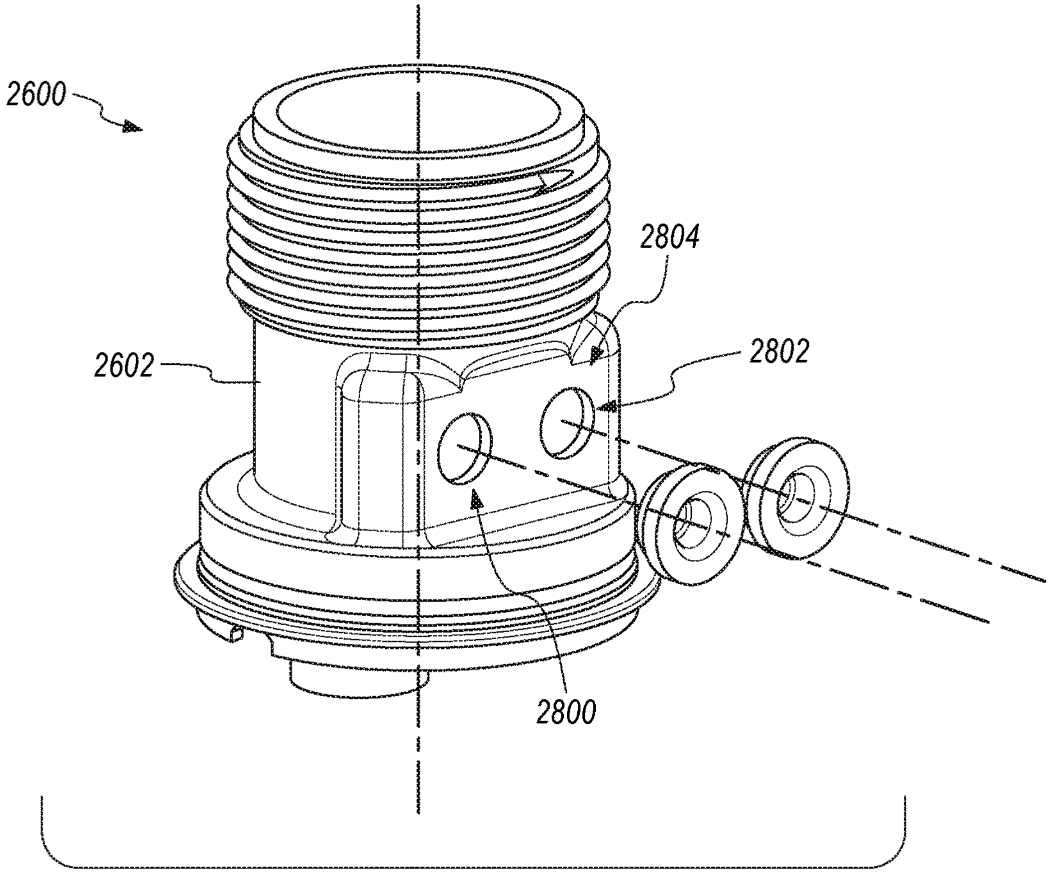
FIG. 28 is a perspective view of the adapter showing a refill port and a vent port with a refill valve and a vent valve.

Referring to FIG. 28, a perspective view of the adapter 2600 is illustrated. The adapter body 2602 defines a refill port 2800 through which the material 402 is added to the refillable bottle 2508. The adapter body 2602 also defines a vent port 2802 through which air is removed from the refillable bottle 2508. In some examples, the adapter body 2602 is cylindrical in shape. In some examples, the adapter body 2602 includes a boss section 2804 to provide a generally flat surface for the refill port 2800 and the vent port 2802. As noted with previous examples, the term "air" is meant to include the ordinary meaning of air and any other suitable gas, fluid, gas mixtures, gas-fluid mixtures, etc. that may occupy an interior volume of the refillable bottle 2508 that is not occupied by the material 402.

Figure 29:
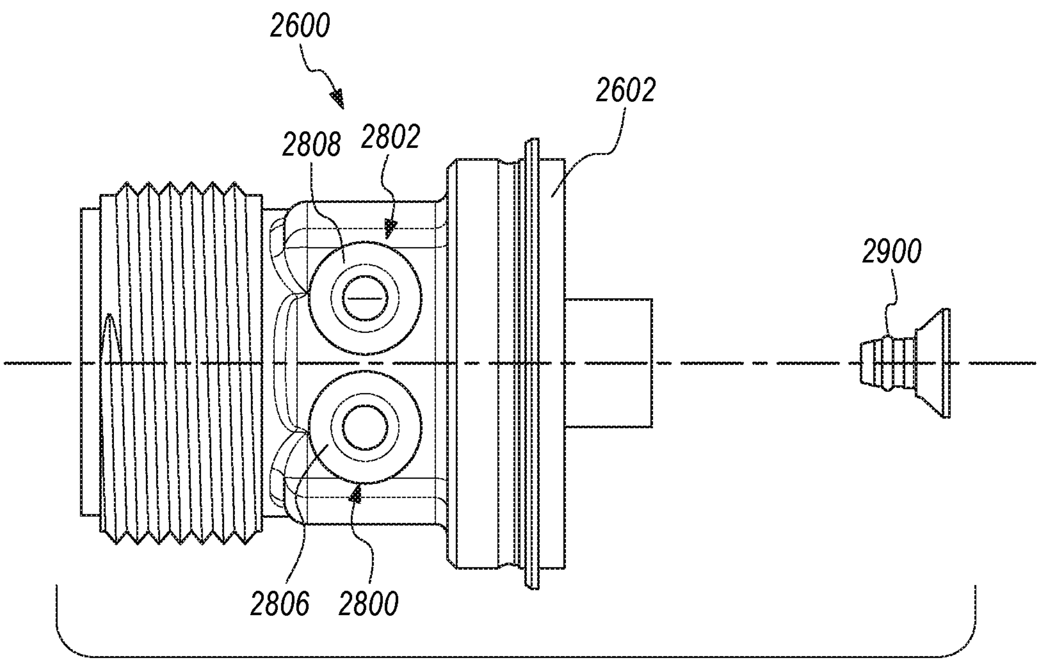
FIG. 29 is a side view of the adapter showing placement of the refill valve and the vent valve.

The adapter 2600 also includes a refill valve 2806 attached to the adapter body 2602 at the refill port 2800. As with previously described examples, the refill valve 2806 can be a slit valve, a septum valve, etc. constructed of silicone. However, any suitable valve can be used with the present disclosure. The refill valve 2806 can be selectively opened and closed as will be further described below. The adapter 2600 also includes a vent valve 2808 attached to the adapter body 2602 at the vent port 2802. The vent valve 2808 can be a slit valve, a septum valve, etc. constructed of silicone. However, any suitable valve can be used with the present disclosure. The vent valve 2808 can be selectively opened and closed as will be further described below. In some examples, the Referring to FIG. 29, a side perspective view of the adapter 2600 is illustrated. The refill valve 2806 and the vent valve 2808 are shown attached to the adapter body 2602 at the refill port 2800 and the vent port 2802, respectively. In this view, the slit(s) defined by the refill valve 2806 and the vent valve 2808 are visible and mark the separation line where the valves 2806, 2808 open and close when acted upon by a force. FIG. 29 also shows an air inlet valve 2900 that will be further described below.

Figure 30:
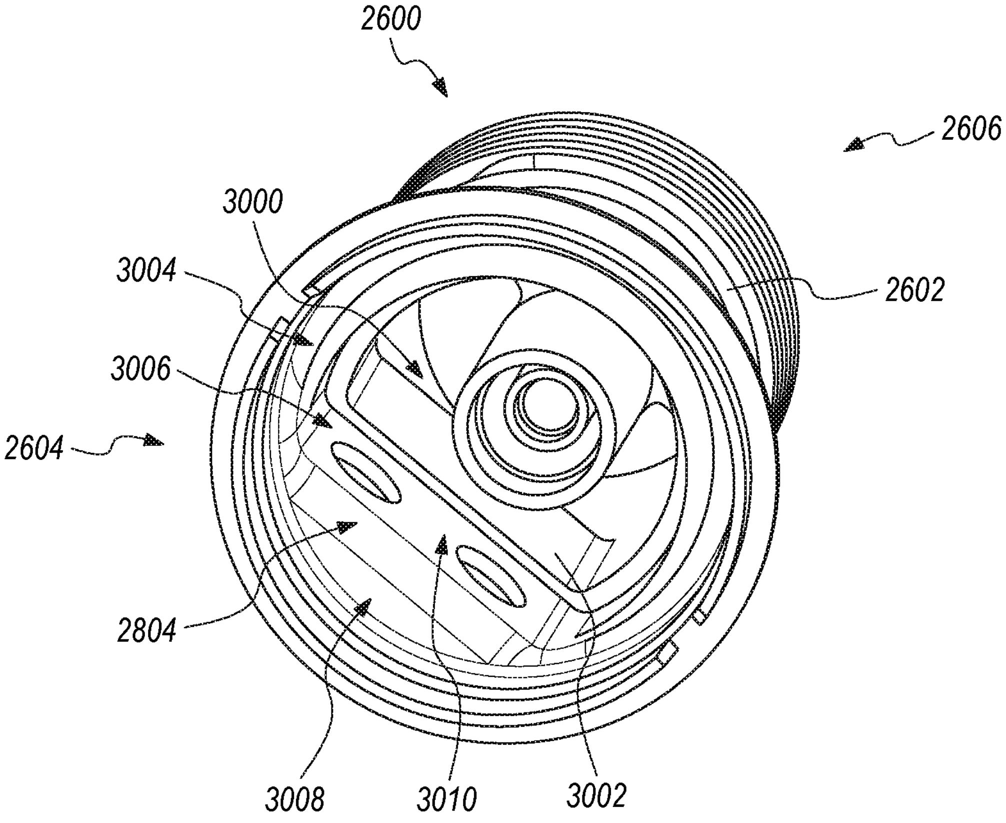
FIG. 30 is a perspective view of the adapter showing a wall.

Referring to FIG. 30, an end perspective view of the adapter 2600 is illustrated. The adapter body 2602 defines an aperture 3000 extending from the first end 2604 to the second end 2606. When the adapter body 2602 is attached to the refillable bottle 2508 and to the trigger sprayer 2608, the refillable bottle 2508 is in fluid communication with the trigger sprayer 2608 through the aperture 3000.

FIG. 30 also shows a wall 3002 within the aperture 3000, the wall 3002 extending from a first portion 3004 of the adapter body 2602 to a second portion 3006 of the adapter body 2602. The wall 3002 and an interior surface 3008 of the adapter body 2602 define a volume 3010 that is in fluid communication with the refill port 2800. In some examples, the wall 3002 is parallel to the boss section 2804 and defines the volume 3010 extending from the first portion 3004 of the adapter body 2602 toward the first end 2604 of the adapter body 2602. The air inlet valve 2900 is not shown in place in FIG. 30.

Figure 31:
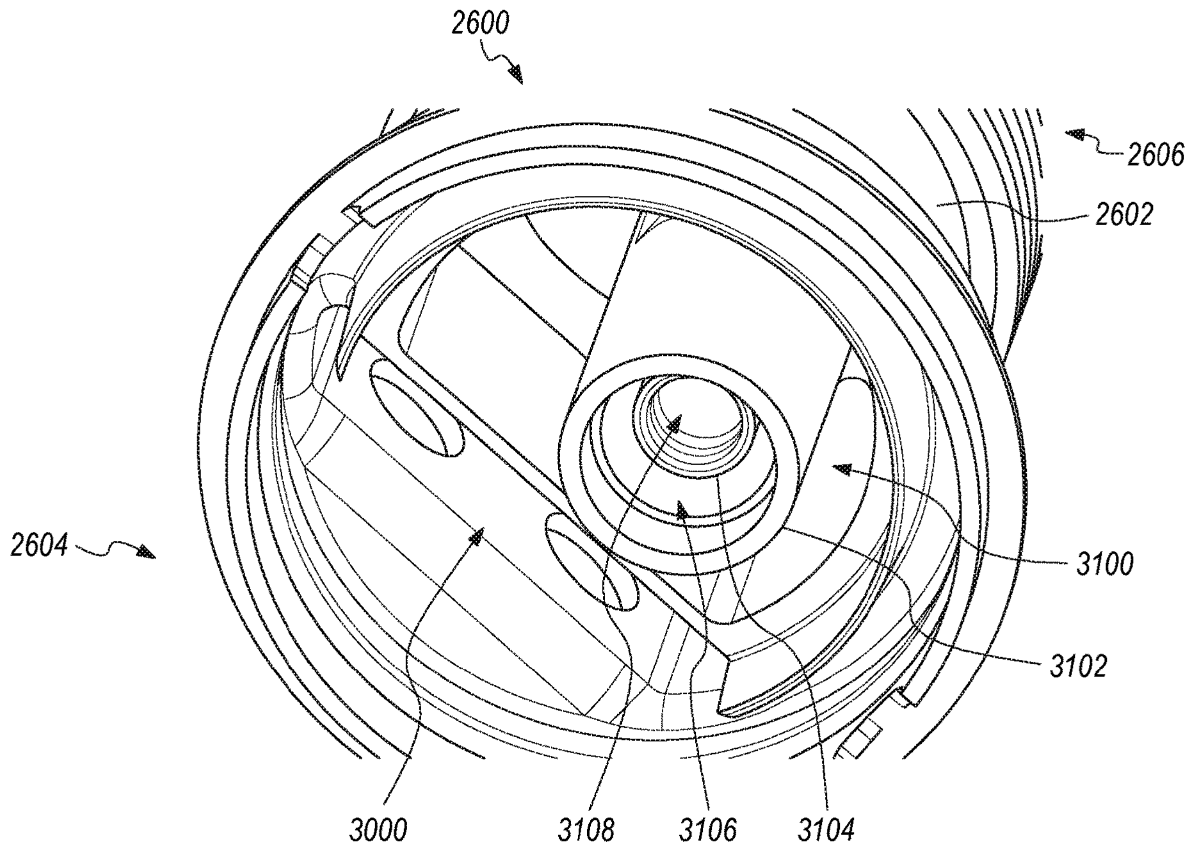
FIG. 31 is a detail view of FIG. 30.

Referring to FIG. 31, a detail view of FIG. 30 is illustrated. In some examples, an air inlet structure 3100 is located at least partially within the aperture 3000, As shown, the air inlet structure 3100 can be cylindrical and can be connected to the interior of the adapter body 2602. The air inlet structure 3100 and the adapter body 2602 can be constructed of a single, unitary piece, such as molded plastic or another suitable material. As described previously, some trigger sprayer bottles benefit from an intake of small amounts of air from an exterior volume relative to the refillable bottle 2508 to an interior volume relative to the refillable bottle 2508 in order to alleviate partial vacuum effects of dispensation of the material 402 from the refillable bottle 2508. The air inlet structure 3100 can include a first cylinder 3102 and a second cylinder 3104 that is concentric to the first cylinder 3102. The first cylinder 3102 and the second cylinder 3104 are constructed of relatively thin walls such that there is an annular volume 3106 defined between the first cylinder 3102 and the second cylinder 3104. A central volume 3108 is defined by an interior surface of the second cylinder 3104. FIG. 31 shows various ridges and depressions within the first cylinder 3102 and the second cylinder 3104 that are used to mate with and mount the air inlet valve 2900 (shown in FIG. 29).

Figure 32:
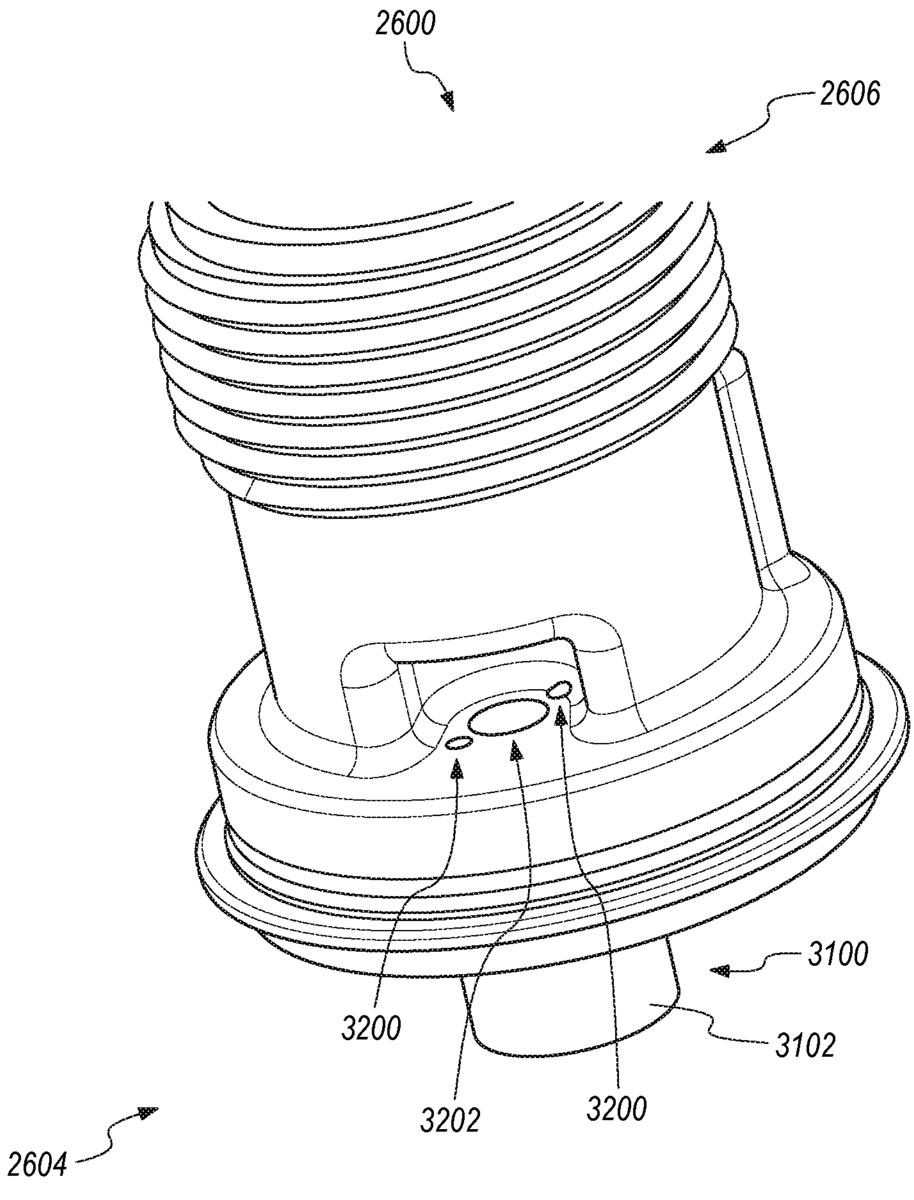
FIG. 32 is a detail view of the adapter showing the air inlet port.

Referring to FIG. 32, a detail view of the adapter 2600 showing the air inlet port 3200 is illustrated. In some examples, a portion of the adapter 2600 defines the air inlet port 3200. During typical operation of some trigger sprayer bottles, the dispensing of material from a bottle can tend to create a negative pressure within the trigger sprayer bottle if an amount of air is not permitted to enter the trigger sprayer bottle. In some examples, the refillable bottle 2508 may have an air inlet to alleviate the negative pressure as needed. In some examples, the adapter 2600 defines an air inlet port 3200 to alleviate potential negative pressure issues. As shown in FIG. 32, the air inlet port 3200 can be a relatively small aperture defined by a portion of the adapter 2600, and a plurality of air inlet ports 3200 may be used. For ease of manufacturing, a comparatively larger aperture 3202 is also defined by the adapter 2600.

The air inlet port 3200 and the larger aperture 3202 work in conjunction with the air inlet structure 3100 (shown in FIG. 31). The air inlet port 3200 is in fluid communication with the annular volume 3106 (shown in FIG. 31), that is to say, the air inlet port 3200 is a through-hole that passes through the adapter body 2602 and into the annular volume 3106. Similarly, the larger aperture 3202 is in fluid communication with the central volume 3108, that is, the larger aperture 3202 is a through-hole that passes through the adapter body 2602 and into the central volume 3108. In some examples, the air inlet structure 3100 extends from the air inlet port 3200 toward the first end 2604 of the adapter body 2600. In some examples, the air inlet structure 3100 extends past the first end 2604 of the adapter body 2600.

Figure 33:
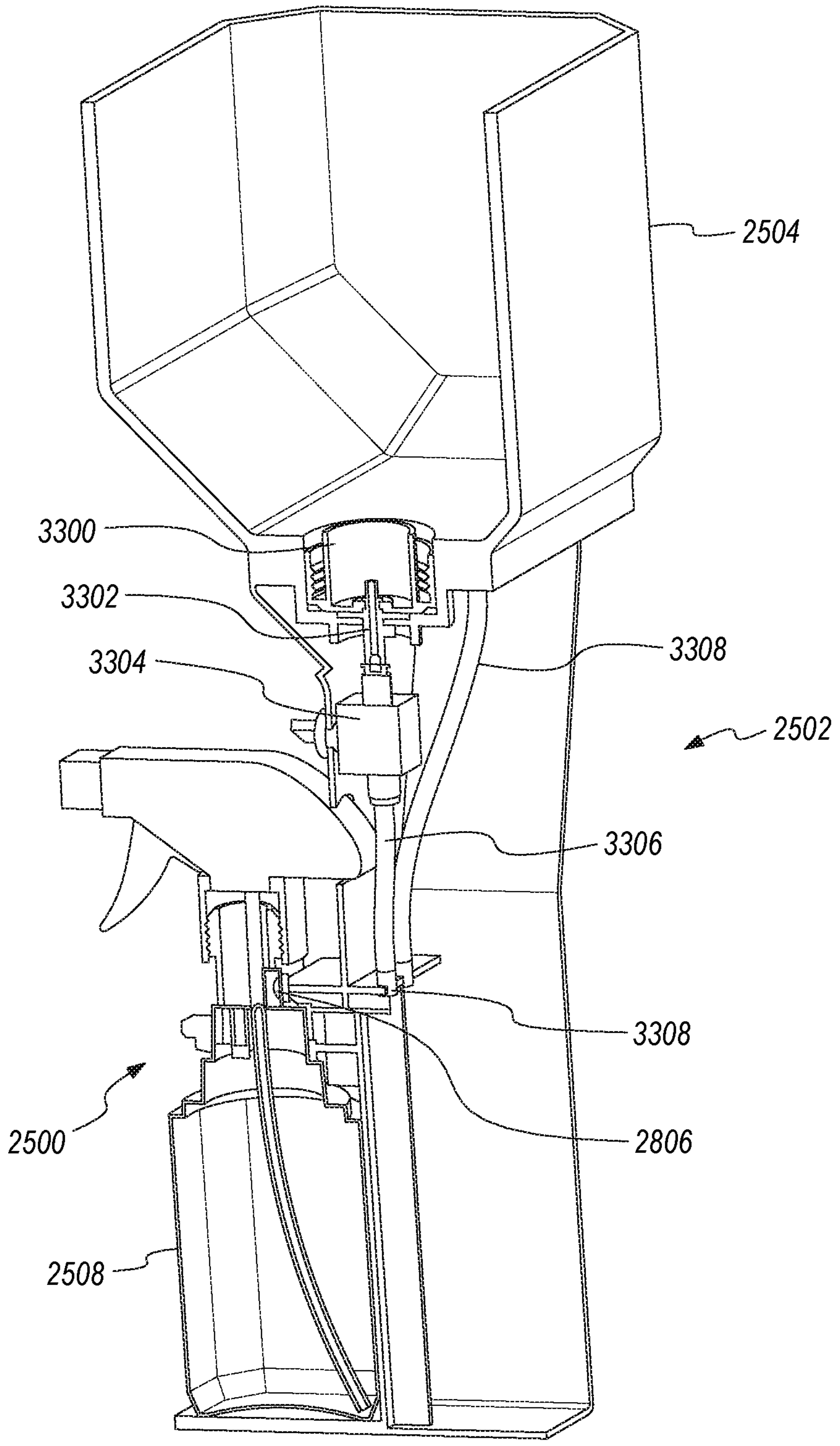
FIG. 33 is a cross-section view of the trigger sprayer bottle assembly coupled to the refilling assembly.

Referring to FIG. 33, a cross-section view of the trigger sprayer bottle assembly 2500 coupled to the refilling assembly 2502 is illustrated. As previously discussed, the material 402 is loaded into the refill reservoir 2504. In some examples, the material 402 is stored in a bulk container (not shown), and the bulk container is configured to cooperate with the fitting 3300. In some examples, the bulk refill container can include a threaded neck that cooperates with internal threads of the fitting 3300 to secure the bulk refill container to the refill reservoir 2504 and promote a leak-free seal with a connector 3302 (e.g., a conduit or a tube). The connector 3302 provides fluid communication and a flow path for the material 402 from the fitting 3300 to a control valve 3304. The control valve 3304 can be used to control the flow of the material 402 and prevent leaks or spills of the material 402 when the trigger sprayer bottle assembly 2500 is not coupled to the refilling assembly 2502. In some examples, the control valve 3304 is a manual valve that an operator moves from a first position (e.g., a closed position in which a flow of the material 402 is disabled) to a second position (e.g., an open position in which a flow of the material 402 is enabled). In other examples, the control valve 3304 can be automatically operated.

A second connector 3306 (e.g., a conduit or a tube) is connected to the control valve 3304 and the second connector 3306 provides fluid communication and a flow path for the material 402 from the control valve 3304 to a tube 3308. The tube 3308 provides fluid communication and a flow path for the material 402 from the second connector 3306 to the refill valve 2806 where a nose end of the tube 3308 imparts a force on the refill valve 2806 and opens the refill valve 2806 such that the refill reservoir 2504 is in fluid communication with the refillable bottle 2508. Thus, when the control valve 3304 is in an open position, the material 402 will flow via the effects of gravity to refill the refillable bottle 2508. When the control valve 3304 is closed, the flow of the material 402 will stop. In some examples, the control valve 3304 can be a "normally closed" valve such that when an operator is not urging the control valve 3304 to an open position, the control valve 3304 will revert to the closed position to stop the flow of the material 402.

While not shown in FIG. 33, air will vent from the refillable bottle 2508 during the refilling operation and escape through the vent port 2802. The air then passes through the vent valve 2808 that is in the open position due to the tube 3310 urging the vent valve to the open position while the trigger sprayer bottle assembly 2500 is coupled to the refilling assembly 2502. The air then passes through the tube 3310 and into the vent tube 3312. In some examples, the vent tube 3312 enables the air to vent directly to atmosphere. When vented to atmosphere, there are cases when the vent tube 3312 is arranged to terminate at an elevation that is above the highest fluid level in the refill reservoir or the highest fluid level in the bulk refill container. In some closed systems, the vent tube 3312 will terminate in the refill reservoir 2504 that is sealed from the outside environment or the bulk refill container that is sealed from the outside environment.

Figure 34:
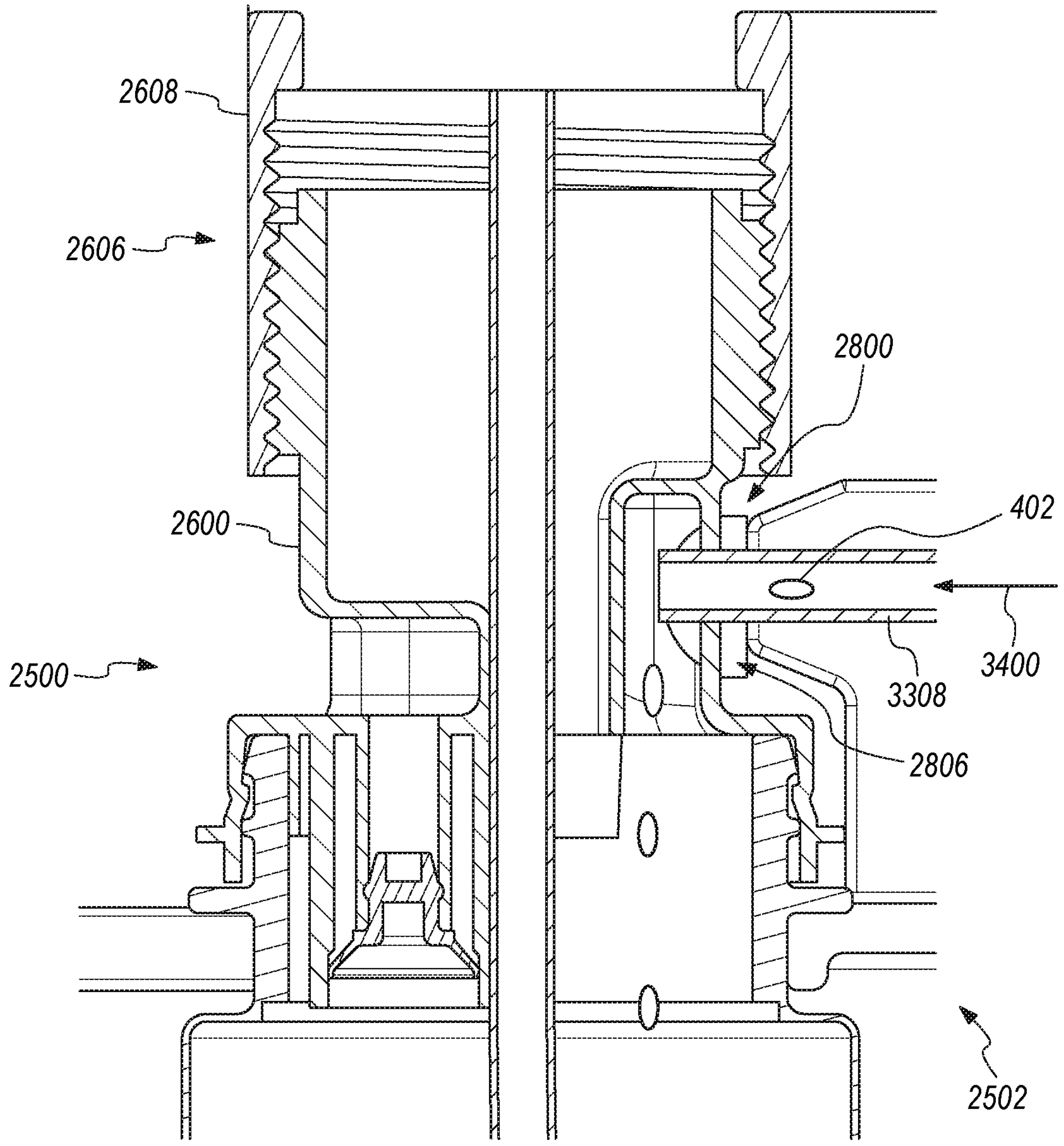
FIG. 34 is a detail view of FIG. 33 showing an air inlet valve.

Referring to FIG. 34, a cross-section detail view of FIG. 33 is illustrated. The trigger sprayer 2608 is shown attached to the adapter 2600 at the second end 2606. In some examples, the trigger sprayer 2608 attachment to the adapter 2600 is clocked such that a particular desired orientation of the trigger sprayer 2608 is achieved at each installation of the adapter 2600 to create each trigger sprayer bottle assembly 2500. For example, the threads may be designed to stop at a particular depth or number of rotations of the trigger sprayer 2608 relative to the adapter 2600. Clocking the trigger sprayer 2608 angular location relative to the adapter 2600 can be beneficial. For example, an operator of the trigger sprayer bottle assembly 2500 may always wish to have the refill port 2800 and the vent port 2802 of the adapter 2600 to be located on the opposite side (e.g., the rear side) relative to the forward-facing nozzle of the trigger sprayer 2608.

FIG. 34 also shows the tube 3308 urging the refill valve to the open position and delivering the material 402 through the refill port 2800 as the trigger sprayer bottle assembly 2500 is coupled to the refilling assembly 2502. The material 402 is flowing through the tube 3308 in the direction shown by arrow 3400.

Figure 35:
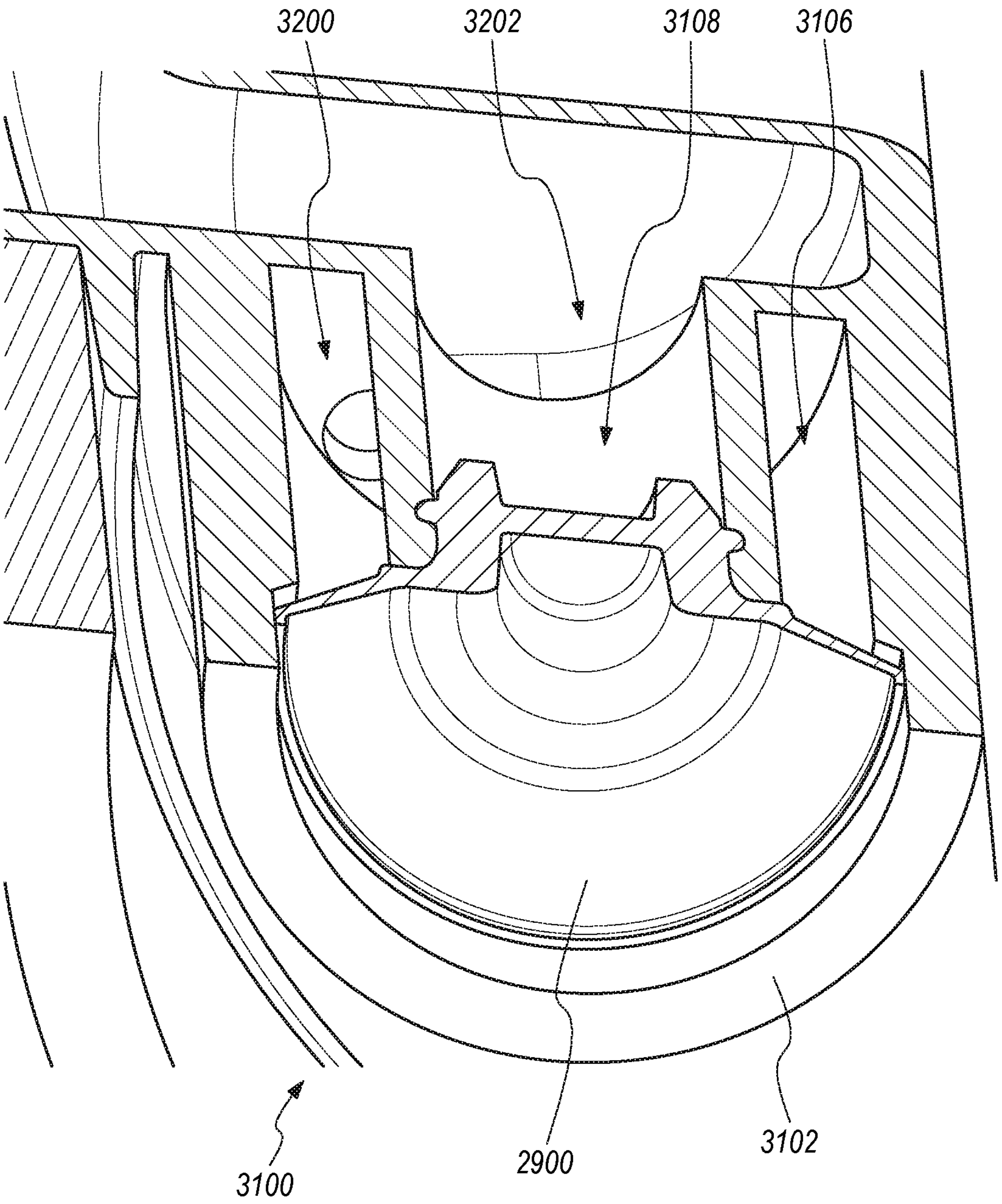
FIG. 35 is a cross-section view of the air inlet valve and the air inlet structure.

Referring to FIG. 35, a cross-section view of the air inlet valve 2900 and the air inlet structure 3100 are illustrated. As shown and previously described, the air inlet port 3200 is in fluid communication with the annular volume 3106. Likewise, the larger aperture 3202 is in fluid communication with the central volume 3108. The air inlet valve 2900 is shown in in its proper position and the air inlet valve 2900 is composed of a flexible material such as silicone or rubber. During dispense events, as the material 402 is dispensed from the refillable bottle 2508, the air pressure within the refillable bottle 2508 can decrease and begin to develop negative pressure (e.g., a partial vacuum). This negative pressure may decrease the performance of the trigger sprayer bottle assembly 2500. Because the air pressure inside the refillable bottle 2508 is less than an atmospheric pressure exterior to the refillable bottle 2508, a pressure difference is set-up. The annular volume 3106 is open to atmospheric pressure through the air inlet port 3200, such that the atmospheric pressure exerting on the air inlet valve 2900 on its upper side (e.g., facing the annular volume) is greater than the air pressure inside the refillable bottle 2508 exerting against the air inlet valve 2900 on its lower side (e.g., facing the interior volume of the refillable bottle 2508). As such, the outer perimeter of the flexible air inlet valve 2900 will displace to break contact with the first cylinder 3102 and permit exterior air at atmospheric pressure to pass into the interior volume of the refillable bottle 2508 to help equalize the pressure between the exterior atmospheric pressure and the negative pressure within the refillable bottle 2508.

Figure 36:
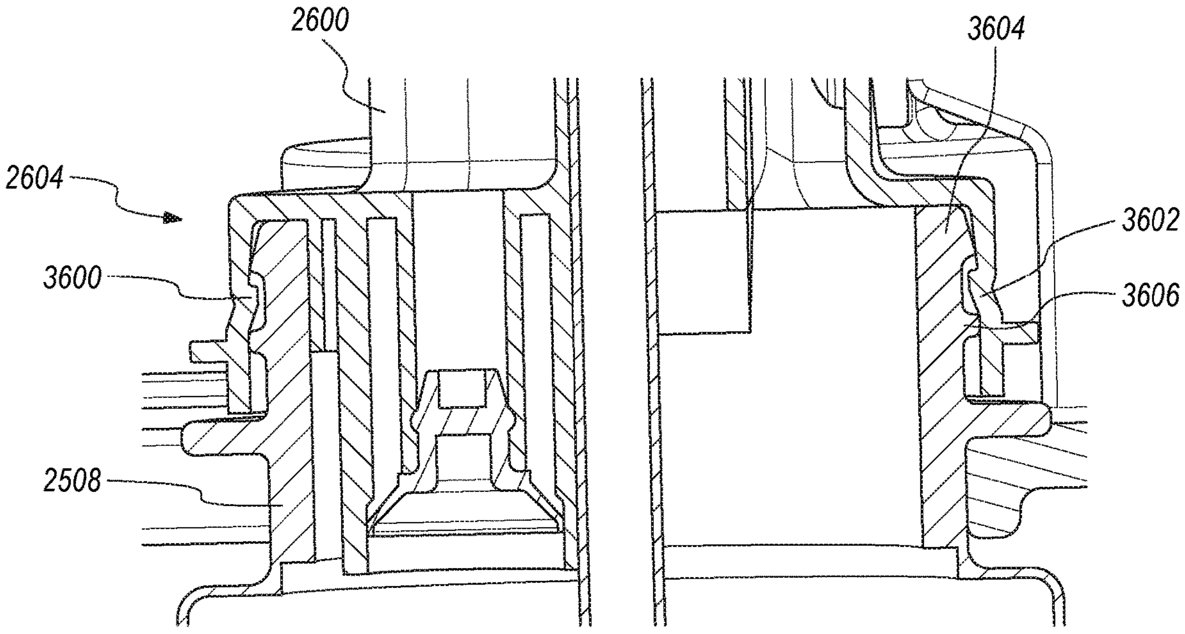
FIG. 36 is a cross-section view of a first end of the adapter.

Referring to FIG. 36, a cross-section view of the first end 2604 of the adapter 2600 is illustrated. As previously noted, the first end 2604 includes a first structure 3600 configured to cooperate with a top portion of the refillable bottle 2508. In some examples, the first structure 3600 can be tabs 3602 or other devices extending inward to provide a snap fit over a rim 3604 or a first thread 3606 of the top portion of the refillable bottle 2508. The snap fit feature can be beneficial to promote a universal-type adapter 2600 to fit nearly any type of sprayer bottle.

Figure 37:
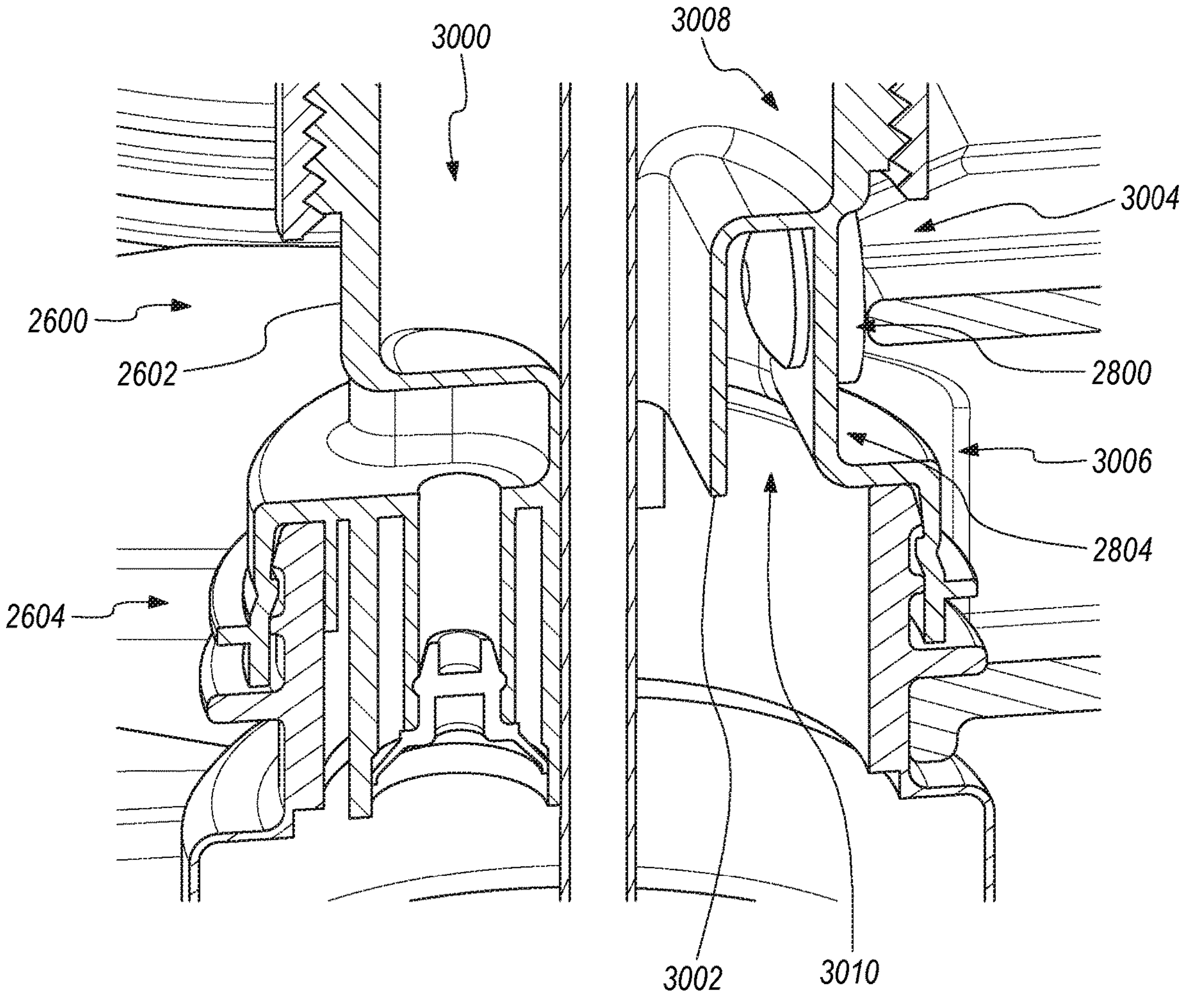
FIG. 37 is similar to FIG. 36.

Referring to FIG. 37, a cross-section view of the first end 2604 of the adapter 2600 is illustrated. FIG. 37 also shows a portion of the wall 3002 within the aperture 3000, the wall 3002 extends from a first portion 3004 of the adapter body 2602 to a second portion 3006 of the adapter body 2602. The wall 3002 and an interior surface 3008 of the adapter body 2602 define a volume 3010 that is in fluid communication with the refill port 2800. In some examples, the wall 3002 is parallel to the boss section 2804 and defines the volume 3010 extending from the first portion 3004 of the adapter body 2602 toward the first end 2604 of the adapter body 2602.

Figure 38:
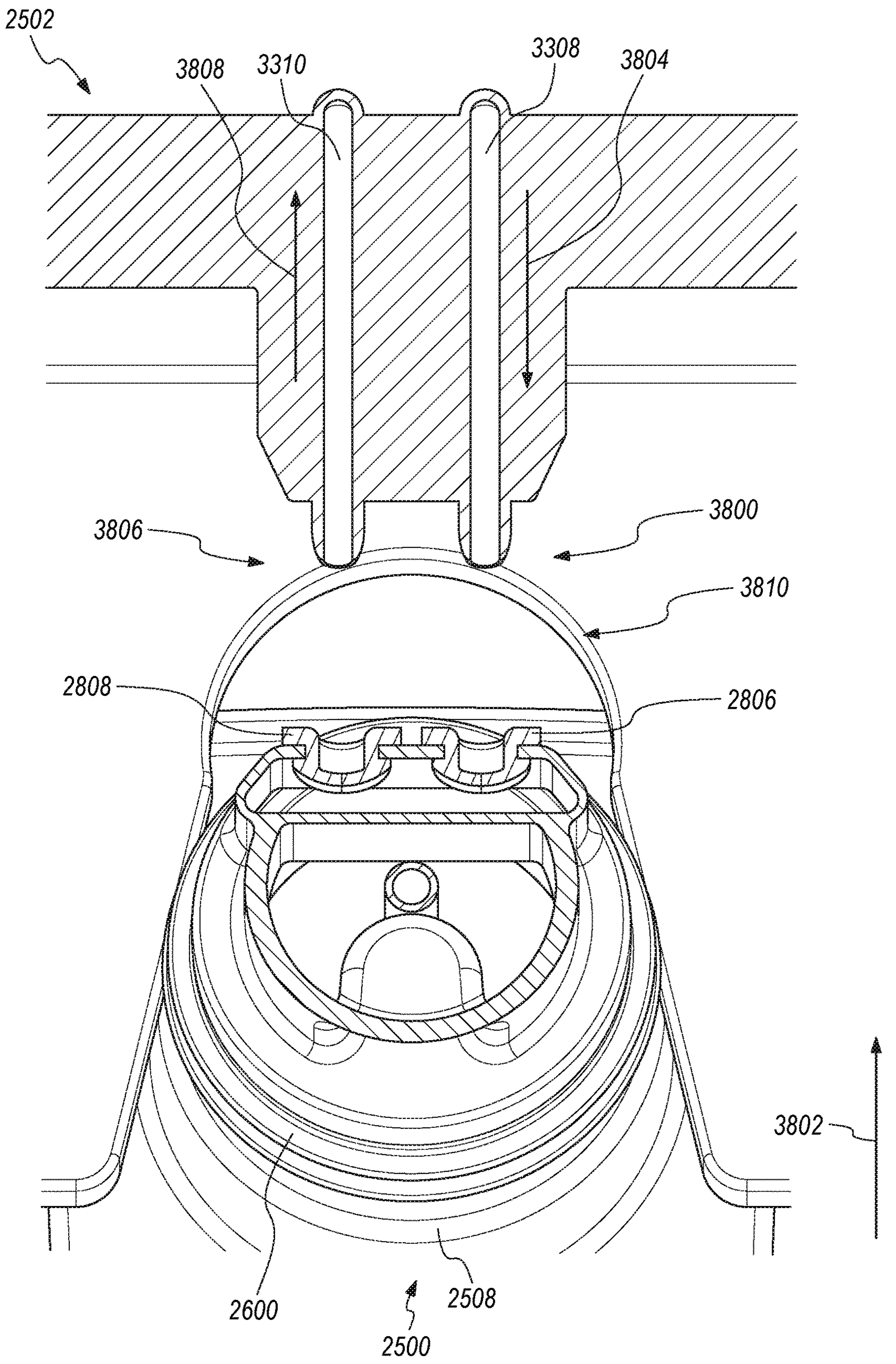
FIG. 38 is a cross-section view of the adapter spaced a distance away from a nose structure of the refilling assembly.
Figure 39:
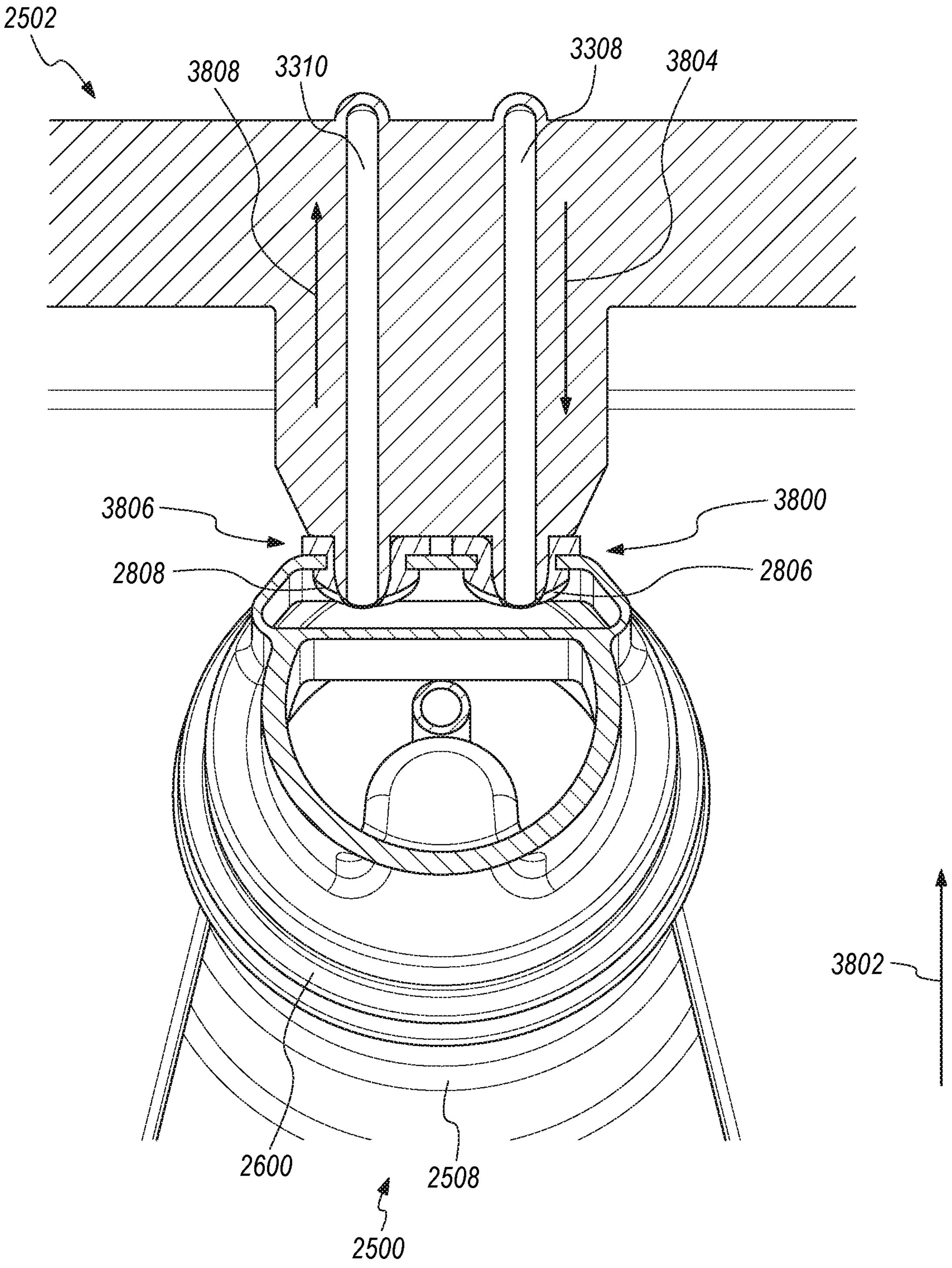
FIG. 39 is similar to FIG. 38 showing the nose structure of the refilling assembly in contact with the refill port and the vent port.

Referring to FIGS. 38-39, a process of coupling the trigger sprayer bottle assembly 2500 to the refilling assembly 2502 is described, the figures providing indication of the interaction between the refill valve 2806, the vent valve 2808, and nose portions 3800, 3806 of two tubes 3308, 3310 as the nose portions 3800, 3806 urge the valves 2806, 2808 to their open positions.

Referring to FIG. 38, a cross-section view of the adapter 2600 spaced a distance away from a nose portion 3800 of the refilling assembly 2502 is illustrated. In order to couple the trigger sprayer bottle assembly 2500 to the refilling assembly 2502, an operator moves the trigger sprayer bottle assembly 2500 toward the refilling assembly 2502. The general direction of movement is shown by arrow 3802. During the movement 3802, the refill valve 2806 moves toward a nose portion 3800 of the tube 3308 that provides the material 402 to refill the refillable bottle 2508. Direction of the material 402 flow through the tube 3308 is indicated by arrow 3804. Similarly, the vent valve 2808 moves toward a nose portion 3806 of the tube 3310 that channels vent air away from the refillable bottle 2508. Direction of the air flow through the tube 3310 is indicated by arrow 3808. In some examples, the generally round structure 3810 can cooperate with one or both of the refillable bottle 2508 or the adapter 2600 to provide a snap-fit positive location to help ensure the refill valve 2806 and the vent valve 2808 are properly aligned with the refill tube 3308 and the vent tube 3310, respectively.

Referring to FIG. 39, a cross-section view of the adapter 2600 coming into contact with the nose portion 3800 of the refilling assembly 2502 is illustrated. Just prior to coupling the trigger sprayer bottle assembly 2500 to the refilling assembly 2502, the refill valve 2806 contacts the nose portion 3800 of the tube 3308, and the vent valve 2808 contacts the nose portion 3806 of the tube 3310. The operator will continue to move the trigger sprayer bottle assembly 2500 toward the refilling assembly 2502, and the general direction of movement is shown by arrow 3802.

Figure 40:
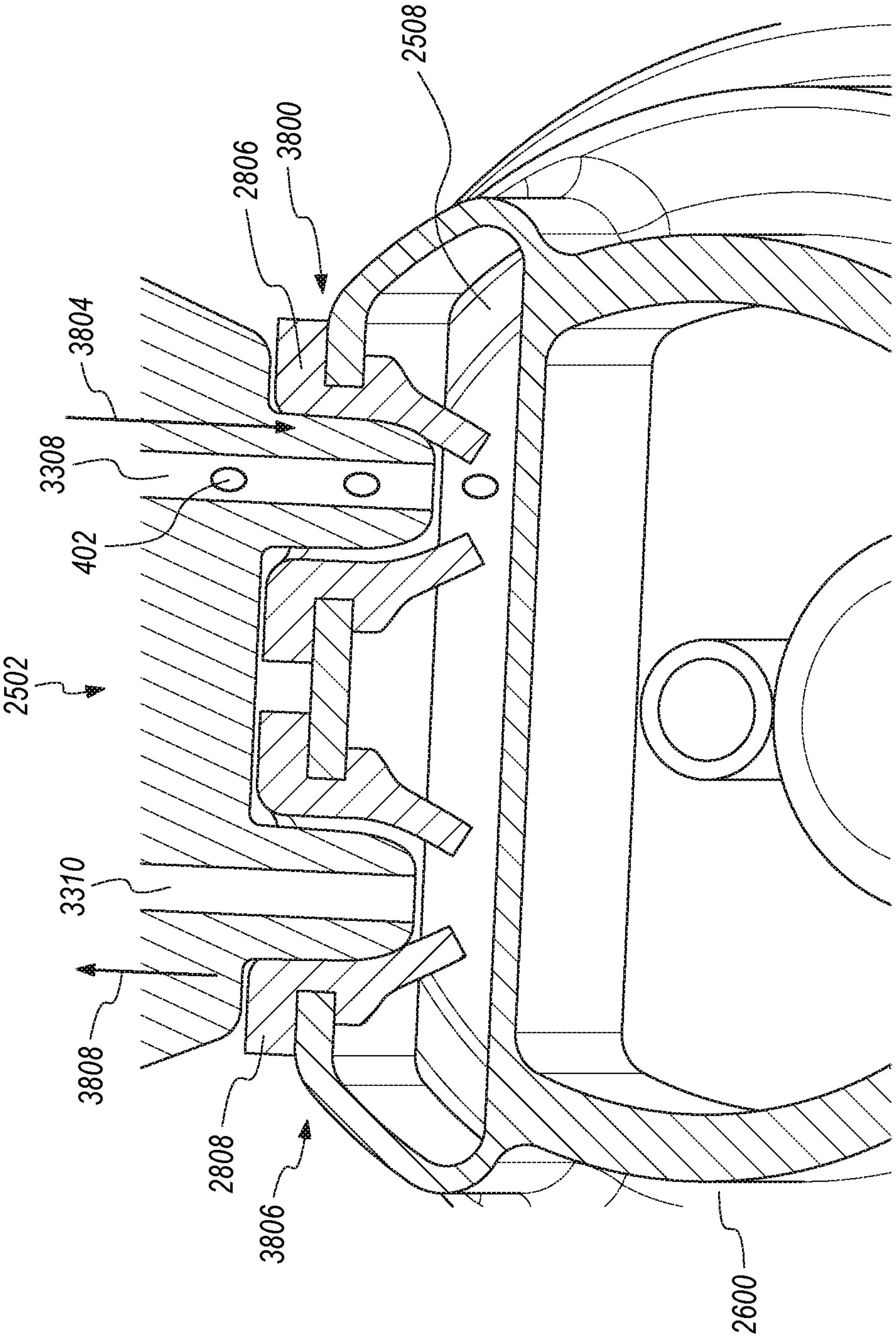
FIG. 40 is similar to FIG. 38 showing the nose structure passing through the refill port and the vent port.

Referring to FIG. 40, a cross-section view of the adapter 2600 as the trigger sprayer bottle assembly 2500 is coupled to the refilling assembly 2502 is illustrated. At the time of coupling the trigger sprayer bottle assembly 2500 to the refilling assembly 2502, the refill valve 2806 and the nose portion 3800 of the tube 3308 are occupying the same space. Similarly, the vent valve 2808 and the nose portion 3806 of the tube 3310 are occupying the same space. This is by design, and the relatively flexible refill valve 2806 and the relatively flexible vent valve 2808 are moved to an open position as the nose portions 3800 and 3806 enabling flow of the material 402 from the refill reservoir 2504 to the refillable bottle 2508 in order to refill the refillable bottle 2508. The operator can then remove the force urging the trigger sprayer bottle assembly 2500 toward the refilling assembly 2502.

Figure 41:
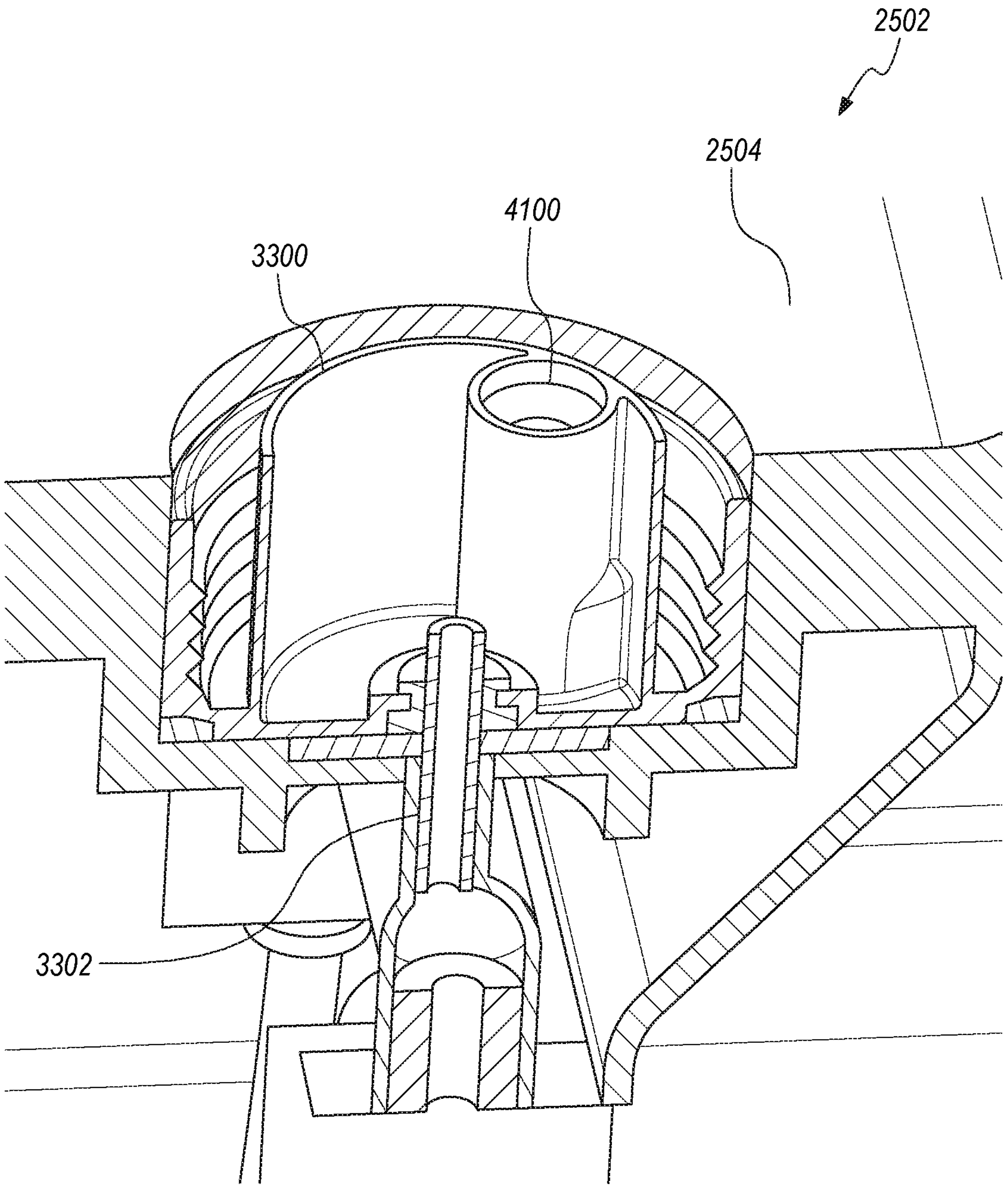
FIG. 41 is a cross section view of a fitting mounted in a refill reservoir of the refilling assembly.

Referring to FIG. 41, a cross-section view of the fitting 3300 mounted in a refill reservoir 2504 of the refilling assembly 2502 is illustrated. As previously described, in some examples, the material 402 is stored in a bulk container (shown in FIG. 44), and the bulk refill container is configured to cooperate with the fitting 3300. In some examples, the bulk refill container can include a threaded neck that cooperates with internal threads of the fitting 3300 to secure the bulk refill container to the refill reservoir 2504 and promote a leak-free seal with a connector 3302 (e.g., a conduit or a tube). However, even if a bulk refill container is not used, the fitting 3300 can remain in place. As previously described, there are various methods and structures used to contain the material 402, and some of those methods and structures employ closed or sealed systems. In the case of the closed or sealed systems, the fitting 3300 as shown in FIG. 41 provides an air inlet valve 4100 that can provide external atmospheric pressure air to an interior volume 4102 of the refill reservoir 2504 or to an interior volume of the bulk refill container. The principal of operation of the air inlet valve 4100 as shown in FIG. 41 is similar to the air inlet valve 2900 of FIG. 29, and this component will not be discussed further. In some examples, a process to intake air from an exterior volume having atmospheric pressure can be accomplished in a way similar to a water cooler having a relatively large water bottle, wherein the air passes into the bottle via the water exit path when water is not being dispensed.

Figure 42:
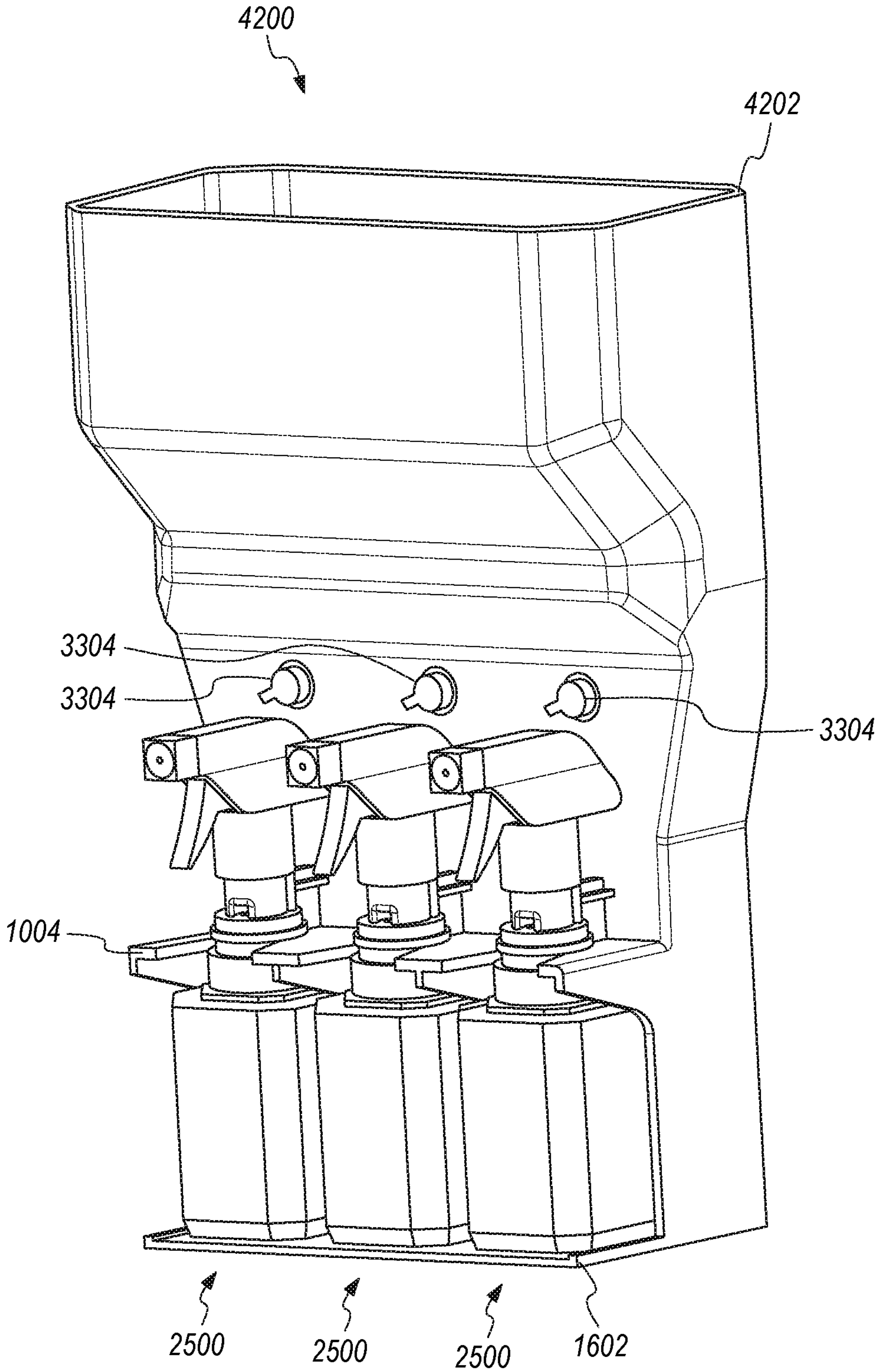
FIG. 42 is a perspective view of a multi-station refilling assembly and multiple trigger sprayer bottle assemblies.

Referring to FIG. 42, a perspective view of a multi-station refilling assembly 4200 and multiple trigger sprayer bottle assemblies 2500 is illustrated. In some examples, the refilling assembly 4200 can have structures and other considerations for a number of trigger sprayer bottle assemblies rather than a single trigger sprayer bottle assembly 2500. Most details of the refilling assembly 4200 are similar or the same as the details of the previously described refilling assembly 2502. In a cost-saving and time-saving maneuver, the refill reservoir 4202 can be larger such that fewer change-overs of material 402 or replacement of bulk refill containers take place per a given time period. Additionally, each multiple trigger sprayer bottle assembly 2500 would have a dedicated control valve 3304. Similarly, the U-shaped arms portion 1600 and the horizontal surface 1602 to locate the refillable bottle 2508 during the refilling operation will have to increase in number and/or size.

Figure 43:
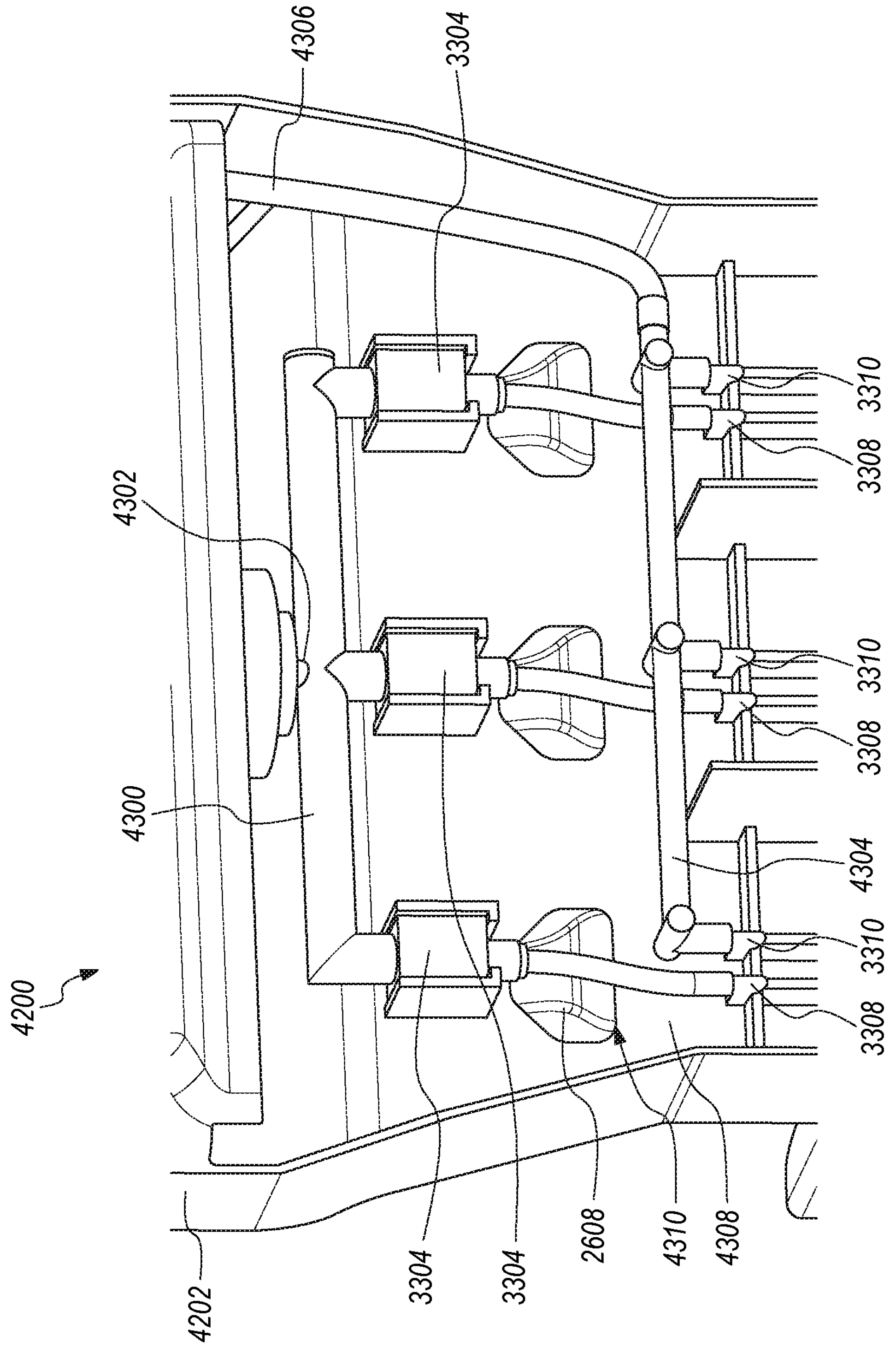
FIG. 43 is a partial rear view of the refilling assembly of FIG. 42.

Referring to FIG. 43, a partial rear view of the refilling assembly 4200 of FIG. 42 is illustrated. The multi-station refilling assembly 4200 includes a manifold 4300 for the distribution lines for the material 402. Rather than a single supply line for each trigger sprayer bottle assembly 2500 as in the previously described iterations of refilling assemblies, the connection 4302 from the fitting 3300 (not shown) in the refill reservoir 4202 a relatively large diameter manifold 4300 provides a flow path for the material 402 from the fitting 3300 to a set of control valves 3304, wherein one control valve 3304 is dedicated to a particular refill station for a trigger sprayer bottle assembly 2500. Similarly, an air vent manifold 4304 is provided to limit the amount of tubing or piping from the air vent tubes 3310 to the terminal end of the air vent line 4306. In some examples of the multi-station and single-station refilling assemblies 2502, 4200, a portion of the structure 4308 may define an aperture 4310 to enable a portion of the trigger sprayer 2608 to pass through a portion of the refilling assemblies 2502, 4200 in order to properly mate the refill valve 2806 with the refill tube 3308 and the vent valve 2808 with the vent tube 3310.

Figure 44:
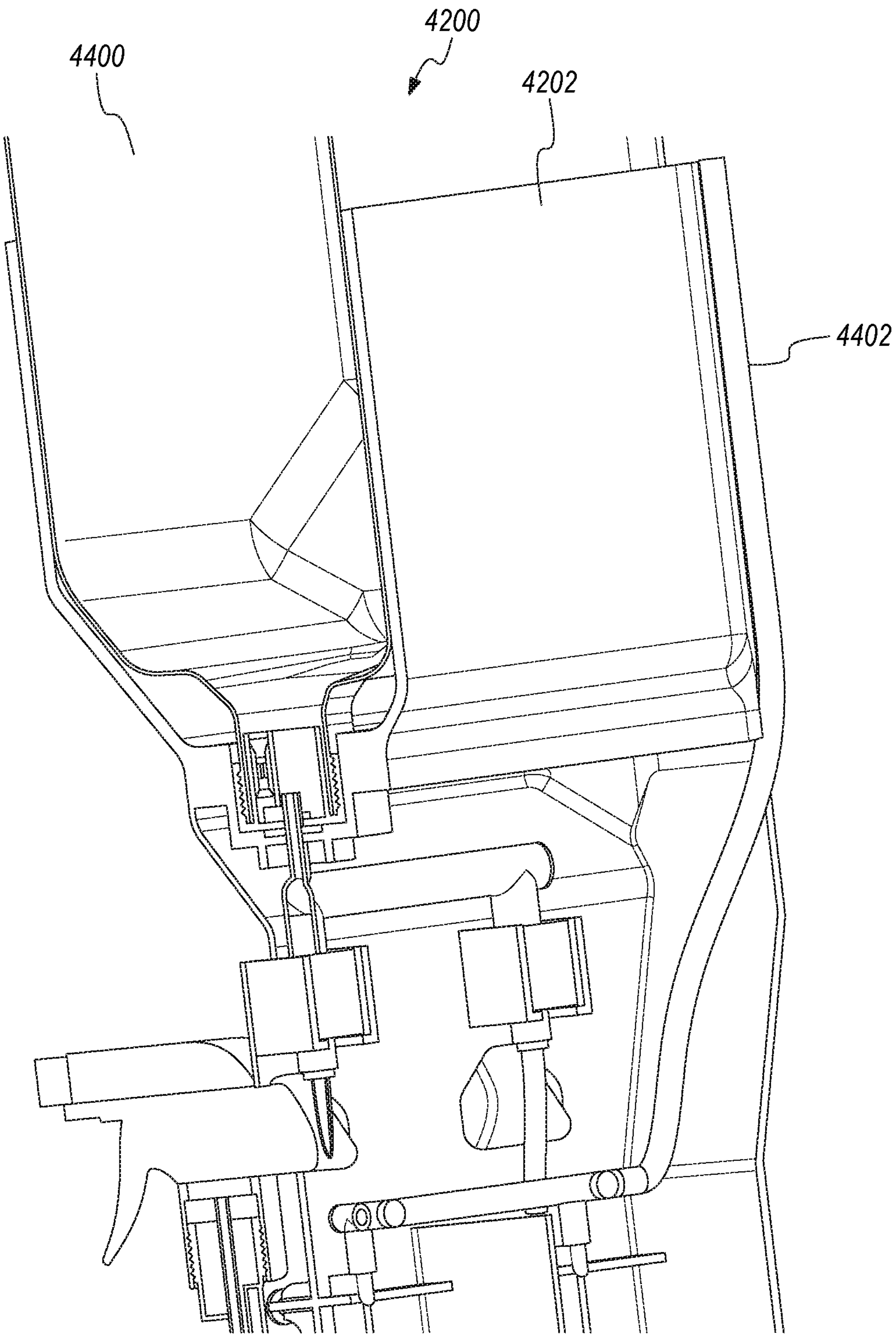
FIG. 44 is a cross-section view of the refilling assembly and trigger sprayer bottle assembly of FIG. 42.

Referring to FIG. 44, a cross-section view of the refilling assembly 4200 and trigger sprayer bottle assembly 2500 of FIG. 42 is illustrated. A bulk refill container 4400 can be provided within the refill reservoir 4202 in order to store the material 402. Additionally, the vent tube 4402 can extend to an elevation at which a material fluid level is not expected to reach in order to prevent leaks and spills from the refilling assembly 4200.

Figure 45:
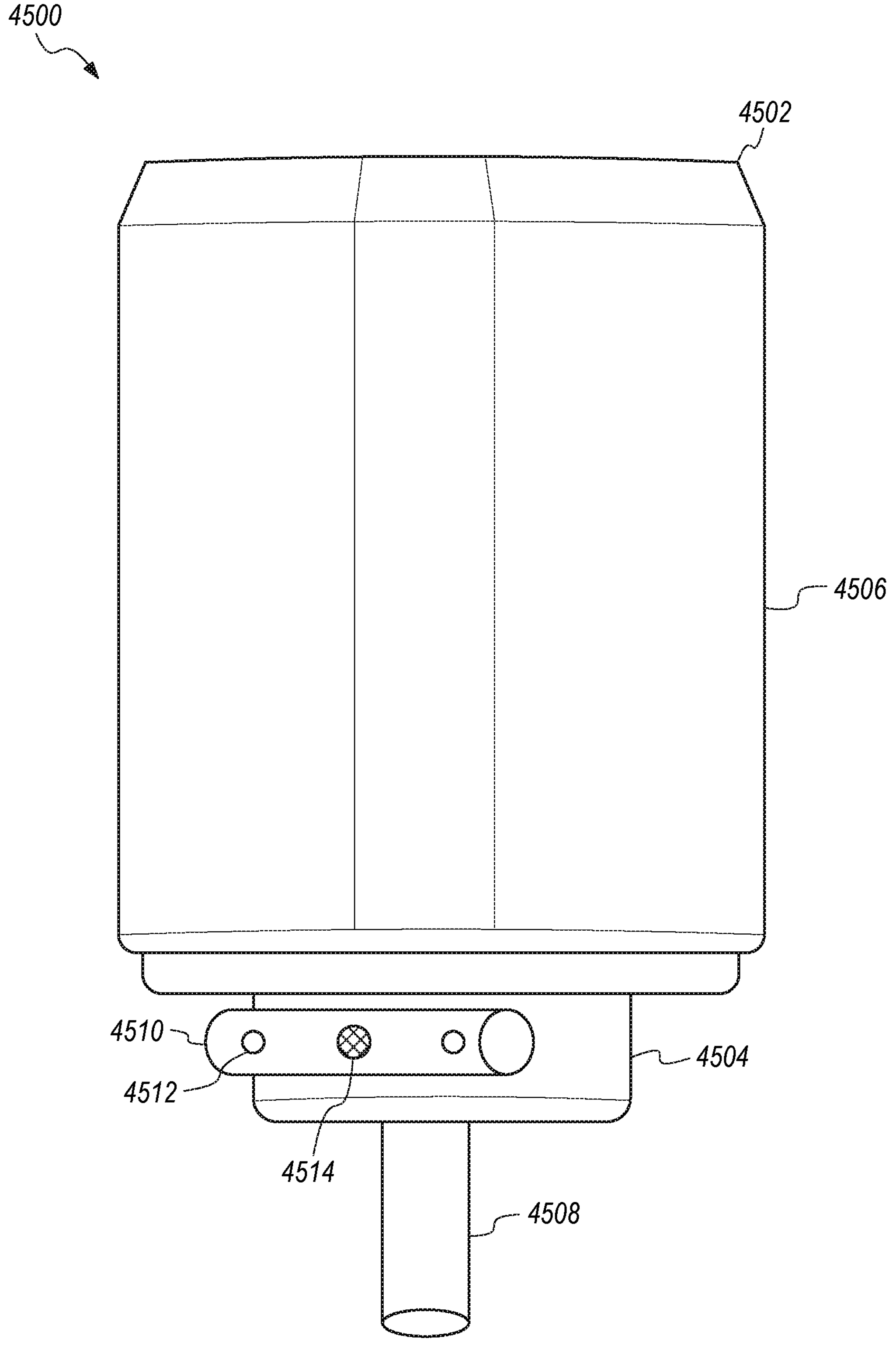
FIG. 45 is a component block diagram illustrating a system for controlling operation of a refilling assembly, according to some embodiments.

Referring to FIG. 45, any of the previously described refilling assemblies 2502, 4200 and/or the trigger sprayer bottle assembly 108, 2500 can include a dispensing system 4500. The dispensing system 4500 may be configured control operation of the refilling assembly 2502, 4200 based upon a label attached to either the trigger sprayer bottle assembly 108, 2500 or the refilling assembly 2502, 4200, such as a yellow star indicia 4504, satisfying a dispensing key. The dispensing system 4500 may comprise a first illuminator 4512, such as a white LED or other light source. The first illuminator 4512 may be configured to emit light 4540 substantially towards the first region (e.g., towards the yellow star indicia 4504) of the label of the refill container 4502. In an example, a gasket 4510 may be configured to block ambient light during operation of the first illuminator 4512 (e.g., the gasket 4510 may form a substantially opaque seal around the first region of the label when the refill container is seated within the housing 4506). The dispensing system 4500 may comprise a first visual detector 4514. It may be appreciated that the first visual detector 4514 may comprise various types of visual detection components, such as one or more light-emitting diodes (LEDs), a red, green, blue (RGB) LED, an optical sensor, a photodiode, a photosensor, an active pixel sensor, a camera, etc. The first visual detector 4514 is configured to detect a first indicia, such as the yellow star indicia 4504, of the first region based upon interaction (e.g., reflection 4542) of the emitted light, from the first illuminator 4512, with the first region. For example, the first visual detector 4514 may identify one or more detected color levels of the yellow star indicia 4504, such as a red color level corresponding to conductivity associated with a red LED, a green color level corresponding to conductivity associated with a green LED, and/or a blue color level corresponding to conductivity associated with a blue LED (e.g., based upon wavelength(s) of light reflected from the yellow star indicia 4504). In an example, a hue, saturation, luminance (HSL) model or other color model may be used to convert the one or more detected color levels into detected cylindrical color coordinates that may be compared to acceptable cylindrical color coordinates specified by the dispensing key.

The dispensing system 4500 may comprise a validator 4516 that is configured to compare the yellow star indicia 4504 with the dispensing key. In an example, responsive to the yellow star indicia 4504 satisfying the dispensing key (e.g., the detected cylindrical color coordinates may correspond to the acceptable cylindrical color coordinates specified by the dispensing key), the validator 4516 enables operation of the refill container 4502 such that the housing 4506 accepts installation of the refill container 4502 and/or the dispenser 4522 dispenses material of the refill container 4502 (e.g., the motor 4518, the gear train 4520, and/or other components within the housing 4506 may become operational). Otherwise, the validator 4516 does not enable operation of the refill container 4502 because the label, such as the yellow star indicia 4504, does not satisfy the dispensing key (e.g., the refill container 4502 is not genuine, is not the correct refill container type, etc.).

Figure 46:
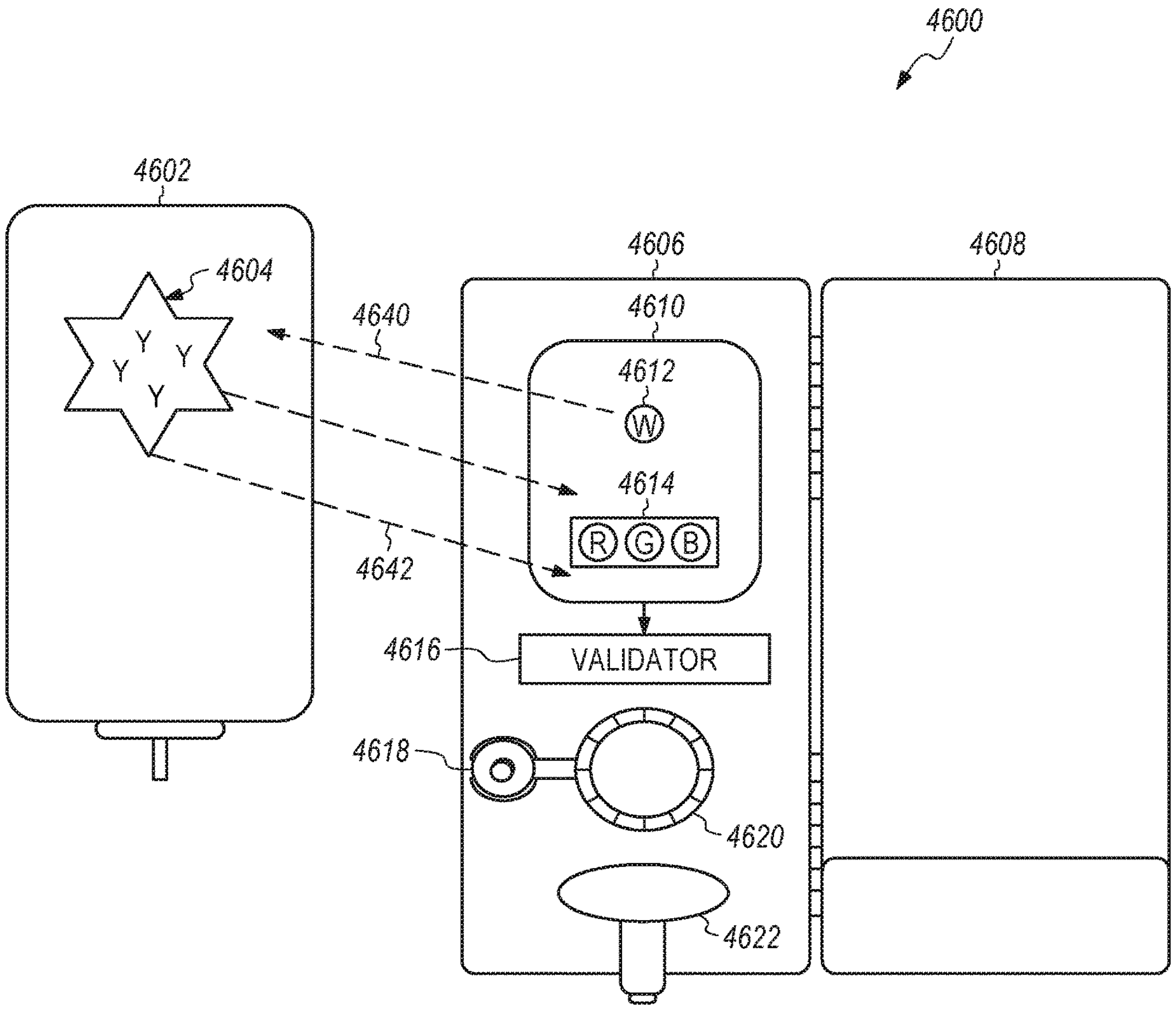
FIG. 46 is an illustration of an illuminator, a visual detector, and a validator, according to some embodiments.

FIG. 46 illustrates an example of a dispensing system 4600 for controlling operation of a refill container 4602. The refill container 4602 may comprise a label (e.g., a label directly printed onto the refill container 4602, a label attached to the refill container 4602, a label formed as part of the refill container 4602, etc.). The label may comprise a first region having a yellow star indicia 4604 and a second region comprising a purple polygon indicia 4622. The dispensing system 4600 may be configured to enable operation of the refill container 4602 (e.g., installation of the refill container 4602, dispensing of material from the refill container 4602, etc.) based upon whether the yellow star indicia 4604 and/or the purple polygon indicia 4622 satisfy a dispensing key.

The dispensing system 4600 comprises a housing 4606 that may comprise various mechanical and/or electrical components that facilitate operation of the dispensing system 4600, such as dispensing material from the refill container 4602. The dispensing system 4600 may be configured to control operation of the refill container 4602 based upon the label, such as the yellow star indicia 4604 and/or the purple polygon indicia 4622, satisfying the dispensing key.

The dispensing system 4600 may comprise a first illuminator 4612, such as a white LED or other light source. The first illuminator 4612 may be configured to emit light 4640 substantially towards the first region (e.g., towards the yellow star indicia 4604) of the label of the refill container 4602. In an example, a first gasket 4610 may be configured to block ambient light during operation of the first illuminator 4612 (e.g., the gasket 4610 may form a substantially opaque seal around the first region of the label when the refill container is seated within the housing 4606). The dispensing system 4600 may comprise a first visual detector 4614 that is configured to detect a first indicia, such as the yellow star indicia 4604, of the first region based upon interaction (e.g., reflection 4642) of the emitted light, from the first illuminator 4612, with the first region. For example, the first visual detector 4614 may detect one or more detected color levels of the yellow star indicia 4604, such as a red color level corresponding to conductivity associated with a red LED, a green color level corresponding to conductivity associated with a green LED, and/or a blue color level corresponding to conductivity associated with a blue LED (e.g., based upon wavelength(s) of light reflected from the yellow star indicia 4604). The one or more detected color levels of the yellow star indicia 4604 may be compared with a first color key component and/or a first shape key component of the dispensing key.

The dispensing system 4600 may comprise a second illuminator 4618, such as a white LED or other light source. The second illuminator 4618 may be configured to emit light 4650 substantially towards the second region (e.g., towards the purple polygon indicia 4622) of the label of the refill container 4602. In an example, a second gasket 4608 may be configured to block ambient light during operation of the second illuminator 4618 (e.g., the second gasket 4608 may form a substantially opaque seal around the second region of the label when the refill container is seated within the housing 4606). The dispensing system 4600 may comprise a second visual detector 4620 that is configured to detect a second indicia, such as the purple polygon indicia 4622, of the second region based upon interaction (e.g., reflection 4652) of the emitted light, from the second illuminator 4618, with the second region. For example, the second visual detector 4620 may detect one or more second detected color levels of the purple polygon indicia 4622, such as a second red color level corresponding to conductivity associated with a red LED, a second green color level corresponding to conductivity associated with a green LED, and/or a second blue color level corresponding to conductivity associated with a blue LED (e.g., based upon wavelength(s) of light reflected from the purple polygon indicia 4622). The one or more second detected color levels of the purple polygon indicia 4622 may be compared with a second color key component and/or a second shape key component of the dispensing key.

The dispensing system 4600 may comprise a validator 4616 that is configured to compare the yellow star indicia 4604 and/or the purple polygon indicia 4622, such as the one or more detected color levels and/or the one or more second detected color levels, with the dispensing key. That is, responsive to the yellow star indicia 4604 and/or the purple polygon indicia 4622 satisfying the dispensing key, the validator 84616 enables operation of the refill container 4602 such that the housing 4606 accepts installation of the refill container 4602, the dispenser dispenses material of the refill container 4602, etc. Otherwise, the validator 4616 does not enable operation of the refill container 4602 because the label, such as the yellow star indicia 4604 and/or the purple polygon indicia 4622, do not satisfy the dispensing key (e.g., the refill container 4602 is not genuine and/or is not the correct refill container type).

The disclosed apparatus and methods can provide benefits over other known devices. The refill port enables the material to be added to the refillable bottle (refilling) when the trigger sprayer is attached to the adapter and the trigger sprayer is attached to the refillable bottle through the adapter, thus saving time and money by reducing operator effort and time commitment to accomplish bottle refilling tasks. Additionally, because the adapter includes a vent port through which air is removed from the refillable bottle when the trigger sprayer is attached to the adapter and the trigger sprayer is attached to the refillable bottle through the adapter.

Another potential benefit can be the identification of refillable bottles and automatically stopping dispensation of material if an ineligible refillable bottle is presented to the refilling assembly.

Although the subject matter has been described in language specific to structural features or methodological acts, it is to be understood that the subject matter of the appended claims is not necessarily limited to the specific features or acts described above. Rather, the specific features and acts described above are disclosed as example forms of implementing at least some of the claims.

Various operations of embodiments are provided herein. The order in which some or all of the operations are described should not be construed to imply that these operations are necessarily order dependent. Alternative ordering is contemplated. Further, it will be understood that not all operations are necessarily present in each embodiment provided herein. Also, it will be understood that not all operations are necessary in some embodiments.

Many modifications may be made to the instant disclosure without departing from the scope or spirit of the claimed subject matter. Unless specified otherwise, “first,” “second,” or the like are not intended to imply a temporal aspect, a spatial aspect, an ordering, etc. Rather, such terms are merely used as identifiers, names, etc. for features, elements, items, etc. For example, a first location and a second location correspond to location A and location B or two different or two identical locations or the same location.

Moreover, “exemplary” is used herein to mean serving as an example, instance, illustration, etc., and not necessarily as advantageous. As used in this application, “or” is intended to mean an inclusive “or” rather than an exclusive “or”. In addition, “a” and “an” as used in this application and the appended claims are generally be construed to mean “one or more” unless specified otherwise or clear from context to be directed to a singular form. Also, at least one of A and B and/or the like generally means A or B or both A and B. Furthermore, to the extent that “includes”, “having”, “has”, “with”, or variants thereof are used, such terms are intended to be inclusive in a manner similar to the term “comprising.”

Also, although the disclosure has been shown and described with respect to one or more implementations, equivalent alterations and modifications will occur to others of ordinary skill in the art based upon a reading and understanding of this specification and the annexed drawings. The disclosure comprises all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the

What is claimed is:

1. A refillable container and refilling system comprising:
- a stand;
- an area for receiving a refillable container;
- a refillable container;
- the refillable container having a neck;
- an adaptor secured to the neck:
- the adaptor having
  - a cylindrical body;
  - a liquid inlet through a wall of the cylindrical body;
  - a liquid inlet valve located in the liquid inlet;
  - an air outlet located through the wall of the cylindrical body;
  - an air outlet valve located in the air outlet;
  - one or more alignment members configured to orient the refillable container to the stand;
- wherein the refillable container is inserted into the stand along a horizontal axis;
- wherein the refillable container is removed from the stand along the horizontal axis;
- a reservoir located on the stand;
- the reservoir having a liquid outlet:
- a control valve in fluid communication with the liquid outlet:
- a liquid fill conduit in fluid communication with the control valve;
- the liquid fill conduit configured to engage with a liquid inlet valve of the adaptor to place the interior of the refillable container in fluid communication with the control valve;
- the reservoir having an air inlet;
- an air transfer conduit in fluid communication with the reservoir air inlet;
- wherein the air transfer conduit is configured to engage with the air outlet valve to place the interior of the refillable container in fluid communications with the reservoir.

2. The refillable container and refilling system of claim 1 wherein the adaptor has a planar surface and wherein the liquid inlet and air outlet valves are located on the planar surface.

3. The refillable container and refilling system of claim 2 wherein the planar surface comprises at least one of the one or more alignment members.

4. The refillable container and refilling system of claim 1 wherein the one or more alignment members comprises one or more ridges.

5. The refillable container and refilling system of claim 1 wherein the one or more alignment members comprise a recessed groove.

6. The refillable container and refilling system of claim 1 wherein the adaptor further comprises an air inlet vent passage through the cylindrical wall.

7. The refillable container and refilling system of claim 6 further comprising an air inlet vent valve in fluid communication with the air inlet vent passage.

8. The refillable container and refilling system of claim 7 wherein the air inlet vent valve has a fluid flow path that extends along an axis that is coaxially aligned with the cylindrical body.

9. The refillable container and refilling system of claim 7 wherein the air inlet vent valve has a fluid flow path that extends along an axis that is perpendicular to a fluid flow path of the liquid inlet valve.

10. The refillable container and refilling system of claim 7 wherein the air inlet vent valve is located below the liquid inlet valve.

11. The refillable container and refilling system of claim 1 further comprising a wall on the interior of the adaptor, the wall being located proximate the liquid inlet.

12. The refillable container and refilling system of claim 1 further comprising a wall on the interior of the adaptor, the wall being located proximate the liquid inlet.

13. A refillable container comprising:
- a body;
- the body having a neck;
- an adaptor secured to the neck:
- the adaptor having
  - a cylindrical body;
  - a liquid inlet through a wall of the cylindrical body;
  - a liquid inlet valve located in the liquid inlet;
  - an air outlet located through the wall of the cylindrical body;
  - an air outlet valve located in the air outlet;
  - one or more alignment members configured to orient the refillable container to a refill stand;
  - wherein the adaptor further comprises an air inlet vent passage through the cylindrical wall.

14. The refillable container of claim 13 further comprising an air inlet vent valve in fluid communication with the air inlet vent passage.

15. The refillable container and refilling system of claim 13 wherein the air inlet vent valve has a fluid flow path that extends along an axis that is coaxially aligned with the cylindrical body.

16. The refillable container and refilling system of claim 13 further comprising a wall on the interior of the adaptor, the wall being located proximate the liquid inlet.

17. The refillable container and refilling system of claim 1 further comprising a wall on the interior of the adaptor, the wall being located proximate the liquid inlet.

18. A method for transferring fluid between a container and a reservoir comprising:
- providing a container;
  - the container having a neck;
    - an adaptor secured to the neck:
      - the adaptor having
    - a cylindrical body;
    - a liquid passage through a wall of the cylindrical body;
    - a liquid sealing valve located in the liquid passage;
    - an air passage located through the wall of the cylindrical body;
    - an air sealing valve located in the air passage;

one or more alignment members configured to orient the container to the stand;

providing a reservoir station;

the reservoir station having a stand;

an area for receiving a container;

one or more alignment members;

a reservoir located on the stand;

the reservoir having a liquid passageway:

a control valve in fluid communication with the liquid passageway:

a liquid transfer conduit in fluid communication with the control valve;

the liquid transfer conduit configured to engage with a liquid sealing valve of the adaptor to place the interior of the container in fluid communication with the control valve;

the reservoir having an air passageway;

an air transfer conduit in fluid communication with the reservoir air passageway;

wherein the air transfer conduit is configured to engage with the air sealing valve to place the interior of the container in fluid communications with the reservoir;

aligning the one or more alignment members on the container with the one or more alignment;

moving the container along a horizontal path into the area for receiving the container;

causing the liquid transfer conduit and air transfer conduit to engage with the liquid sealing valve and the air sealing valve;

causing the control valve to open and allow liquid to flow between the container and the reservoir and allowing air to flow between the container and the reservoir.

19. The method for transferring fluid between a container and a reservoir of claim 18 further comprising engaging a disconnect member and removing the refillable container along the horizontal path.

20. The method for transferring fluid between a container and a reservoir of claim 19 wherein the disconnect member is a button.

* * * * *